United States Patent [19]

Bruckert et al.

[11] Patent Number: 4,907,228
[45] Date of Patent: Mar. 6, 1990

[54] DUAL-RAIL PROCESSOR WITH ERROR CHECKING AT SINGLE RAIL INTERFACES

[75] Inventors: William F. Bruckert, Northboro, Mass.; Thomas D. Bissett, Derry, N.H.; Norbert H. Riegelhaupt, Framingham, Mass.

[73] Assignee: Digital Equipment Corporation, Maynard, Mass.

[21] Appl. No.: 93,584

[22] Filed: Sep. 4, 1987

[51] Int. Cl.⁴ .......................................... G06F 11/20
[52] U.S. Cl. ..................................... 371/68.3; 371/8; 364/900
[58] Field of Search ..................... 371/7, 8, 9, 10, 11, 371/16, 68; 364/200, 900

[56] References Cited

U.S. PATENT DOCUMENTS

| | | | |
|---|---|---|---|
| 3,665,173 | 5/1972 | Bouricius et al. | 371/8 |
| 4,009,241 | 7/1977 | Ossfeldt | 371/9 |
| 4,012,717 | 3/1977 | Censier | 371/9 |
| 4,030,074 | 6/1977 | Giorcelli | 364/200 |
| 4,031,372 | 6/1977 | Davis | 371/9 |
| 4,099,234 | 7/1978 | Woods | 371/9 |
| 4,141,066 | 2/1979 | Keiles | 371/9 |
| 4,153,319 | 5/1979 | Plyler | 339/75 P |
| 4,200,226 | 4/1980 | Piras | 371/9 |
| 4,228,496 | 10/1980 | Katzman et al. | 364/200 |
| 4,245,344 | 1/1981 | Richter | 371/68 |
| 4,251,873 | 2/1981 | Joby | 371/68 |
| 4,253,147 | 2/1981 | MacDougall et al. | 364/206 |
| 4,350,225 | 9/1982 | Sakata | 371/9 |
| 4,356,546 | 10/1982 | Whiteside et al. | 364/200 |
| 4,371,754 | 2/1983 | De | 371/9 |
| 4,400,792 | 8/1983 | Strelow | 371/9 |
| 4,453,215 | 6/1984 | Reid | 364/208 |
| 4,486,826 | 12/1984 | Wolff et al. | 364/206 |
| 4,541,094 | 9/1985 | Stiffler | 371/68 |
| 4,610,013 | 9/1986 | Long | 371/9 |
| 4,654,857 | 3/1987 | Samson | 371/68 |
| 4,751,702 | 6/1988 | Beier | 371/9 |

FOREIGN PATENT DOCUMENTS

| | | |
|---|---|---|
| WO81/00925 | 4/1981 | European Pat. Off. |
| 1200155 | 7/1970 | United Kingdom |

OTHER PUBLICATIONS

Chester, "Fault-Tolerant Computers Mature", Systems & Software, pp. 117-129 (Mar., 1985).
Depledge, et al., "Fault-Tolerant Microcomputer Systems for Aircraft", IERE Conference Proceedings 36, 1977, Proc. Conf. on Computer Systems & Technology Engineering, pp. 205-220 (Mar., 1977).
Beck, et al., "Implementation Issues in Clock Synchronization", Mar. 15, 1986 Draft (origin unknown).
Datapro Research Corporation, Feature Report (Dec. 1985), MO7-100-318 to MO7-100-323.
The Evolution of Fault-Tolerant Computing, Proceedings of the 1-Day Symposium on the Evolution of Fault-Tolerant Computing, Ed. by A. Avizienis, H. Kopetz, and J. Laprie (Jun. 30, 1986).
IBM System/88, The Operating System Reference, Jul., 1985.
Harrison, "S/88 Architecture and Design; S/88 Internals", Share 67 (8/12/86).
"System/88 Technical Overview" (date believed to be 2/86).
Tandem NonStop Computers, Datapro Research Corporation, Computers M11-822-101 to M11-822-119 (Oct., 1986).

(List continued on next page.)

Primary Examiner—Michael R. Fleming
Attorney, Agent, or Firm—Finnegan, Henderson, Farabow, Garrett, & Dunner

[57] ABSTRACT

A dual processor computer system with error checking includes a first processing system for executing a series of instructions including output instructions. A second processing system executes the series of instructions independently of and in synchronism with the first processing system. Shared resource devices are coupled to the first and second processing systems for receiving data from output instructions from the first and second processing systems substantially simultaneously. Error checking devices are located downstream of the shared resource means for checking the data received from the first and second processing systems only following a write operation into the shared resource means.

25 Claims, 53 Drawing Sheets

OTHER PUBLICATIONS.

Bartlett, "The Tandem Concept of Fault-Tolerance", (view 1985), M07-100-318 to M07-100-323.

Bernstein, "Sequoia: A Fault-Tolerant Tightly-Coupled Computer for Transaction Processing", Technical Report TR-85-03, pp. 1-43 (May 2, 1985).

Sequoia Technical Overview (date unknown but believed to be Mar., 1985 by virtue of annotation at the bottom of last page of this material).

Sequoia Hardware Architecture (1984).

Bernstein, Sequoia, Wang Institute of Graduate Studies (date unknown).

"How Technology is Cutting Fault-Tolerance Costs", Electronics 55-58 (Jan. 13, 1986).

Katsuki, et al., "Pluribus-An Operational Fault-Tolerant Multiprocessor", Proceedings of the IEEE, vol. 66, No. 10, (Oct., 1978).

Reynolds, "Architectures for Fault-Tolerant Spacecraft Computers", Proceedings of the IEEE, vol. 66, No. 10, pp. 1255-1268 (Oct., 1978).

Parallel 300 (1984).

Inselberq, "Multiprocessor Architecture Ensures Fault-Tolerant Transaction Processing", Many MicroSystems (Apr. 1983).

Anita Borq, "Targon/Nixdorf" (date unknown).

Losq, "A Highly Efficient Redundancy Scheme: Self-Purging Redundancy", IEEE Transactions on Computers, vol. C-25, No. 6 (Jun., 1986).

Su, et al., "A Hardware Redundancy Reconfiguration Scheme for Tolerating Multiple Module Failures", IEEE Transactions on Computers, vol. C-29, No. 3, (Mar., 1980).

Takaoka, et al., "N-Fail-Safe Logical Systems", IEEE Transactions on Computers, vol. C-20, No. 5, pp. 536-542.

SERIAL CROSS LINK

FIG. 13A.

PRIMARY RAIL ZONE II IN DUPLEX MODE

| CONTROL SIGNAL | READ OTHER ZONE | WRITE OTHER ZONE | READ THIS ZONE SERIAL REG | WRITE THIS ZONE SERIAL REG | READ PARALLEL REG ZONE ADDRESS | WRITE PARALLEL REG ZONE ADDRESS | REAR PARALLEL REG SYSTEM ADDRESS | WRITE PARALLEL REG. SYSTEM ADDRESS | READ I/O | WRITE I/O |
|---|---|---|---|---|---|---|---|---|---|---|
| A | ON | OFF | ON | OFF | ON | OFF | ON | OFF | ON | OFF |
| B | OFF | OFF | OFF | OFF | OFF | ON | OFF | ON | OFF | OFF |
| C | OFF | OFF | OFF | OFF | OFF | OFF | OFF | OFF | OFF | ON |
| D | OFF | ON | OFF | OFF | OFF | OFF | ON | OFF | ON | OFF |
| E | 2 | | 1 | | 1 | | 1 | | 1 | |
| F | | | | 1 | 2 | | 2 | | 3 | |
| G | | | | | | 1 | | 1 | | |
| H | | | | | | | | | | 1 |
| I | | 1 | | | | | 2 | | 3 | |

FIG. 13B.

MIRROR RAIL ZONE II IN DUPLEX MODE

| CONTROL SIGNAL | READ OTHER ZONE | WRITE OTHER ZONE | READ THIS ZONE SERIAL REG | WRITE THIS ZONE SERIAL REG | READ PARALLEL REG ZONE ADDRESS | WRITE PARALLEL REG ZONE ADDRESS | REAR PARALLEL REG SYSTEM ADDRESS | WRITE PARALLEL REG. SYSTEM ADDRESS | READ I/O | WRITE I/O |
|---|---|---|---|---|---|---|---|---|---|---|
| A | ON | OFF | ON | OFF | ON | OFF | ON | OFF | ON | OFF |
| B | OFF | OFF | OFF | OFF | OFF | ON | OFF | ON | OFF | OFF |
| C | OFF | OFF | OFF | OFF | OFF | OFF | OFF | OFF | OFF | ON |
| D | OFF | ON | OFF | OFF | OFF | OFF | ON | OFF | ON | OFF |
| E | 2 | | 1 | | 1 | | 1 | | 1 | |
| F | | | 1 | | 2 | | 2 | | 3 | |
| G | | | | | | 1 | | 2 | | |
| H | | | | | | | | | | 2 |
| I | | 1 | | | | | 2 | | 3 | |

FIG. 13C.

PRIMARY RAIL ZONE II' IN DUPLEX MODE

| CONTROL SIGNAL | READ OTHER ZONE | WRITE OTHER ZONE | READ THIS ZONE SERIAL REG | WRITE THIS ZONE SERIAL REG | READ PARALLEL REG ZONE ADDRESS | WRITE PARALLEL REG ZONE ADDRESS | REAR PARALLEL REG SYSTEM ADDRESS | WRITE PARALLEL REG. SYSTEM ADDRESS | READ I/O | WRITE I/O |
|---|---|---|---|---|---|---|---|---|---|---|
| A | ON | OFF | ON | OFF | ON | OFF | ON | OFF | ON | OFF |
| B | OFF | OFF | OFF | OFF | OFF | ON | OFF | ON | OFF | OFF |
| C | OFF | OFF | OFF | OFF | OFF | OFF | OFF | OFF | OFF | ON |
| D | OFF | ON | OFF | OFF | OFF | OFF | ON | OFF | ON | OFF |
| E | 2 | | 1 | | 1 | | 1 | | 1 | |
| F | | | 1 | | 2 | | 2 | | 3 | |
| G | | | | | | 1 | | 2 | | |
| H | | | | | | | | | | 2 |
| I | | 1 | | | | | 2 | | 3 | |

FIG. 13D.

MIRROR RAIL ZONE II' IN DUPLEX MODE

| CONTROL SIGNAL | READ OTHER ZONE | WRITE OTHER ZONE | READ THIS ZONE SERIAL REG | WRITE THIS ZONE SERIAL REG | READ PARALLEL REG ZONE ADDRESS | WRITE PARALLEL REG ZONE ADDRESS | REAR PARALLEL REG SYSTEM ADDRESS | WRITE PARALLEL REG. SYSTEM ADDRESS | READ I/O | WRITE I/O |
|---|---|---|---|---|---|---|---|---|---|---|
| A | ON | OFF | ON | OFF | ON | OFF | ON | OFF | ON | OFF |
| B | OFF | OFF | OFF | OFF | OFF | ON | OFF | ON | OFF | OFF |
| C | OFF | OFF | OFF | OFF | OFF | OFF | OFF | OFF | OFF | ON |
| D | OFF | ON | OFF | OFF | OFF | OFF | ON | OFF | ON | OFF |
| E | 2 | | | | 1 | | 1 | | 1 | |
| F | | | | 1 | | 2 | | 2 | | 3 |
| G | | | | | | | 1 | | 1 | |
| H | | | | | | | | | | 1 |
| I | | | 1 | | | | 2 | | 3 | |

FIG. 13E.

PRIMARY RAIL ZONE II IN MASTER MODE

| CONTROL SIGNAL | READ OTHER ZONE | WRITE OTHER ZONE | READ THIS ZONE SERIAL REG | WRITE THIS ZONE SERIAL REG | READ PARALLEL REG ZONE ADDRESS | WRITE PARALLEL REG ZONE ADDRESS | REAR PARALLEL REG SYSTEM ADDRESS | WRITE PARALLEL REG. SYSTEM ADDRESS | READ I/O | WRITE I/O |
|---|---|---|---|---|---|---|---|---|---|---|
| A | ON | OFF | ON | OFF | ON | OFF | ON | OFF | ON | OFF |
| B | OFF | OFF | OFF | OFF | OFF | ON | OFF | ON | OFF | OFF |
| C | OFF | OFF | OFF | OFF | OFF | OFF | OFF | OFF | OFF | ON |
| D | OFF | ON | OFF | OFF | OFF | OFF | OFF | OFF | OFF | OFF |
| E | 2 | | 1 | | 1 | | 1 | | 1 | |
| F | | | | 1 | 2 | | 2 | | 3 | |
| G | | | | | | 1 | | 1 | | |
| H | | | | | | | | | | 1 |
| I | | 1 | | | | | | | | |

FIG. 13F.

MIRROR RAIL ZONE II IN MASTER MODE

| CONTROL SIGNAL | READ OTHER ZONE | WRITE OTHER ZONE | READ THIS ZONE SERIAL REG | WRITE THIS ZONE SERIAL REG | READ PARALLEL REG ZONE ADDRESS | WRITE PARALLEL REG ZONE ADDRESS | REAR PARALLEL REG SYSTEM ADDRESS | WRITE PARALLEL REG. SYSTEM ADDRESS | READ I/O | WRITE I/O |
|---|---|---|---|---|---|---|---|---|---|---|
| A | ON | OFF | ON | OFF | ON | OFF | ON | OFF | ON | OFF |
| B | OFF | OFF | OFF | OFF | OFF | ON | OFF | ON | OFF | OFF |
| C | OFF | OFF | OFF | OFF | OFF | OFF | OFF | OFF | OFF | ON |
| D | OFF | ON | OFF | OFF | OFF | OFF | OFF | OFF | OFF | OFF |
| E | 2 | | 1 | | 1 | | 1 | | 1 | |
| F | | | 1 | | 2 | | 2 | | 3 | |
| G | | | | | | 1 | | 2 | | |
| H | | | | | | | | | | 1 |
| I | | 1 | | | | | | | | |

FIG. 13G.

PRIMARY RAIL ZONE II' IN MASTER MODE

| CONTROL SIGNAL | READ OTHER ZONE | WRITE OTHER ZONE | READ THIS ZONE SERIAL REG | WRITE THIS ZONE SERIAL REG | READ PARALLEL REG ZONE ADDRESS | WRITE PARALLEL REG ZONE ADDRESS | REAR PARALLEL REG SYSTEM ADDRESS | WRITE PARALLEL REG. SYSTEM ADDRESS | READ I/O | WRITE I/O |
|---|---|---|---|---|---|---|---|---|---|---|
| A | ON  | OFF | ON  | OFF | ON  | OFF | ON  | OFF | ON  | OFF |
| B | OFF | OFF | OFF | OFF | OFF | ON  | OFF | ON  | OFF | OFF |
| C | OFF | OFF | OFF | OFF | OFF | OFF | OFF | OFF | OFF | ON  |
| D | OFF | ON  | OFF | OFF | OFF | OFF | OFF | OFF | OFF | OFF |
| E | 2   |     | 1   |     | 1   |     | 1   |     | 1   |     |
| F |     |     | 1   |     | 2   |     | 2   |     | 3   |     |
| G |     |     |     |     |     |     | 1   |     | 1   |     |
| H |     |     |     |     |     |     |     |     |     | 1   |
| I |     |     | 1   |     |     |     |     |     |     |     |

FIG. 13K.

PRIMARY RAIL ZONE II' IN SLAVE MODE

| CONTROL SIGNAL | READ OTHER ZONE | WRITE OTHER ZONE | READ THIS ZONE SERIAL REG | WRITE THIS ZONE SERIAL REG | READ PARALLEL REG ZONE ADDRESS | WRITE PARALLEL REG ZONE ADDRESS | REAR PARALLEL REG SYSTEM ADDRESS | WRITE PARALLEL REG. SYSTEM ADDRESS | READ I/O | WRITE I/O |
|---|---|---|---|---|---|---|---|---|---|---|
| A | OFF | OFF | ON | OFF | ON | OFF | OFF | OFF | OFF | OFF |
| B | OFF | OFF | OFF | OFF | OFF | ON | OFF | ON | OFF | OFF |
| C | OFF | OFF | OFF | OFF | OFF | OFF | OFF | OFF | OFF | ON |
| D | FF | FF | FF | FF | FF | FF | ON | OFF | ON | OFF |
| E | | | | | | | | | | |
| F | | | 1 | | 2 | | | | | |
| G | | | | | | | 1 | | 2 | |
| H | | | | | | | | | | 2 |
| I | | | | | | | | 2 | 3 | |

FIG. 13L.

MIRROR RAIL ZONE II' IN SLAVE MODE

| CONTROL SIGNAL | READ OTHER ZONE | WRITE OTHER ZONE | READ THIS ZONE SERIAL REG | WRITE THIS ZONE SERIAL REG | READ PARALLEL REG ZONE ADDRESS | WRITE PARALLEL REG ZONE ADDRESS | REAR PARALLEL REG SYSTEM ADDRESS | WRITE PARALLEL REG. SYSTEM ADDRESS | READ I/O | WRITE I/O |
|---|---|---|---|---|---|---|---|---|---|---|
| A | OFF | OFF | ON | OFF | ON | OFF | OFF | OFF | OFF | OFF |
| B | OFF | OFF | OFF | OFF | OFF | ON | OFF | ON | OFF | OFF |
| C | OFF | OFF | OFF | OFF | OFF | OFF | OFF | OFF | OFF | ON |
| D | OFF | OFF | OFF | OFF | OFF | OFF | ON | OFF | ON | OFF |
| E | | | 1 | | 1 | | | | | |
| F | | | | 1 | | 2 | | | | |
| G | | | | | | | 1 | | 2 | |
| H | | | | | | | | | | 2 |
| I | | | | | | | 2 | | 3 | |

FIG. 130.

PRIMARY RAIL ZONE II' IN CLINK OFF

| CONTROL SIGNAL | READ OTHER ZONE | WRITE OTHER ZONE | READ THIS ZONE SERIAL REG | WRITE THIS ZONE SERIAL REG | READ PARALLEL REG ZONE ADDRESS | WRITE PARALLEL REG ZONE ADDRESS | REAR PARALLEL REG SYSTEM ADDRESS | WRITE PARALLEL REG. SYSTEM ADDRESS | READ I/O | WRITE I/O |
|---|---|---|---|---|---|---|---|---|---|---|
| A | OFF | OFF | ON | OFF | ON | OFF | ON | OFF | ON | OFF |
| B | OFF | OFF | OFF | OFF | OFF | ON | OFF | ON | OFF | OFF |
| C | OFF | OFF | OFF | OFF | OFF | OFF | OFF | OFF | OFF | ON |
| D | OFF | OFF | OFF | OFF | OFF | OFF | OFF | OFF | OFF | OFF |
| E | | | 1 | | 1 | | 1 | | 1 | |
| F | | | | 1 | 2 | | 2 | | 3 | |
| G | | | | | | 1 | | 1 | | |
| H | | | | | | | | | | 1 |
| I | | | | | | | | | | |

FIG. 13P

MIRROR RAIL ZONE II' IN CLINK OFF

| CONTROL SIGNAL | READ OTHER ZONE | WRITE OTHER ZONE | READ THIS ZONE SERIAL REG | WRITE THIS ZONE SERIAL REG | READ PARALLEL REG ZONE ADDRESS | WRITE PARALLEL REG ZONE ADDRESS | REAR PARALLEL REG SYSTEM ADDRESS | WRITE PARALLEL REG. SYSTEM ADDRESS | READ I/O | WRITE I/O |
|---|---|---|---|---|---|---|---|---|---|---|
| A | OFF | OFF | ON | OFF | ON | OFF | ON | OFF | ON | OFF |
| B | OFF | OFF | OFF | OFF | OFF | ON | OFF | ON | OFF | OFF |
| C | OFF | OFF | OFF | OFF | OFF | OFF | OFF | OFF | OFF | ON |
| D | OFF | OFF | OFF | OFF | OFF | OFF | OFF | OFF | OFF | OFF |
| E | | | 1 | | 1 | | 1 | | 1 | |
| F | | | 1 | | 2 | | 2 | | 3 | |
| G | | | | | | 1 | | 1 | | |
| H | | | | | | | | | | 1 |
| I | | | | | | | | | | |

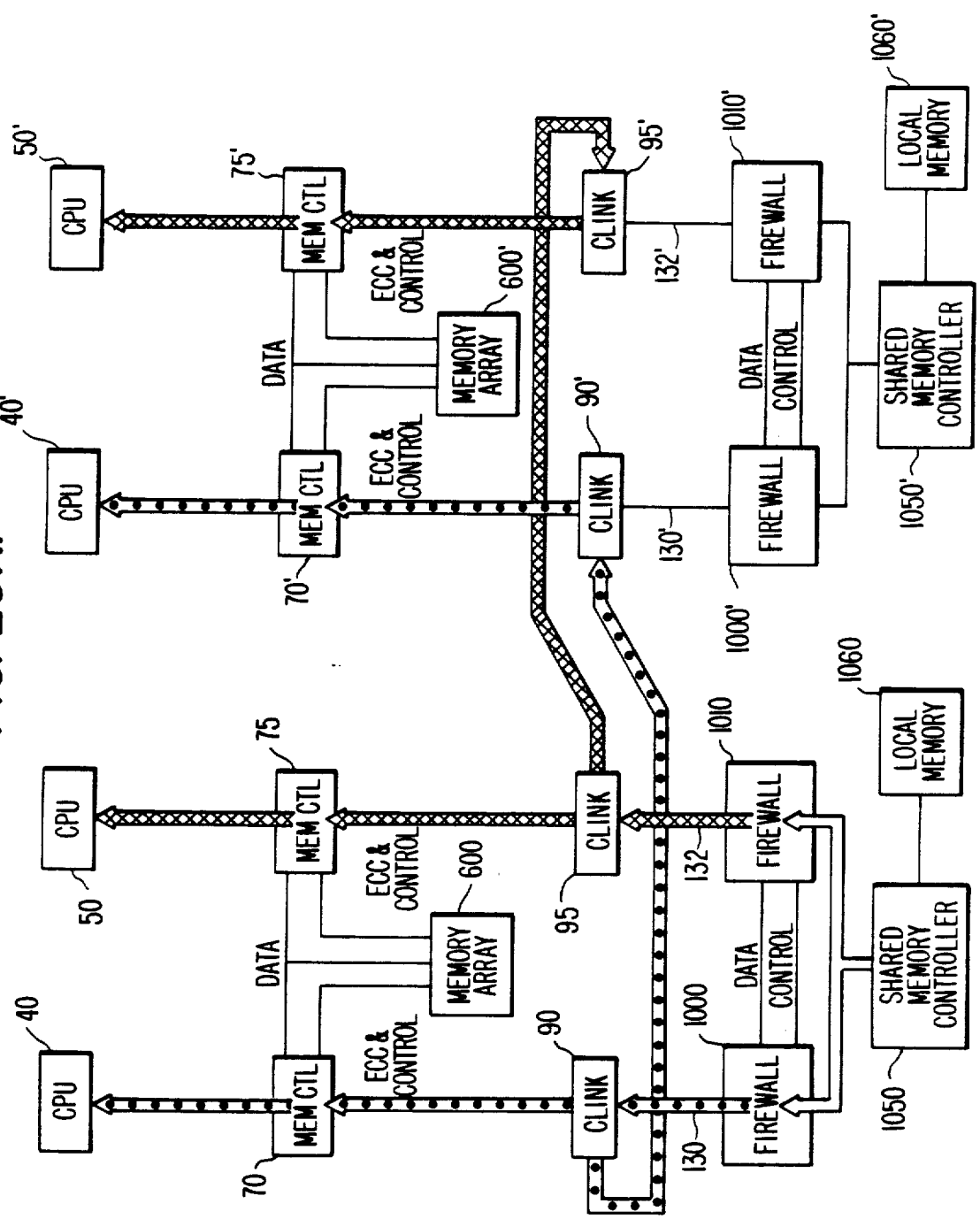

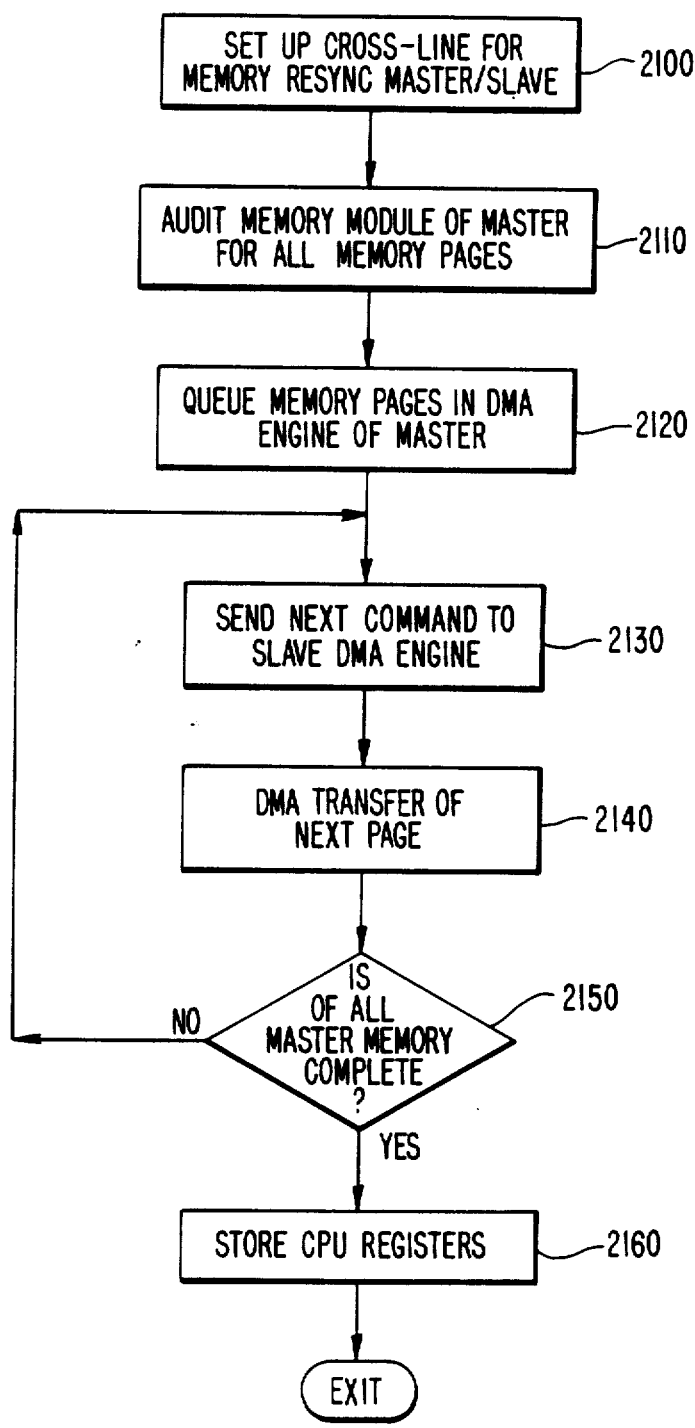

MEMORY RESYNCHRONIZATION

WARM RESTART

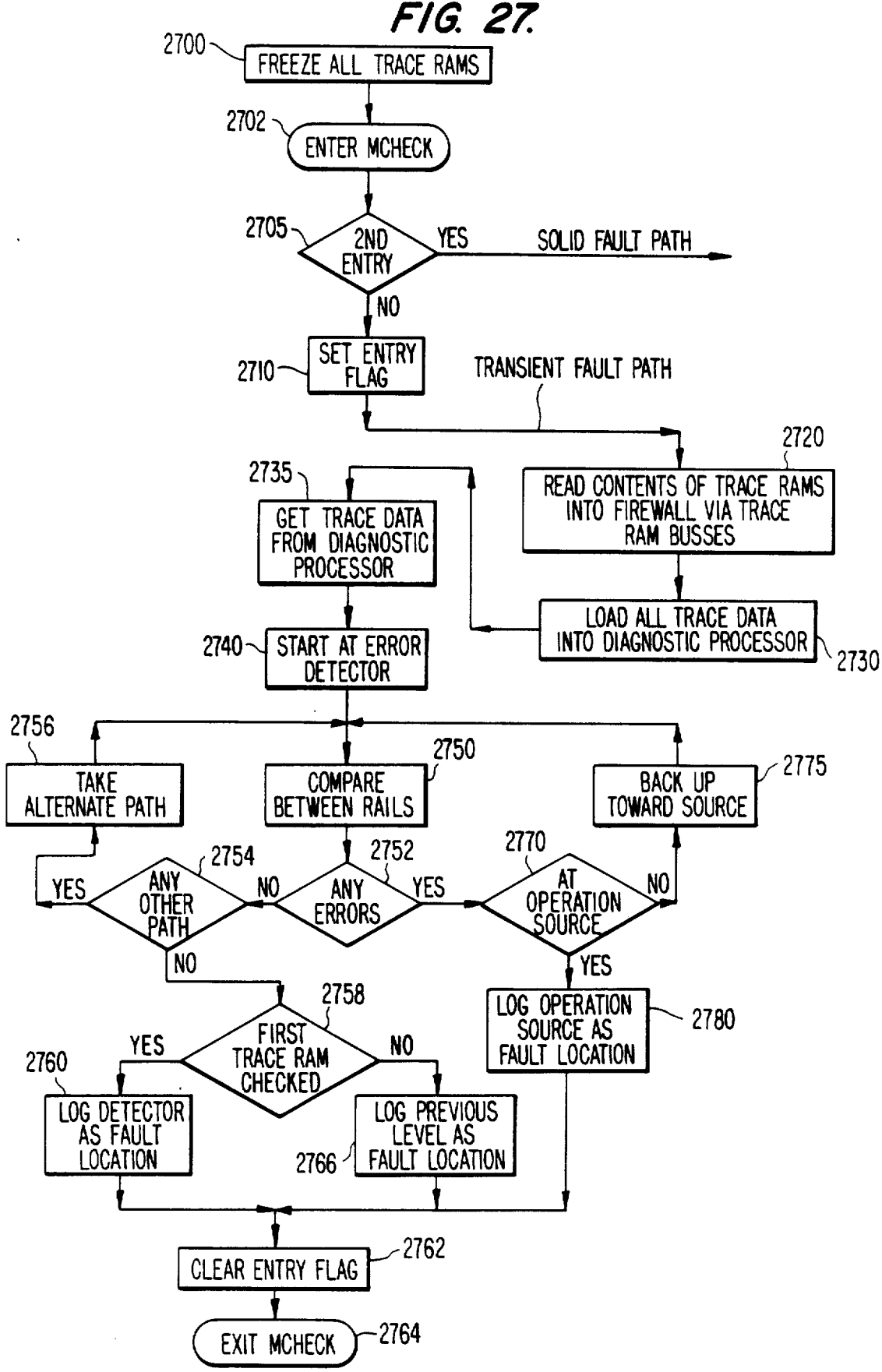

DUAL-RAIL PROCESSOR WITH ERROR CHECKING AT SINGLE RAIL INTERFACES

RELATED APPLICATIONS

This application is related to the following United States patent applications all of which were filed on Sept. 4, 1987: U.S. Ser. No. 093,548 entitled "Dual Zone, Fault Tolerant Computer System With Error Checking on I/O Writes" by William F. Bruckert and Thomas D. Bissett; U.S. Ser. No. 093,495 entitled "Dual-Rail Processors With Error Checking on I/O Reads" by William F. Bruckert and Thomas D. Bissett; U.S. Ser. No. 093,179, now abandoned, entitled "Fault Tolerant Computer System With Fault Isolation and Repair" by William F. Bruckert, Thomas D. Bissett, Dennis Mazur, John Munzer, Frank Bernaby and Jay H. Bhatia; U.S. Ser. No. 095,096, abandoned in favor of U.S. Ser. No. 382,023, entitled "Synchronized Twin Computer System" by William F. Bruckert, Thomas D. Bissett, Dennis Mazur and John Munzer; U.S. Ser. No. 093,539 entitled "Interface of Non-Fault Tolerant Components to Fault Tolerant System" by William F. Bruckert, Thomas D. Bissett, Mitchell 0. Norcross and Kenneth A. Ward.

BACKGROUND OF THE INVENTION

This invention relates to a method and system for providing a fault tolerant multiprocessor computer system.

There are computer system applications where it is important that data processing not be interrupted. Examples of such applications are the financial industry, critical industrial facilities such as nuclear plants and, in general, those situations where failure of the computer system will cause serious disruption.

Fault tolerant computer systems have been built with varying degrees of redundancy which provide duplicate systems or system components so that data processing can continue in the event of some failure. Several approaches to achieving a fault tolerant computer system may be used. In one approach, multiple multiprocessors, each with its own memory conduct independent tasks. In another approach, multiple multiprocessors share a common memory and conduct independent tasks. Another approach is to use two or more microprocessors each having its own memory and conducting identical tasks in unison. Yet another approach would be the use of two or more multiprocessors sharing a common memory and conducting identical tasks in unison.

Fault tolerant computer systems using a mixture of the four approaches are also possible. In one prior art fault tolerant system, four central processing units are used, with two operating in duplex fashion on a first board and two operating in duplex fashion on a second board. A comparator is used to detect when the outputs from each board are equal and unequal. If the comparator detects an inequality, the defective board is automatically shut down and the output is thereafter provided by the other board.

Prior art fault tolerant computer systems, however, while offering various degrees of fault tolerance, do not meet the objectives or provide the advantages resulting from the present invention.

SUMMARY OF THE INVENTION

It is the object of the invention to provide a fault tolerant computer method and system having duplicate computer systems which normally operate simultaneously. The duplication insures that there is no single point of failure and an error or fault in one of the systems will not disable the overall computer system. Moreover, all such faults can be corrected by disabling or ignoring the module or element which caused the error.

Additional objects and advantages of the invention will be set forth in part in the description which follows, and in part will be obvious from the description, or may be learned by practice of the invention. The objects and advantages of the invention may be realized and attained by means of the methods, instrumentalities and combinations particularly pointed out in the appended claims.

To achieve these and other objects and in accordance with the purpose of the invention, as embodied and broadly described herein, there is provided: a dual processor computer system with error checking comprising: a first processing system for executing a series of instructions including output instructions; a second processing system for executing said series of instructions independently of and in synchronism with said first processing system; shared resource means, coupled to said first and second processing systems, for receiving data from output instructions from said first and second processing systems substantially simultaneously; and error checking means located downstream of said shared resource means for checking the data received from said first and second processing systems only following a write operation into said shared resource means.

In one aspect of the present invention the shared resource means includes: a main memory unit, and memory controller means for controlling the transfer of data to said main memory unit.

In another aspect of the invention, the memory controller means of the dual processor computer system includes: a primary memory controller coupled to said first processing system for transferring data to said main memory unit, and a mirror memory controller coupled to said second processing system for receiving said data from said first and second processing systems, said mirror memory controller means including checking means comparing the data from the first and second processing systems for purposes of error checking, and wherein said error checking means includes said checking means in said mirror memory controller.

In yet another aspect of the invention, there is provided error isolation means, responsive to said error checking means, for analyzing said computer system to determine the cause of errors detected by said error checking means.

In another aspect of the invention, error checking means are provided which further comprises: means for comparing the address of the received data from said first processing system with the address of the received data from the second processing system.

Another aspect of the invention provides a dual processor computer system with interprocessor error checking comprising: a first central processing unit executing a series of instructions; a second central processing unit executing said series of instructions independently of and in synchronism with said first central processing unit; a first data bus coupled to said first central processing unit for receiving data from said first central processing unit; a second data bus coupled to said second central processing unit for receiving data from said second central processing unit; shared resource means, coupled to said first and second data busses, for simultaneously receiving data from said first and second central processing units, said shared resource means including data selection means for transmitting data from only one of said first and second central processing units to said shared resource; error checking means, coupled to said first and second data busses, for checking data transmitted over said first and second data busses for errors prior to receipt of said data by said shared resource; a main memory unit; memory controller means, coupled between said main memory unit and said first and second data busses, for controlling transfer of data from said first and second data busses to said main memory unit; a primary memory controller coupled to said first data bus and including means for transferring data from said first data bus to said main memory unit; a mirror memory controller coupled to said second bus and including means for comparing the data from said second data bus with the data from said first data bus for purposes of error checking, and wherein said error checking means includes said mirror memory controller and said data selection means includes said primary memory controller.

BRIEF DESCRIPTION OF THE DRAWINGS

The accompanying drawings, which are incorporated in and which constitute a part of this specification, illustrate one embodiment of the invention, and, together with the description, explain the principals of the invention.

FIGS. 20A-20E are data flow diagrams for the computer system in FIG. 1;

FIG. 21 is logic flow diagram for a Bulk Memory Transfer by the computer system in FIG. 1;

FIG. 27 is a logic flow diagram for isolation of intermittent faults for the computer system in FIG. 1.

DESCRIPTION OF THE PREFERRED EMBODIMENT

Reference will now be made in detail to a presently preferred embodiment of the invention, an example of which is illustrated in the accompanying drawings.

A. System Description

Figure 1:
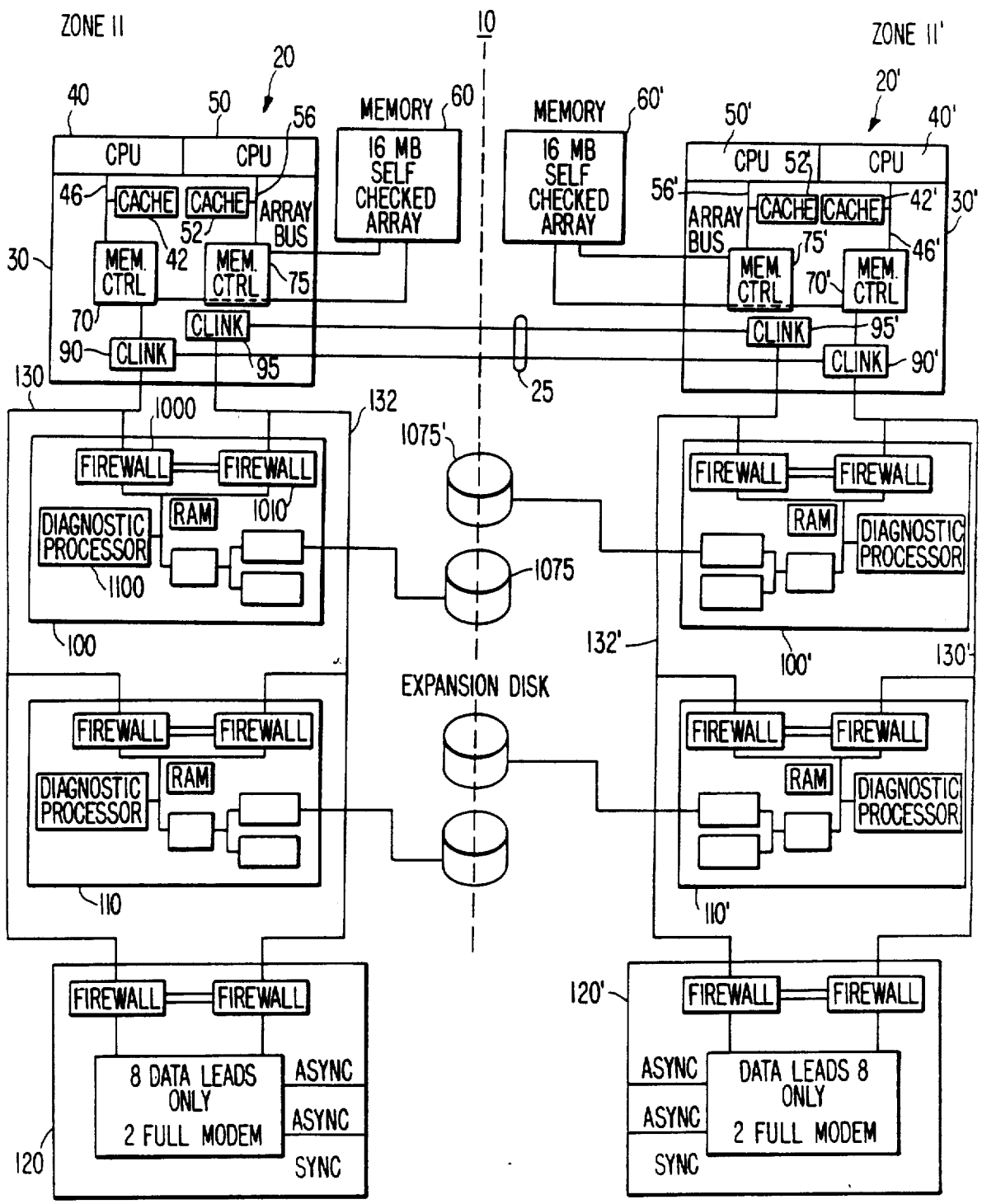
FIG. 1 is a block diagram of a fault tolerant computer system which embodies the present invention.

FIG. 1 is a block diagram of a fault tolerant computer system 10 which achieves the objects of the present invention. Fault tolerant computing system 10 includes duplicate systems, called zones or stations. In the normal mode, the zones operate simultaneously. The duplication ensures that there is no single point of failure and that an error or fault in one of the zones will not disable computer system 10. Furthermore, all such faults can be corrected by disabling or ignoring the module or element which caused the fault. The two zones 11 and 11' are shown in FIG. 1 as including duplicate processing systems 20 and 20'. The duality, however, goes beyond the processing system.

Figure 2:
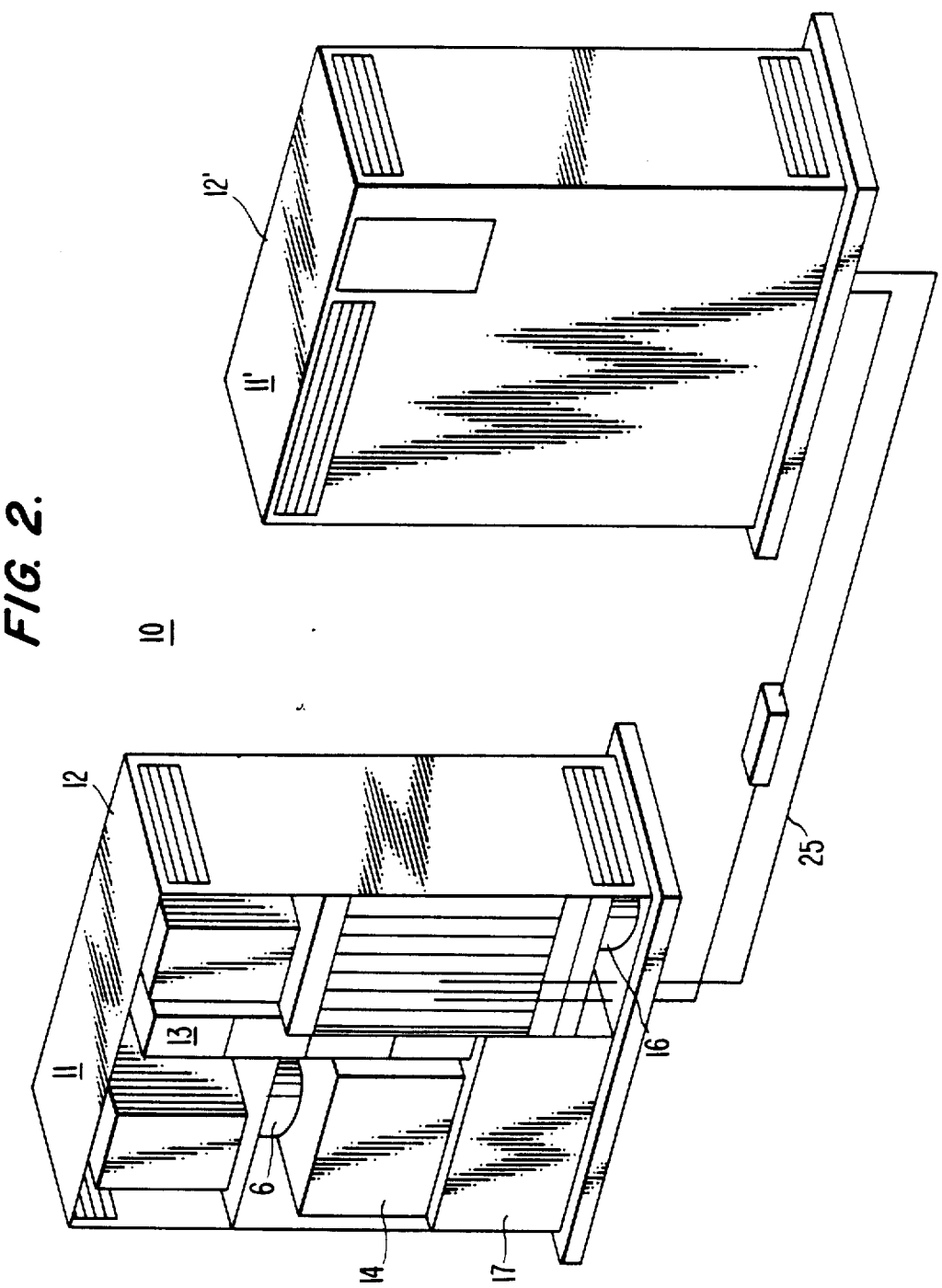
FIG. 2 is an illustration of the physical hardware containing the fault tolerant computing system in FIG. 1.

FIG. 2 contains an illustration of the physical hardware of fault tolerant computing system 10 and graphically illustrates the duplication of the systems. Each zone 11 and 11' is housed in a different cabinet 12 and 12', respectively. Cabinet 12 includes battery 13, power regulator 14, cooling fans 16, and AC input 17. Cabinet 12' includes separate elements corresponding to elements 12-14, 16 and 17 of cabinet 12.

As explained in greater detail below, processing systems 20 and 20' include several modules interconnected by backplanes. If a module contains a fault or error, that module may be removed and replaced without disabling computing system 10. This is because processing systems 20 and 20' are physically separate, have separate backplanes into which the modules are plugged, and can operate independently of each other. Thus modules can be removed from and plugged into the backplane of one processing system while the other processing system continues to operate.

The duplicate processing systems 20 and 20' are identical and contain identical modules. Thus, only processing system 20 will be described completely with the understanding that processing system 20' operates equivalently.

Figure 3:
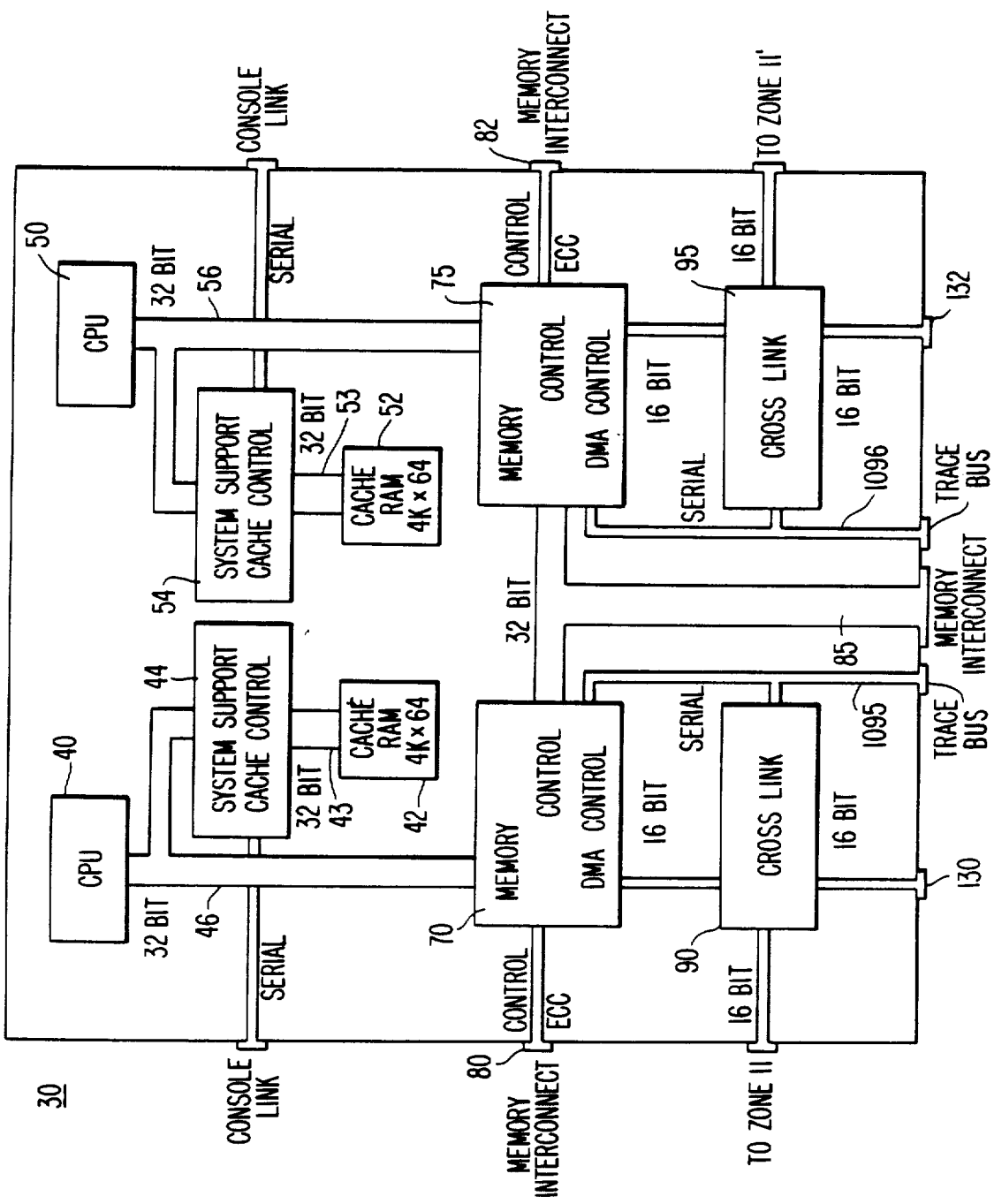
FIG. 3 is a block diagram of CPU module in the fault tolerant computing system shown in FIG. 1.
Figure 4:
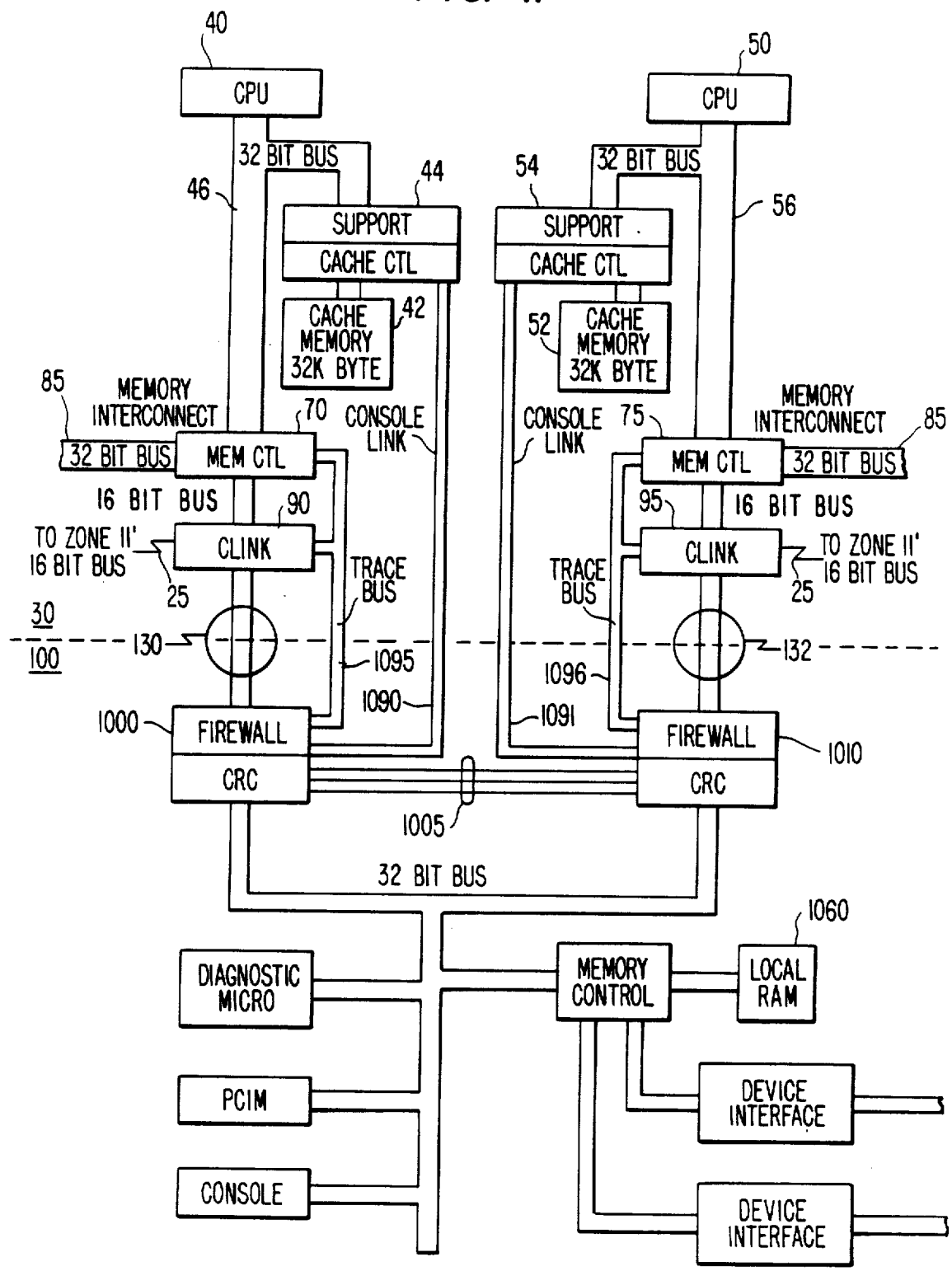
FIG. 4 is a block diagram of an interconnected CPU module and I/O module for the computer system shown in FIG. 1.

Processing system 20 includes CPU module 30 which is shown in greater detail in FIGS. 3 and 4. CPU module 30 is interconnected with CPU modules 30' in processing system 20' by a cross-link pathway 25 which is described in greater detail below. Cross-link pathway 25 provides data transmission paths between processing systems 20 and 20' and carries timing signals to ensure that processing system 20 and 20' operate synchronously.

Figure 17:
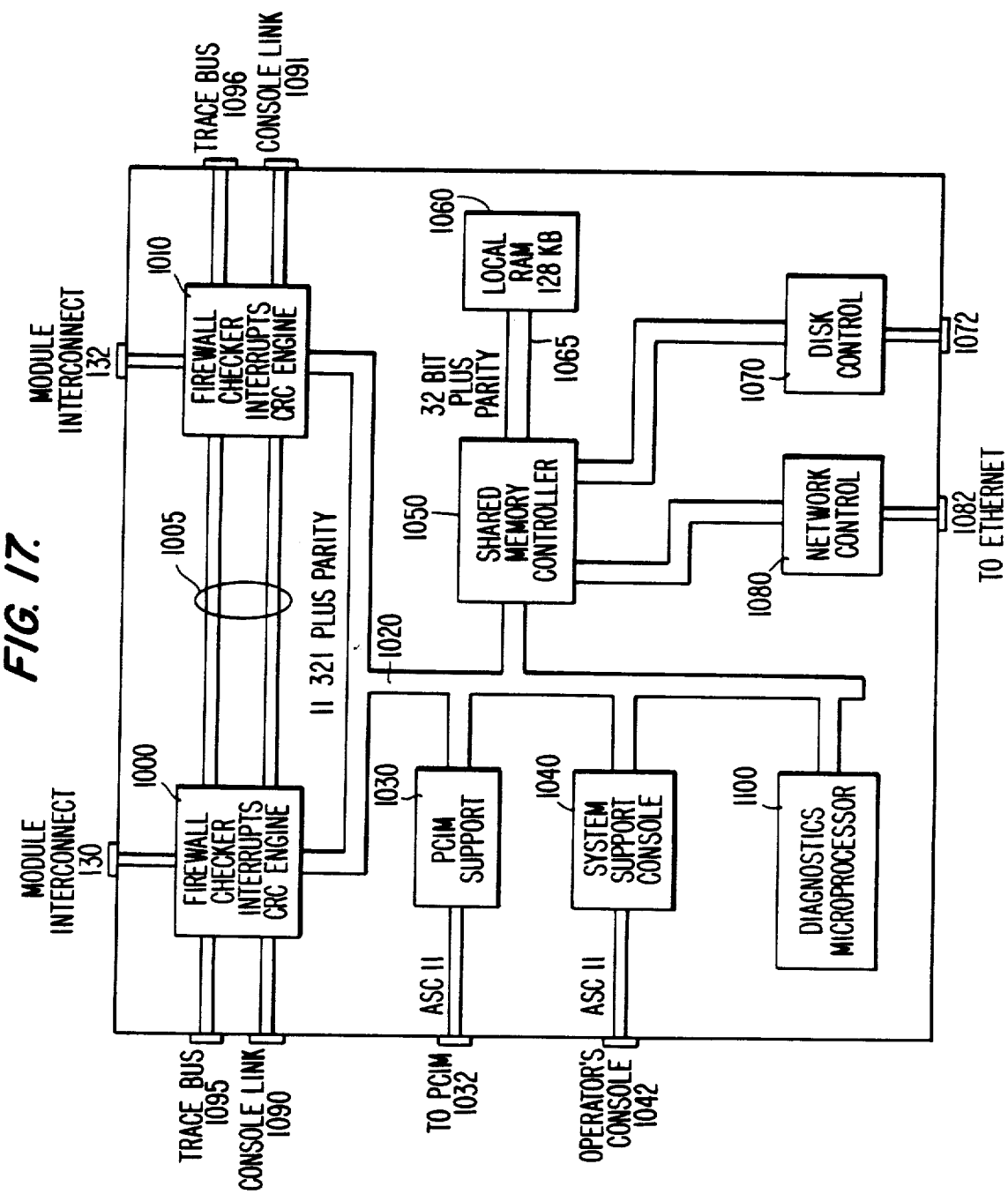
FIG. 17 is a block diagram of an I/O module for the computer system of FIG. 1.

Duplicative processing system 20 also includes I/O modules 100, 110, and 120, which are shown in greater detail in FIGS. 3 and 17. Each of the I/O modules 100, 110 and 120 is connected to CPU module 30 by dual rail module interconnects 130 and 132. Module interconnects 130 and 132 act as a backplane for processing system 20.

B. Fault Tolerant System Philosophy

Fault tolerant computing system 10 does not have a single point of failure because each element is duplicated. Processing systems 20 and 20' are each a fail stop processing system which means that those systems can detect faults or errors in the subsystems and prevent their propagation to other subsystems in an uncontrolled manner.

The two fail stop processing systems 20 and 20' are interconnected by certain elements operating in a defined manner to form a fail safe system. In the fail safe system embodied as fault tolerant computing system 10, the entire computing system can continue processing even if one of the fail stop processing systems 20 and 20' is faulting.

Generally, the two fail stop processing systems 20 and 20' operate in lock step synchronism. There are three significant exceptions. The first is at initialization when a bootstrapping technique, explained in detail below, brings both processors into synchronism. The second exception is when the processing systems 20 and 20' operate independently (asynchronously) on two different workloads. The third exception occurs when certain errors arise in processing systems 20 and 20'. In this last exception, one of processing systems or modules is disabled, thereby ending synchronous operation.

The synchronism of duplicate processing systems 20 and 20' is implemented by treating each system as a deterministic machine which, upon receipt of the same inputs and starting in the same known state, will always enter the same machine state and produce the same results unless there is some error. Processing systems 20 and 20' are configured identically, receive the same inputs, and therefore pass through the same states. Thus, as long as both processors operate synchronously, they should produce the same results and enter the same state. If the processing systems are not in the same state or produce different results, it is assumed that one of the processing systems 20 and 20' has faulted. The source of the fault must then be isolated in order to take corrective action, such as disabling the faulting module.

Error detection generally involves overhead in the form of additional processing time or logic. To minimize such overhead, a system should check for errors as infrequently as possible consistent with fault tolerant operation. At the very least, error checking must occur before data is outputted from CPU modules 30 and 30'. Otherwise, internal processing errors may cause improper operation in external systems, like a nuclear reactor, which is the condition that fault tolerant systems are designed to prevent.

There are reasons for additional error checking. For example, to isolate faults or errors it is desirable to check the data received by CPU modules 30 and 30' prior to storage or use. Otherwise, when erroneous stored data is later accessed and additional errors result, it becomes difficult or impossible to find the original source of errors, especially when the erroneous data has been stored for some time. The passage of time as well as subsequent processing of the erroneous data may destroy any trail back to the source of the error.

"Error latency," which refers to the amount of time an error is stored prior to detection, may cause later problems as well. For example, a seldom-used routine may uncover a latent error when the computer system is already operating with diminished capacity due to a previous error. When the computer system has diminished capacity, the latent error may cause the system to crash.

Furthermore, it is desirable in the dual rail systems of processing systems 20 and 20' to check for errors prior to transferring data to single rail systems, such as a shared resource like memory. This is because there are no longer two independent sources of data after such transfers, and if any error in the single rail system is later detected, then error tracing becomes difficult if not impossible.

MODULE DESCRIPTION

1. CPU Module

The elements of CPU module 30 which appear in FIG. 1 are shown in greater detail in FIGS. 3 and 4. FIG. 3 is a block diagram of the CPU module, and FIG. 4 shows block diagrams of CPU module 30 and I/O module 100 as well as their interconnections. Only CPU module 30 will be described since the operation of and the elements included in CPU modules 30 and 30' are the same.

CPU module 30 contains dual CPUs 40 and 50. CPUs 40 and 50 can be standard central processing units known to persons of ordinary skill. In the preferred embodiment described in the specification, CPUs 40 and 50 are VAX ® processors manufactured by Digital Equipment Corporation, the Assignee of this application.

Associated with CPUs 40 and 50 are cache memories 42 and 52, respectively, which are standard cache RAMs of sufficient memory size for the CPUs. In the preferred embodiment, the cache RAM is 4K×64 bits. It is not necessary for the present invention to have a cache RAM, however.

Serving as an interface between CPU 40 and cache 42 is a system support and cache control element 44, and serving as an interface between CPU 50 and cache 52 is a system support and cache control element 54. Elements 44 and 54 are identical and each provides a standard interface between the corresponding cache and CPU and also provides conventional peripheral functions such as interval timers. Cache busses 43 and 53 couple CPUs 40 and 50, respectively, to system support and cache control modules 52 and 42, respectively.

2. Memory Module

Figure 5:
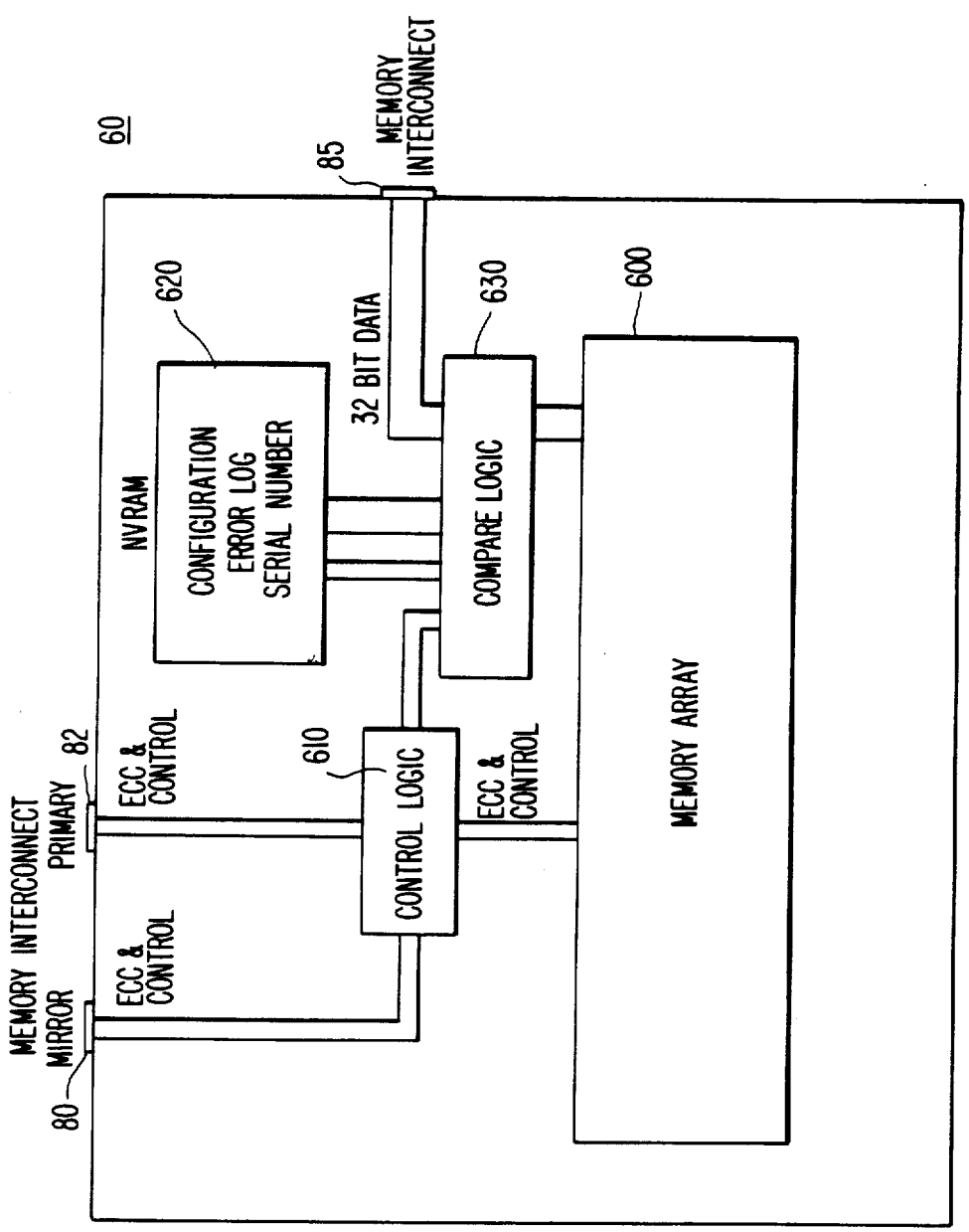
FIG. 5 is a block diagram of a memory module for the fault tolerant computer system shown in FIG. 1.
Figure 6:
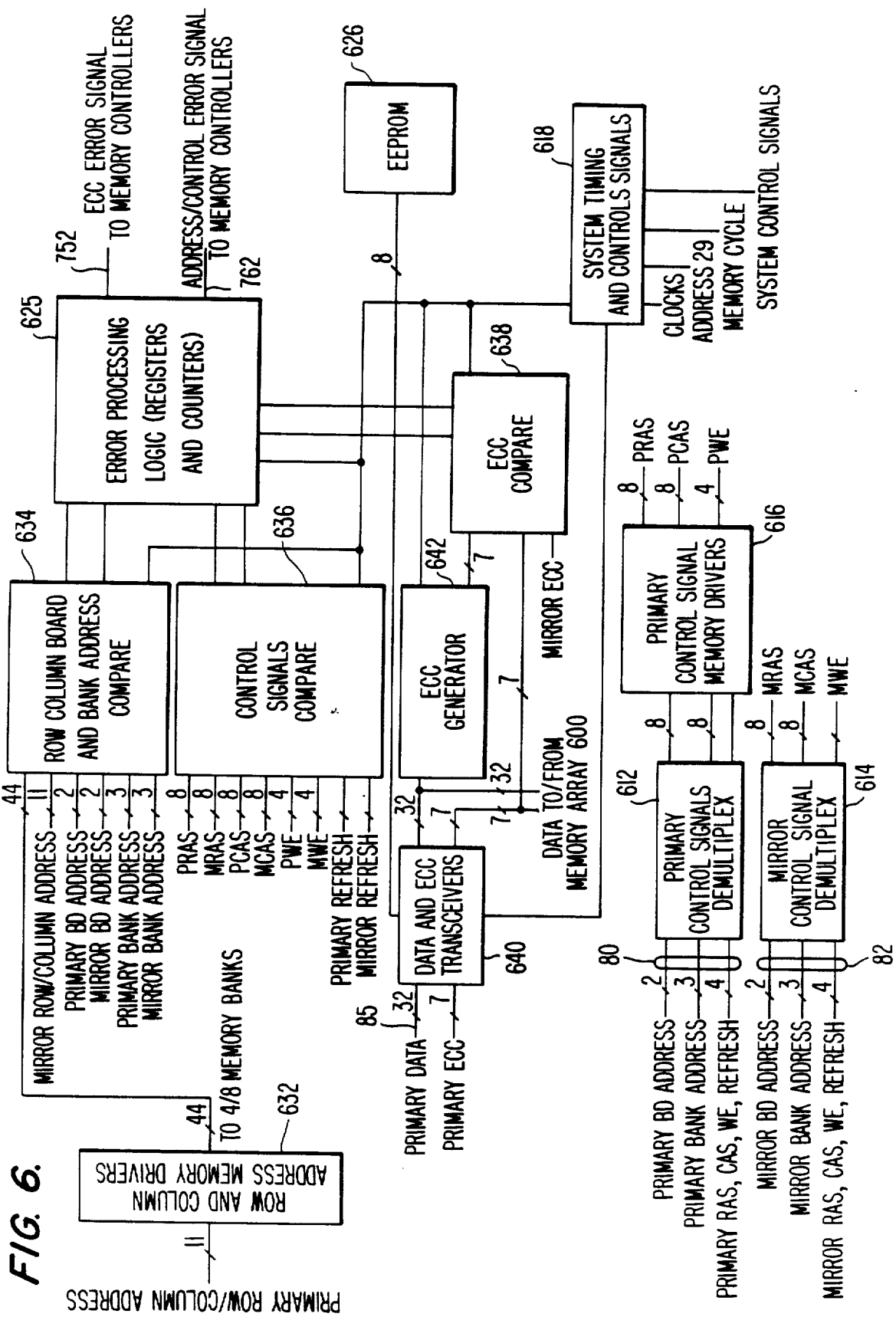
FIG. 6 is a detailed diagram of the elements of the memory module shown in FIG. 5.

Preferably, CPUs 40 and 50 can share up to four memory modules 60. FIG. 5 is a block diagram of one memory module 60 and FIG. 6 is a detailed diagram showing specific memory elements of module 60.

Memory module 60 receives data from primary memory controller 70 via a 32 bit bidirectional memory bus 85. Memory module 60 also receives address/control signals from memory controllers 70 and 75 via busses 80 and 82, respectively. Busses 80 and 82 include row and column address signals as well as timing and control signals such as RAS (Row Address Strobe), CAS (Column Address Strobe), WE (Write Enable), and Refresh signals.

As shown in FIG. 5, memory module 60 includes a memory array 600. Memory array 600 is preferably a standard RAM which is addressable by row and column addresses. In the preferred embodiment, memory array 600 can include up to eight banks of memory.

Control logic 610 routes the addresses and memory control signals and generates timing and internal control signals. As shown in greater detail in FIG. 6, control logic 610 includes a primary control signal demultiplexer 612, mirror control signal demultiplexer 614, primary control signals driver 616, and system timing control signal generator 618. Primary control signal demultiplexer 612 receives the primary board address and primary bank address signals as well as the primary RAS, CAS, WE and Refresh signals from primary memory controller 70. If the primary board address signals identify a particular board, that board is then active and demultiplexer 612 for that board generates two sets of eight control signals from the RAS, CAS, Refresh, and three-bit bank address signals. These eight control signals become the eight PRAS (Primary RAS) and eight PCAS (Primary CAS) signals from the primary control signal drivers 616. Drivers 616 boost those signals to drive the different memory banks. For the active memory board, demultiplexer 612 demultiplexes and forms four copies of the WE signal which are boosted by driver 616 to form the four PWE (primary WE) signals. During refresh operations, all boards are active.

Mirror control signal demultiplexer 614 operates equivalently for the mirror signals. Since the mirror signals are not fed to the different boards but instead are merely used for error detection, they do not need drivers.

System timing/control signal generator 618 receives four types of inputs: clock signals; memory cycle signals, such as the write, read and refresh timing; certain other system control signals well known to persons of ordinary skill in the art; and address bit 29. Address bit 29 determines whether the address signals identify an access to memory space (i.e., in memory array 600), or I/O space (one of the I/O devices or system registers). System timing control signal generator 618 then controls the coordination and timing of the other elements of memory module 60 described below.

The configuration error log 620 shown in FIG. 5 stores information relevant to errors detected in the operation of memory module 60. Specifically, if an error is detected by compare logic 630, then configuration error logic 620 stores the necessary information to identify the faulty address and or data. Compare logic 630, however, only checks control and address signals, not memory data signals.

Memory Data signals are checked using an Error Detecting Code (EDC).. The preferred implementation is to use the same code as required by the memory controllers 70 and 75, which is preferably a single bit correcting, double bit detecting, error correcting code (ECC).

As shown in FIG. 6, configuration error logic 620, includes error processing logic 625 and EEPROM 626. Error processing logic 625 comprises an error counter, control logic and four storage registers, one for the primary address, one for the secondary address, one for the ECC, and one for a data word. Logic 625 generates error signals from the outputs of compare logic 630 as explained in detail below. Preferably, when an error condition is detected, the counter increments and the registers in logic 625 stores the primary and mirror memory addresses, ECC, and associated data word. EEPROM 626, which can be any type of NVRAM (nonvolatile RAM), stores memory error data for off-line diagnostics. When the memory module has been removed after it faulted, the stored data is extracted from EEPROM 626 to determine the cause of the fault.

Compare logic 630 provides error detection by comparing the ECC, control, and address signals from the primary memory controller 70 to those from the mirror memory controller 75 in order to detect any inequality between those signals. Compare logic 630 is shown in greater detail in FIG. 6 and includes row and column address memory drivers 632, address comparator 634, control signal comparator 636, ECC signal comparator 638, data and ECC transceivers 640, and ECC generator 642.

Row and column address memory drivers 632 receive the eleven-bit row and column address signals and produce four copies of each signal to provide sufficient signal strength for all the memory banks of memory array 600.

The four copies of each primary row and column address signals are inputs to address comparator 634, as are the mirror row and column address signals. In the preferred implementation of memory module 60, both the row and the column addresses are eleven bits long and are transmitted along busses 80 and 82 in alternate cycles. Thus, for each memory address there can be two sequential comparisons.

Address comparator 634 simultaneously compares the 44 primary row and column address signals and the eleven mirror row and column address signals using eleven 5-input exclusive OR gate circuits, each corresponding to a different signal. The exclusive OR gates circuits enable their outputs if any of the inputs are different. Similarly, address comparator 634 compares the primary board address signals to the mirror board address signals, and the primary bank address signals to the mirror bank address signals, all of which are also inputs into demultiplexers 612 and 614.

System timing and control generator 618 controls the timing of address comparator 634 to ensure that the comparisons occur when the input signals are settled. The results of the comparisons are inputs to the error processing and control logic circuitry 625. If address comparator 634 finds any of the corresponding signals to be different from the others, circuitry 625 notes the error and takes the appropriate action by sending address/control error signal 762 to memory controllers 70 and 80.

Control signal comparator 636 operates similarly to address signal comparator 634. Control signal comparator 636 compares the PRAS to the MRAS signals, the PCAS to the MCAS signals, the PWE to the MWE signals, and the Primary Refresh signals to the Mirror Refresh signals. Control signal comparator 636 is timed in much the same way as address comparator 634, and when a comparison error is noted, error processing and control logic circuitry 625 notes the error and sends an address/control error signal to memory controllers 70 and 75.

ECC comparator circuit 638 operates slightly differently from comparators 634 and 636. For write operations, ECC comparator 638 receives seven bit primary ECC data from Data and ECC transceivers 640. Transceivers 640 buffer the data and ECC signals for memory array 600. ECC comparator 638 then compares the ECC signals from transceivers 640 with ECC signals formed by ECC generator 642 from 32-bit primary data signals at the outputs of transceivers 640.

ECC comparator 638 also compares the mirror ECC signals received from the mirror memory controller 75 to the primary ECC signals received from the primary memory controller 70. If either ECC comparison indicates an inequality, then error processing and control logic 625 notes the error and sends an ECC error signal 752 to memory controllers 70 and 75. In a manner similar to comparators 634 and 636, ECC comparator 638 is timed so that comparison occurs when the input signals are settled.

For read operations, 32 bit data and seven bit ECC are read from the memory array 600. In addition, ECC generator 642 creates a seven bit ECC from the 32 bit data which ECC comparator 638 compares to a seven bit ECC from 600. ECC comparator 638 is also timed to ensure that comparison occurs when the input signals are settled. If an inequality occurs, then error processing and control logic 625 notes the error and sends an ECC error signal 752 to memory controllers 70 and 75.

As explained above, error processing logic 625 also saves the primary and mirror address of the first ECC error that occurs during a read operation. An ECC error count in the counter in logic 625 is set to 1 for the first occurrence. Any subsequent ECC read errors will increment the ECC error count in memory module 60. CPUs 40 and 50 periodically poll the stored address and count information in the memory module as part of their normal diagnostic testing. Part of the polling process clears these registers to allow the next address with an ECC error to be trapped. When CPUs 40 and 50 write corrected data to the trapped address these "soft errors" from memory array 600 are corrected.

3. Memory Controllers.

As indicated above, memory module 60 does not perform any comparison of the data signals into memory. Primary and mirror memory controller 70 and 75 perform such a comparison. Memory controllers 70 and 75 control the access of CPUs 40 and 50, respectively, to memory module 60. The primary memory controller 70 is shown in greater detail in FIG. 7 and the mirror memory controller 75 is shown in greater detail in FIG. 8. Although memory controllers 70 and 75 are shown with slight differences in FIGS. 7 and 8, preferably they are identical for flexibility. The figures are drawn differently to simplify their explanation.

Figure 7:
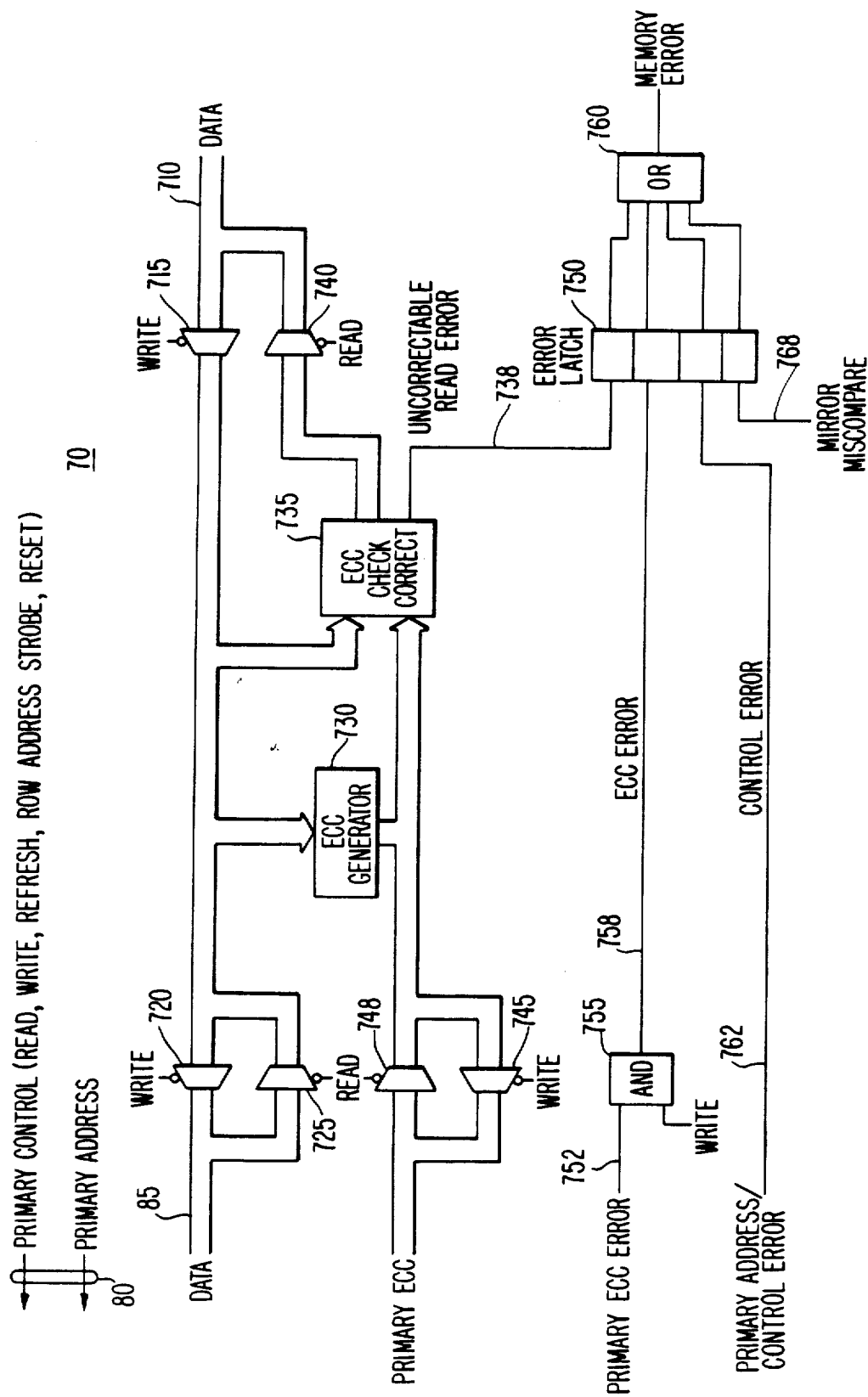
FIG. 7 is a block diagram of the primary memory controller of the CPU module shown in FIG. 3.

As shown in FIG. 7, primary control and address lines pass through primary memory controller 70 directly to memory module 60. Primary control signals on memory interconnect 80 are also processed and decoded by circuitry (not shown) to form all necessary timing and internal control signals, such as READ and WRITE.

Data lines 710 pass through write buffers 715 and 720 into memory interconnect 85 during write operation.

During read operations, the data from memory module 60 on memory interconnect 85 passes through read buffer 725 and is an input to ECC generator 730 and ECC check/correct circuit 735. The output of ECC check/correct circuit 735 is an input to read buffer 740 whose output connects to data lines 710.

ECC generator 730 generates an ECC for the data received from data lines 710 to be written into memory module 60. The ECC from generator 730 is the primary ECC signal sent to memory module 60 through write buffer 745.

The primary ECC signal received from memory module 60 during a read operation is sent through read buffer 748 into ECC check/correct circuit 735. ECC check/correct circuit 735 checks the ECC generated from the data received from memory interconnect 85 to detect errors. Circuit 735 corrects single bit errors and sends the corrected data out through read buffer 740. If ECC check/correct circuit 735 determines that it cannot correct the error, then it sends an uncorrectable read error signal 738 to error latch 750 which stores that signal.

The other inputs to error latch 750 are an ECC error signal 758 received from AND gate 755. AND gate 755 has as inputs the primary ECC error signal 752 (from error processing and control logic 625) and a WRITE signal. Since ECC check/correct circuit performs error detection and correction for read operations, AND gate 755 assures that primary ECC errors are only noted during write operations.

Another input into error latch 750 is the primary address/control error signal 762 from error processing and control logic 625. The remaining input into error latch 750 is a mirror miscompare signal 768. Mirror miscompare signal 768 is received from mirror memory controller 75 when its comparators detect a mismatch between the signals sent to memory module 60 from primary memory controller 70 and from mirror memory controller 75.

The signals stored in error latch 750 are each stored as a data bit. Those bits are inputs to an OR gate 760 which enables a primary memory error signal if any of the bits in error latch 750 are enabled.

Figure 8:
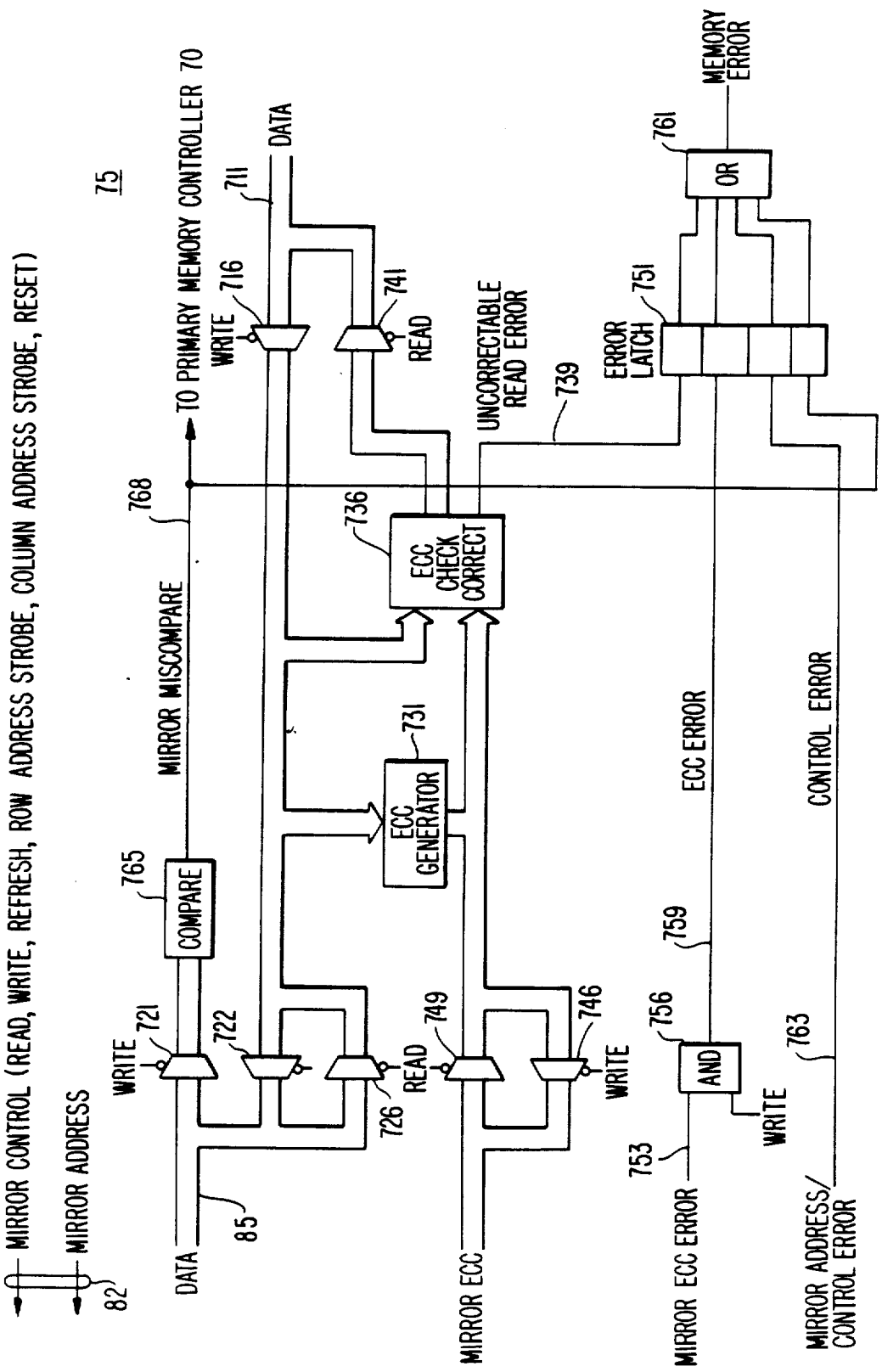
FIG. 8 is a block diagram of the mirror memory controller in the CPU module of FIG. 3.

The details of mirror memory controller 75 are shown in FIG. 8. Mirror address and control signals 82 pass through and are decoded in mirror memory controller 75 just as the corresponding primary control signals 80 pass through primary memory controller 70. Data lines 711 are received through write buffer 716 and are an input to comparator 765. These data lines are also an input to ECC generator 731 which creates the mirror ECC signal. The mirror ECC signal is sent to memory module 60 by way of write buffer 746.

Data lines 711 may also be sent to memory module interconnect 85 via write buffer 722 if controller 75 needs to act as a primary controller. In general, however, only one set of data signals is to memory module 60, and buffer 722 is normally disabled.

Data is received into memory controller 75 on memory interconnect 85 from memory module 60 during both read and write operations. During write operations, the data on memory interconnect 85 is the same data as primary memory controller 70 sends to memory module 60. That data is received through write buffer 721 into comparator 765. If during write operations, the data from primary memory controller 70 is not equal to the data from mirror memory controller 75, then comparator 765 enables mirror miscompare signal 768 which is an input both to error latch 750 in primary memory controller 70 as well as to error latch 751 in mirror memory controller 75.

During read operations, data from memory module 60 is received from interconnect 85 through read buffer 726 and is then an input to ECC check/correct circuit 736. The mirror ECC signal received from memory module 60 is received through read buffer 749 and is also an input to ECC, check/correct circuit 736. Similar to ECC check/correct circuit 735 in primary memory controller 70, ECC check/correct circuit 736 corrects all single bit errors prior to outputting data onto data line 711 through read buffer 741. If ECC check/correct circuit 736 cannot correct an error, it enables an uncorrectable read error signal 739 which is stored in error latch 751 in a manner similar to that of latch 750 in primary memory controller 70.

Error latch 751 also stores an ECC error signal 759 from AND gate 756, which combines mirror ECC error signal 753 from memory module 60 and the WRITE signal, and mirror address/control error signal 763 from error processing logic and control 625 in memory error module 60. The outputs of error latch 751 are inputs to OR gate 761. OR gate 761 enables a mirror memory error signal if any of the bits in error latch 751 are enabled.

Processing system 20' is a dual rail system internally. One rail includes CPU 40, cache memory 42, memory controller 70, and internal bus 46. The other rail includes CPU 50, cache memory 52, memory controller 75, and internal bus 56. Memory module 60, however, is a shared resource. The memory module 70 and 75 thus provide a dual rail-to-single rail interface for memory module 60. Thus, in accordance with the philosophy of this invention set forth in Section B of this Description section, error checking is provided at this interface. In the preferred embodiment, such error checking involves two different techniques. First, the data signals from CPU 50 into memory controller 75 are not written into memory module 60, but are instead compared to the data signals from CPU 40 through memory controller 70. Memory controller 75 performs this comparison and an error check on the data sent to memory module 60. Memory module 60 compares the addresses, control signals and ECC's from memory controllers 70 and 75 to detect any inequality. The second error checking technique involves memory controllers 70 and 75 generating their own ECC from the memory data.

Another feature of this invention is the correction of single bit memory errors by memory controllers 70 and 75 instead by of having such errors cause a system fault. This technique accommodates single bit memory errors which are common, for example, from alpha particle bombardment. Correcting such errors reduces system fault time and allows the use of single, shared memory modules. Noting the occurrence and location of errors permits later diagnostics. For example, it may be desirable to replace a memory board which experiences more than a predetermined number of such correctable errors.

Figure 9:
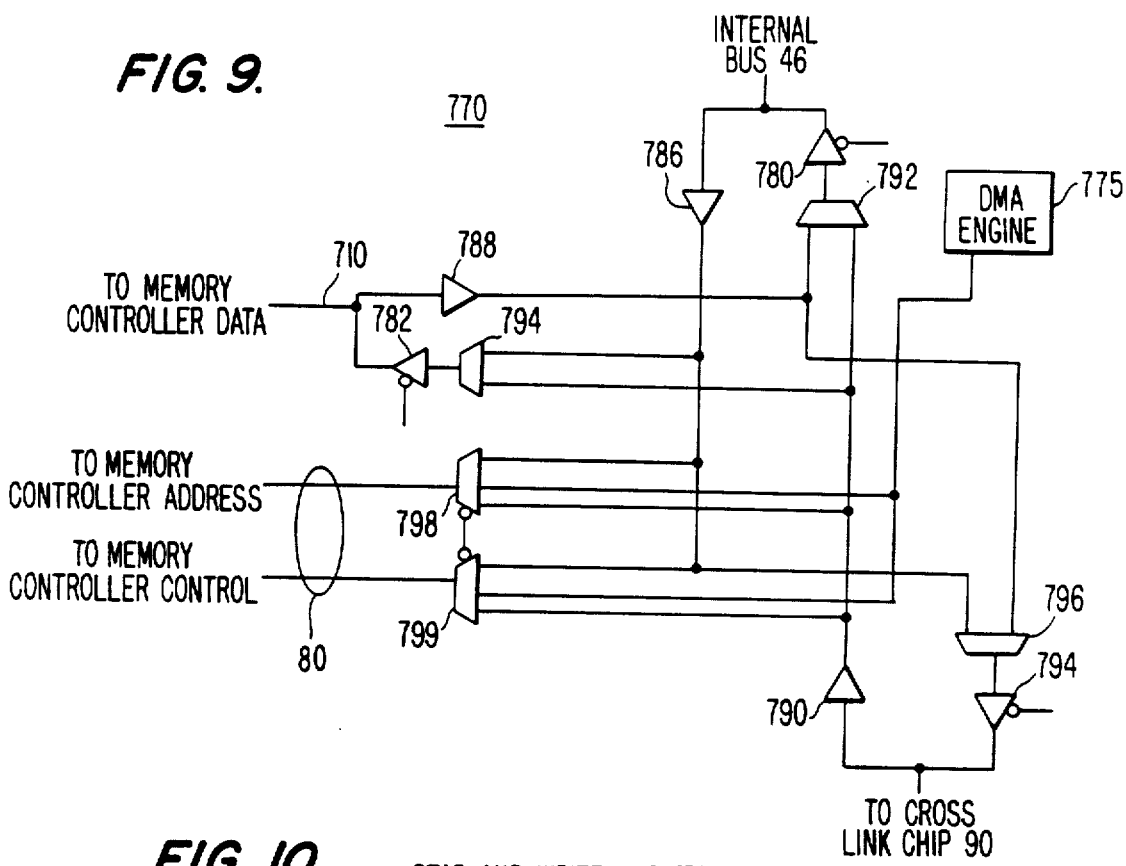
FIG. 9 is an interface circuit of the memory controller shown in FIGS. 7 and 8.

The interface between memory module 60 and both the primary and memory controllers 70 and 75 is shown generally at the left hand portion of FIGS. 7 and 8. FIG. 9 shows an interface circuit 770 of memory controller 70 with internal bus 46 and cross-link 90. An identical interface circuit is contained in memory controller 75.

Interface circuit 770 is also connected to a DMA engine 775 which provides address and command signals for a direct memory access path to memory module 60. A detailed understanding of the general operation of DMA engine 775, which is preferably of conventional design, is not necessary for an understanding of the present invention. DMA engine 775 includes one counter with addresses for DMA transfer and another counter to keep track of the number of transfers. The address counter is incremented and the transfer number counter is decremented after each transfer.

One important feature of DMA engine 775 is that the corresponding CPU generates the address signals and control signals for DMA engine 775 operations to ensure that received data is written into the proper locations. Thus, an I/O or peripheral unit cannot generate an erroneous address, which might have disastrous consequences especially if the erroneous address causes I/O data to be written over system information or other data.

Buffer 786 receives data from CPU 40 via internal bus 46. Buffer 788 receives data from memory controller 70 via data lines 710. Buffer 790 receives data from cross-link 90.

In interface circuit 770, driver 780 provides a data path to internal bus 46 and CPU 40 when activated. Driver 780 is activated either for CPU reads of memory module 60 or reads of I/O. Multiplexer 792, which provides an input to driver 780, selects as the data for internal bus 40 either an input from buffer 788 if CPU 40 is reading memory, or an input from buffer 790 if CPU 40 is reading data from an I/O device.

Driver 782 provides a data path to memory controller 70 and is activated either for CPU writes to memory module 60, DMA writes to memory module 60, or memory resync (slave) operations. Memory resync operations are described in detail below. Those operations are used to ensure that the contents of memory modules 60 and 60' are set equal to each other. In memory resync operations, the module receiving data is the "slave" and the module sending data is the "master". Multiplexer 794, which provides an input to driver 782, selects as the data for memory module 60 either an input from buffer 786 if the operation being performed is a CPU memory write, or an input from buffer 790, if the operation is either a DMA write or a memory resync (slave) operation.

Buffer 784 provides a data path to cross-link 90 and is activated for writes to an I/O device, for DMA reads of memory, or for memory resync (master) operations. Multiplexer 796, which provides an input to buffer 784, selects as the data for cross-link 90 either an input from buffer 788 if the operation is a DMA read of memory, or an input from buffer 786 if the operation is an CPU write to an I/O device or a memory resync (master) operation.

Muliplexers 798 and 799 provide addresses and control signals, respectively, to memory interconnect 80. Both multiplexers 798 and 799 select as the source for such address and control signals either the output of buffer 786 for memory operations that do not involve DMA or memory resync (slave) operations, the output of DMA engine 775 for DMA operations, or the output of buffer 790 for memory resync (slave) operations.

4. Cross-link

Data for memory resync, DMA and I/O operations pass through cross-links 90 and 95. Generally, cross-links 90 and 95 provide communications between CPU module 30, CPU module 30', I/O modules 100, 110, 120, and I/O modules 100', 110', 120'. Since cross-links 90 and 95 are identical, only the elements and operation of cross-link 90 will be described.

Figure 10:
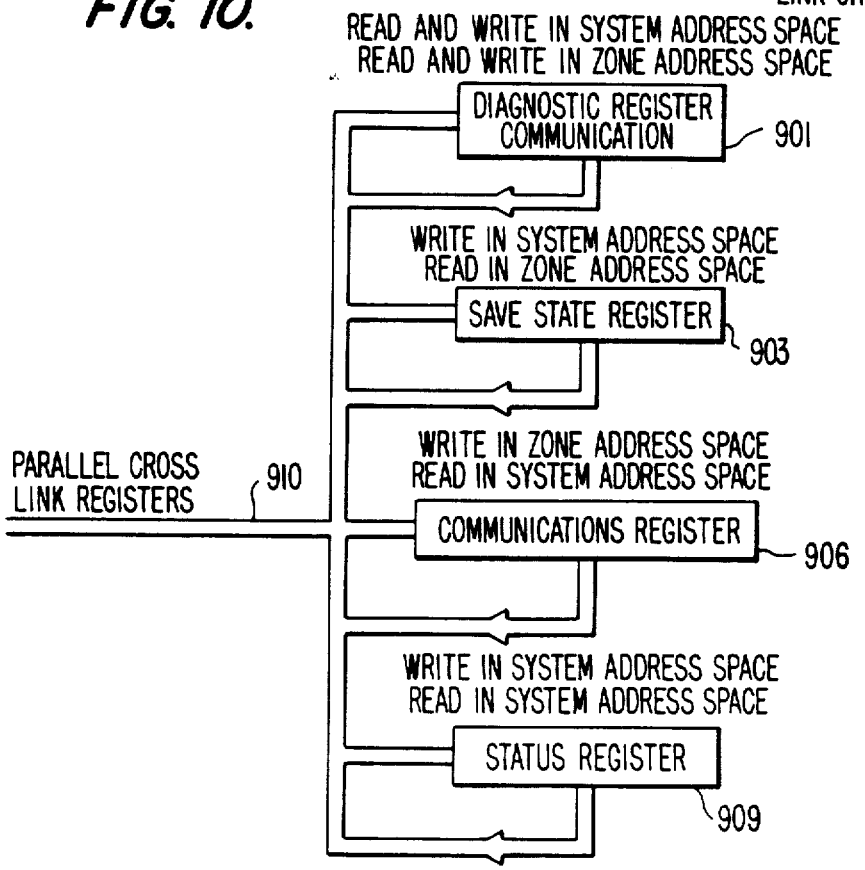
FIG. 10 is a drawing of the parallel registers of the cross-link of the CPU module shown in FIG. 3.
Figure 11:
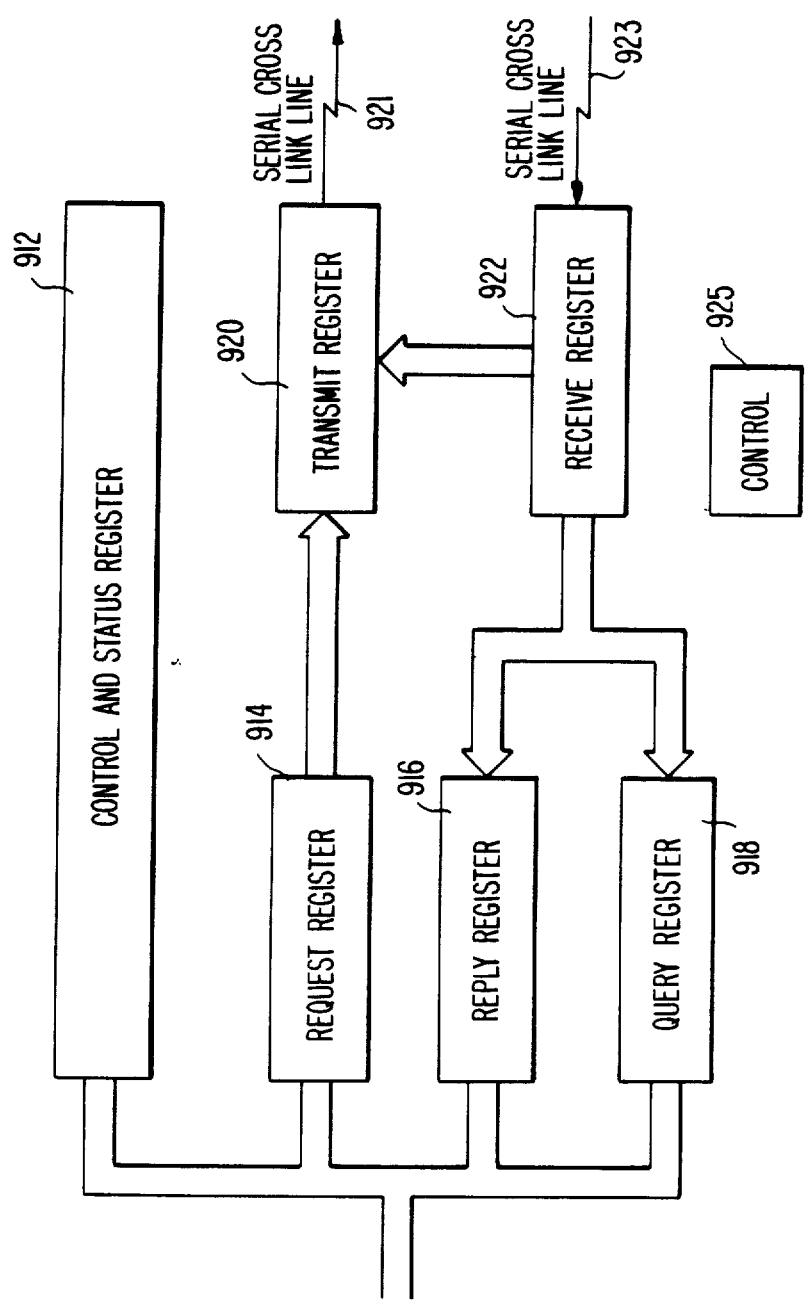
FIG. 11 is a drawing showing the serial registers for the cross-link of the CPU module shown in FIG. 3.

Cross-link 90 contains both parallel registers and serial registers shown in FIGS. 10 and 11, respectively. Both types of registers are used for interprocessor communication in the preferred embodiment of this invention. During normal operation, processors 20 and 20' are synchronized and data is exchanged in parallel between processing systems 20 and 20' by the parallel registers in cross-links 90/95 and 90'/95', respectively. When processing systems 20 and 20' are not synchronized, most notably during bootstrapping, data is exchanged by way of serial registers.

The parallel registers shown in FIG. 10 include a crosslink diagnostic communication register 901, a save state register 903, a communications register 906, and status register 909. The addresses of the parallel registers are in I/O space. Within I/O space, those addresses can either be in system address space or zone address space. The term "system address space" refers to addresses that are accessible throughout the entire system 10, and thus by both processors 20 and 20'. The term "zone address space" refers to addresses which are accessible only by the zone containing the particular crosslink.

A cross-link DCR (Diagnostic Communications Register) 901 resides in cross-link 90 and provides the capability of exchanging information and activating diagnostics in zone 11 from zone 11'. Cross-link DCR 901 is preferably a 32 bit register organized as follows:

| BITS | MEANING |
|---|---|
| 31 | Receive Flag |
| 30:24 | [Reserved: all zeroes] |
| 23:16 | Receive Data |
| 15 | Transmit Flag |
| 14:8 | [Reserved: all zeroes] |
| 7:0 | Transmit Data |

The cross link can produce an interrupt to both zones and can be for reception of data by the other zone or for making data available for the present zone. The DCR can only be used when the I/O modules are in lock-step and the cross-links are in a master/slave mode. One zone, the master zone, controls the I/O device of the other zone, the slave zone, and the cross-link in the slave zone is used for communications. The cross-link DCR in the master zone is not used. The interrupts generated go to both the slave zone CPUs and to the master zone CPUs. Each zone makes its own choice whether to use interrupts or polling for transmitting and receiving data.

If zone 11 controls all the I/O devices, it talks to zone 11' through the following sequence:
1. Write bits 23:16 to zone 11' cross-link DCR.
2. Enable interrupts (zone 11' parallel status register 909).
3. Wait for interrupt.
4. Transmitter Empty interrupt reports that zone 11' has read zone 11's cross-link DCR.
5. Receiver Full Interrupt reports that zone 11' is responding.

Zone 11' uses its serial status register to set up its own interrupts as described below. Its parallel status register 909 is unavailable since it was given to zone 11 along with the I/O devices when the cross-link was set in slave mode.

As is apparent, the address of the cross-link DCR must be in both system and zone address space for reading and writing. Specifically, each zone must be able to read individually from its own cross-link DCR (zone address space) as well as the other zone's cross-link DCR (system address space). Similarly, each zone must be able to write to both its own and the other zone's DCR.

Save state register 903 contains state information for rebooting processing system 20. CPUs 40 and 50 write such information to save state register 903 in the system address space since data is stored in register 903 during synchronous operations. In order to reboot into a synchronous operation it is necessary to write the same state information to the cross-links 90 and 95 and to cross links 90' and 95'. Since bootstrapping is an asynchronous operation, each CPU 40 and 50 accesses only its own cross-link. Thus, status register 903 is read from zone address space.

Communications register 906 contains unique data to be exchanged between zones. Such data is usually asynchronous data, such as a memory soft error count which is unique to each zone. Because the data in register 906 is unique, the address of communications register 906 for writing is in zone address space. If the address were in system space, the information would be written into communications registers in both zones and no longer be unique.

The address of communications register 906 for reading, however, is in system address space. Thus, during synchronous operation, both zones can simultaneously read the communications register from one zone and then simultaneously read the communications register from the other zone.

Status register 909 contains several status bits for the cross-link 90. Status register 909 is preferably 32 bits long with the following bit assignments:

| BITS | VALUE | MEANING |
|---|---|---|
| 31:14 | 0 | [Reserved] |
| 13 | 1 | Set interrupt enables (Bits 10-12) |
| 12 | 1 | Enable DCR buffer empty interrupt |
| 11 | 1 | Enable DCR receive interrupt |
| 10 | 1 | Enable clock phase error interrupt |
| 9 | 1 | DCR buffer empty flag. Set to 0 when DC is written; set to 1 when DCR is read. |
| 8 | 1 | DCR receive full flag. Set 1 when all DCR is written; set to 0 when DCR is read. |
| 7:6 | X | Clock phase error bits set on clock phase error and reset through serial status register. |
| 5 | 0 | |
| 4:3 | 00 | Normal bus operation (read only) |
| | 01 | Memory resync slave |
| | 10 | Memory resync master |
| | 11 | Duplex sync request |
| 2 | 0 | |
| 1:0 | 00 | Cross-link off (read only) |
| | 01 | Cross-link on slave |
| | 10 | Cross-link on master |
| | 11 | Cross-link on duplex |

The memory resync operation, and clock phase errors are explained in detail below. The slave, master and duplex modes identified by bits 0 and 1 refer to the type of cross-link communication between processing systems 20 and 20'.

"Cross-link off" refers to the state when no communication between 20 and 20' is allowed with the parallel cross-link 910. This mode assumes no synchronization between the zones. "Crosslink on slave" refers to the state a zone uses to give its module interconnect to the other zone. If zone A is in "crosslink on slave," zone B will be in "cross-link on master." Thus CPUs 40' and 50' will have control over module interconnects 130 and 132 as well as 130' and 132'. CPUs 40 and 50 have no access to interconnects 130, 132, 130', and 132." "Cross-link on slave" and "crosslink on master" assume synchronization between module interconnects but not between CPUs.

"Cross-link on duplex" allows both CPUs 40 and 40' to control module interconnects 130 and 130' and CPUs 50 and 50' to control interconnects 132 and 132'. "Cross-link on duplex" assumes synchronization of CPUs as well as synchronization of I/O interconnects. Synchronization of CPUs requires that all memory registers and bus cycles of both zones be identical. Any uniqueness of data must be handled through the communication register 906. Synchronization of the module interconnect implies that cross-links 90, 95, 90', and 95' are driving their respective module interconnects 130, 132, 130' and 132' with same or compatible bus cycle.

When cross-link 90 is in "master mode", CPUs 40 and 50 are controlling all four module interconnects 130, 132, 130' and 132'. In order for CPUs 40 and 50 to check the status of crosslink 90' and 95', status register 909's read and write addresses are in the system address space.

Save state register 903, communications register 906, and status register 909 all contain interface circuitry which allows them to transfer information on a single parallel register bus 910. Parallel register bus 910 allows the remainder of crosslink 90 to communicate with the parallel registers.

The serial registers are shown in FIG. 11. All of the serial cross-link registers are in the zone specific space since they are used for asynchronous communication. The purpose of the serial cross-link registers and the serial cross-link is to allow processors 20 and 20' to communicate even though they are not running in lock step synchronization (i.e., phase-locked clocks and same memory states).

The serial cross-link comprises six registers and a controller 925. The registers include control and status register 912, serial cross-link request register 914, serial cross-link reply register 916, serial cross-link query register 918, serial cross-link transmit register 920, and serial cross-link receive register 922. Transmit register 920 is coupled to serial crosslink transmit line 921, and receive register 922 is coupled to serial cross-link receive line 923. Controller 925 coordinates the operation of the serial registers.

Control and status register 912 includes a copy of all the information stored in parallel cross-link registers as well as status and control flags. The contents of control and status register 912 are as follows:

| BITS | VALUE | MEANING |
| --- | --- | --- |
| 31:27 | 0 | Reserved |
| 26 | X | Zone ID (read only) |
| 25 | X | Clock phase detector errors (read/write) (write 1 to clear) |
| 24 | 1 | Cross-link DCR buffer empty (read only) clear by writing the DCR |
| 23 | 1 | Cross-link DCR receive full (read only) clear by reading the DCR |
| 22 | 1 | Serial transmitter busy (any activity requested by either zone) (read only) |
| 21:20 | 00 | Automatic response to other zone (read only) |
|  | 01 | Sending loopback request from this zone |
|  | 10 | Sending status read request from this zone |
|  | 11 | Sending query from this zone |
| 19 | 1 | Transmit buffer empty |
| 18 | 1 | Serial reply overflow (read only) Reset by reading cross-link reply register |
| 17 | 1 | Serial reply full (read only) Reset by reading cross-link reply register |
| 16 | 1 | Serial query overflow (read only) Reset by reading cross-link query register |
| 15 | 1 | Serial query full (read only) Reset by reading cross-link query register |
| 14 | 1 | Set interrupt enables (write) |
| 13 | 1 | Enable cross-link DCR buffer empty interrupt (read/write) |
| 12 | 1 | Enable cross-link DCR receive interrupt (read/write) |
| 11 | 1 | Enable clock phase error interrupt (read/write) |
| 10 | 1 | Enable transmit complete interrupt (read/write) |
| 09 | 1 | Enable reply reception interrupt (read/write) |
| 08 | 1 | Enable query reception interrupt (read/write) |
| 07:06 | 00 | No function |
|  | 01 | Loopback request |
|  | 10 | Status read request |
|  | 11 | Send CPU query request |
| 05 | 1 | Set resync state (activates 04:03) (write) |
| 04:03 | 00 | Normal bus operation (read/write) |
|  | 01 | Memory resync slave |
|  | 10 | Memory resync master |
|  | 11 | Duplex sync request |
| 02 | 1 | Set cross-link state (activates 01:00) (write) |
| 01:00 | 00 | Cross-link off (read/write) |
|  | 01 | Cross-link on slave |
|  | 10 | Cross-link on master |
|  | 11 | Cross-link on duplex |

The functions of register 912 and the other serial registers can be understood from an explanation of the serial crosslink operations. One of those operations is a loopback. Loopback operation involves processor 20', but occurs without any coordination of that processor. Setting a loopback request flag in serial control and status register 912 causes the contents of the serial request register 914 to be sent to crosslink 90' (i.e. either 90' or 95') in zone 11'. Cross-link 90' returns the message to serial reply register 916. This loopback feature allows verification of the cross-link cable and permits one zone to confirm that the other zone has power.

Another operation is a status read which allows the crosslink in one zone to read the status of the other zone's crosslink. Setting a status read request flag in serial control and status register 912 causes request register 914 to send a request for status information to cross-link 90'. Upon receipt of this message, cross-link 90' sends the contents of its serial control and status register 912' to serial reply register 916 in cross link 90.

A third capability is data transfer feature which is a general purpose cross-link data transfer. After writing the data to be transferred (32 bits in the preferred embodiment) into serial cross-link request register 914, setting a CPU query request flag in serial control and status register 912 sends the contents of request register 914 to cross-link 90' which holds those contents in query register 918'. No automatic response is generated, but the data is available to CPU 40'. Any response by CPU 40' will be sent to the serial query register 918 of cross-link 90.

A final capability provided is serial interrupt and status. In the preferred embodiment, the serial cross-link can generate interrupts based on the following events:
Serial Request and Transmission Complete;
Serial Reply Complete (for loopback or status reply);
Serial Query Reception Complete;
Diagnostic Communication Register Data Available;
Diagnostic Communication Register Buffer Empty; and
Inter-zone Clock Phase Error.
The interrupts may be individually masked with a single common interrupt vector.

Furthermore, in the present embodiment, certain status bits in control and status register 912 relate to the status of the serial link and the resynchronization states of the machine. These bits are as follows:
Cross-link Synchronization State;
Enabled Interrupt;
Pending Interrupt; and
Receiver Overflow Indicators.

Figure 12:
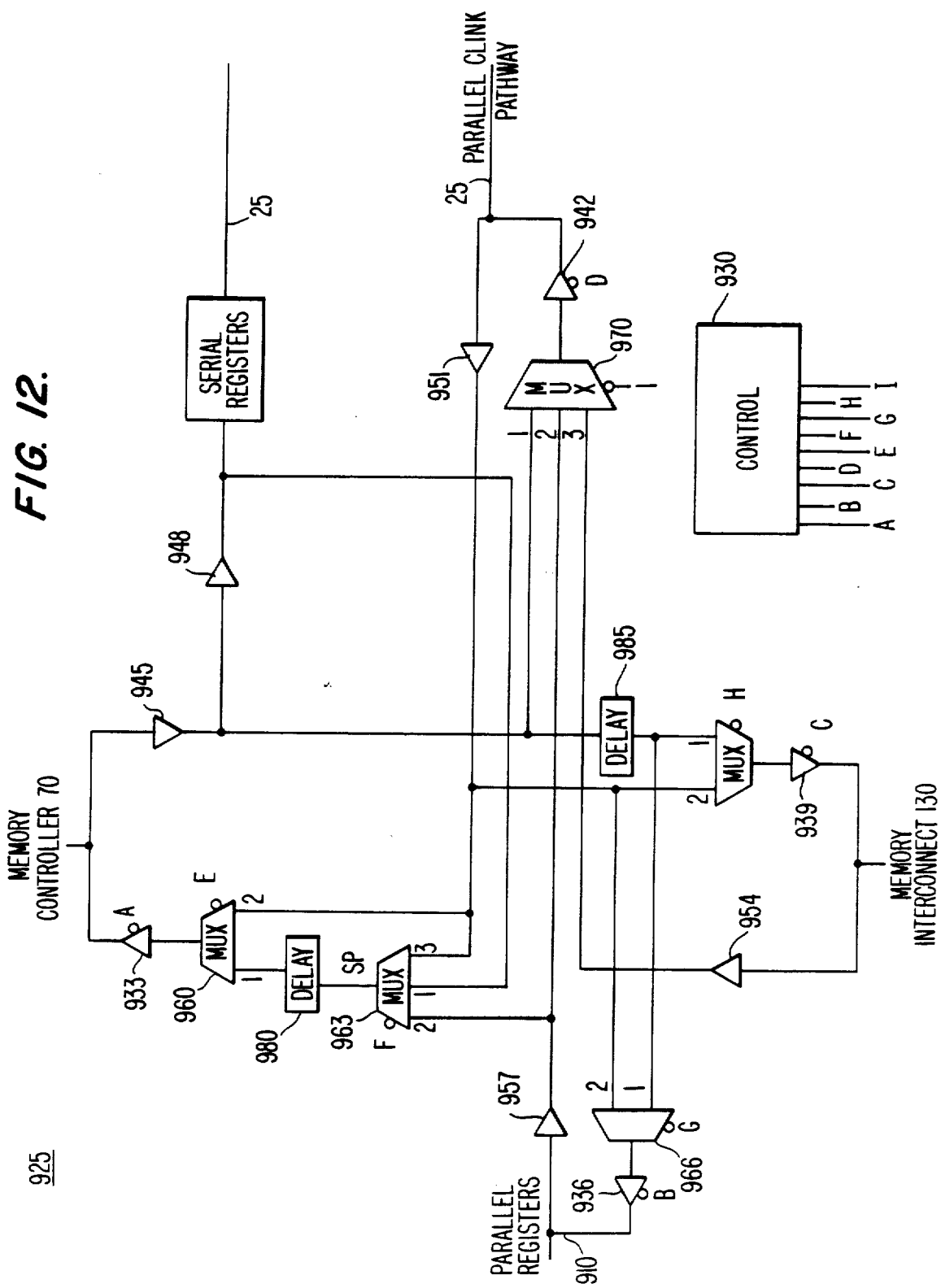
FIG. 12 is a block diagram of the elements of the controller for the cross link of the CPU module shown in FIG. 3.

Controller 925 of cross-link 90 is shown in FIG. 12. Control decoder 930 in controller 925 produces signals A-I according to rules set forth in detail below. Control 925 includes drivers, buffers, multiplexers, and delay elements. The delay elements are added for synchronization. Because of the high speed operation of computer system 10 as well as the tight synchronization requirements, the cross-links must compensate for inherent signal delays such as cable runs to maintain proper operation and synchronization. For example, as explained below in greater detail, during a read from I/O, each CPU module receives data from I/O modules in different processing systems 20 and 20'. Because data from the different systems take different paths, such operations could cause a failure to synchronize. The delay elements compensate for the signal delays and path differences to preserve synchronization. As shown in FIG. 12, the delay elements in cross-link 90 are used to slow down an input to a multiplexer when the other input is from parallel cross-link pathway 25.

In controller 925, driver 933 is enabled by signal A to transmit data to memory controller 70. Driver 936 is enabled by signal B to transmit data to the parallel registers by way of parallel register bus 910. Driver 939 is enabled by signal C to transmit data to module interconnect 130. Driver 942 is enabled by signal D to transmit data to parallel cross link pathway 25.

The buffers in control 925 are used to receive externally generated data. Buffer 945 receives data from memory controller 70 and buffer 948 transmits that data at the output of buffer 945 to the serial registers. Buffer 951 receives data from the parallel cross-link pathway 25. Buffer 957 receives data from the parallel registers via parallel register bus 910.

The multiplexers each select different data sources for specific destinations. Multiplexer 960 is controlled by signal E and receives parallel cross link pathway 25 data from buffer 951 and multiplexer 963 from delay element 980 and multiplexer 963. The output of multiplexer 960 is sent to memory controller 70 through driver 933.

Multiplexer 963 is controlled by signal F and receives inputs from parallel register bus 910 via buffer 957, from the serial registers, and from module interconnect 130 via buffer 954. The output of multiplexer 963 is an input to multiplexer 960 after passing through delay element 980.

Multiplexer 966 is controlled by signal G and receives inputs from the parallel cross-link pathway 25 via buffer 951 and from memory controller 70 via buffer 945 and delay element 985. The output of multiplexer 966 is sent to parallel register bus 910 through driver 936.

Multiplexer 969 is controlled by signal H and receives parallel cross-link pathway 25 data by way of buffer 951 and memory controller 70 data by way of buffer 945 and delay element 985. The output at multiplexer 969 is set to interconnect 130 via driver 939.

Multiplexer 970 is controlled by signal I and receives inputs from the parallel registers via bus 910 and buffer 957, from memory controller 70 via buffer 945, and from module interconnect 130 via buffer 954. The output of multiplexer 970 is sent to the parallel cross-link pathway 25 by way of driver 942.

The states of the signals A-D, and the selection codes E-I depend upon the operation to be performed, the cross-link modes (i.e., duplex, master or slave) and the cross-link states (on/off), and whether the cross-link is on the primary rail (i.e., coupled to the primary memory controller 70) or on the mirror rail (i.e., coupled to the mirror memory controller 75).

Generally, there are ten functions that need to be performed:
Read Other Zone;
Write Other Zone;
Read Serial Register of this Zone;
Write Serial Register of this Zone;
Read Parallel Register Zone Address;
Write Parallel Register Zone Address;
Read Parallel Register System Address;
Write Parallel Register System Address;
Read I/O; and
Write I/O.

Figure 13H:
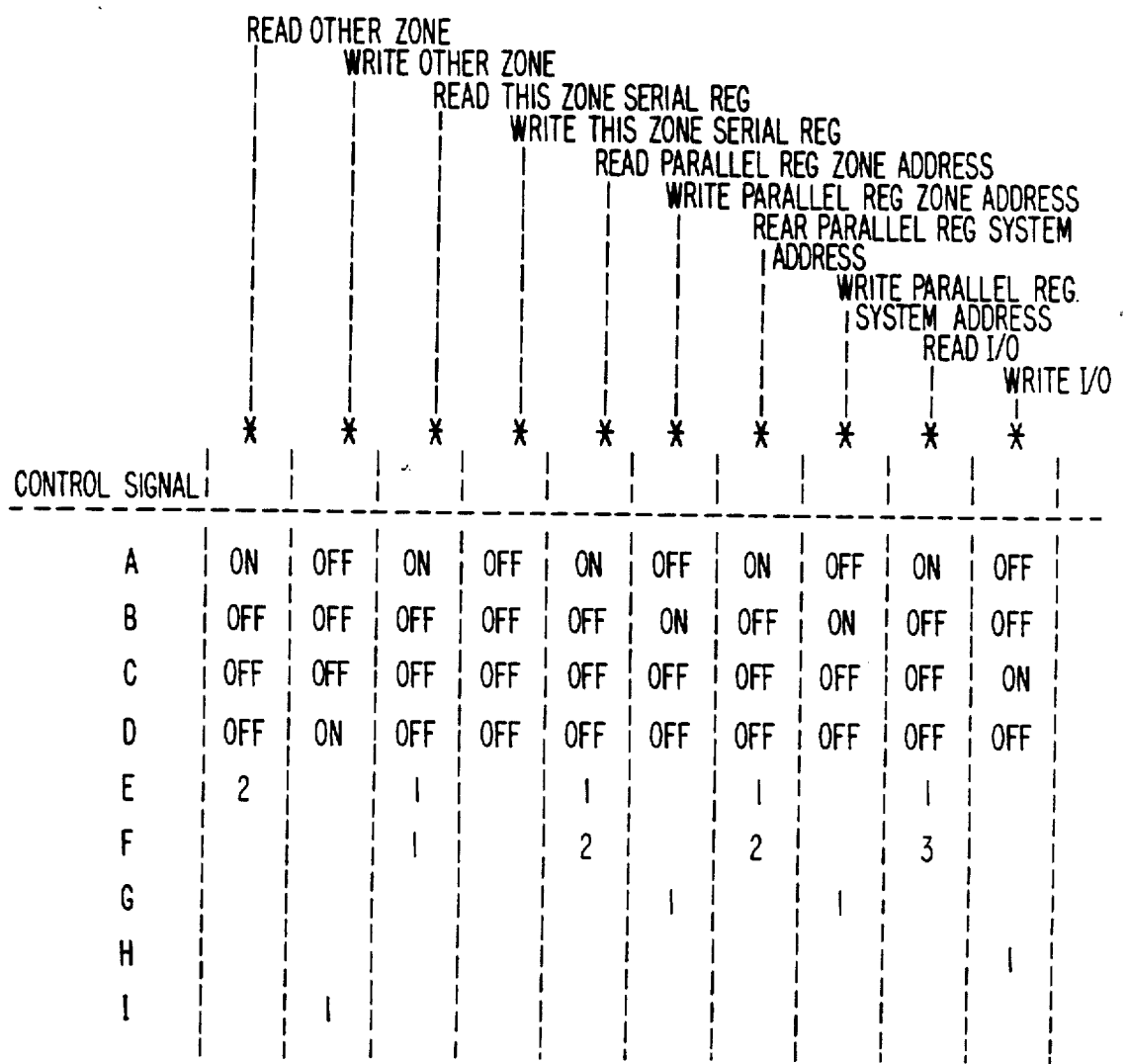
FIGS. 13A-13P are tables showing the states for the signals for the controller shown in FIG. 12.
Figure 131:
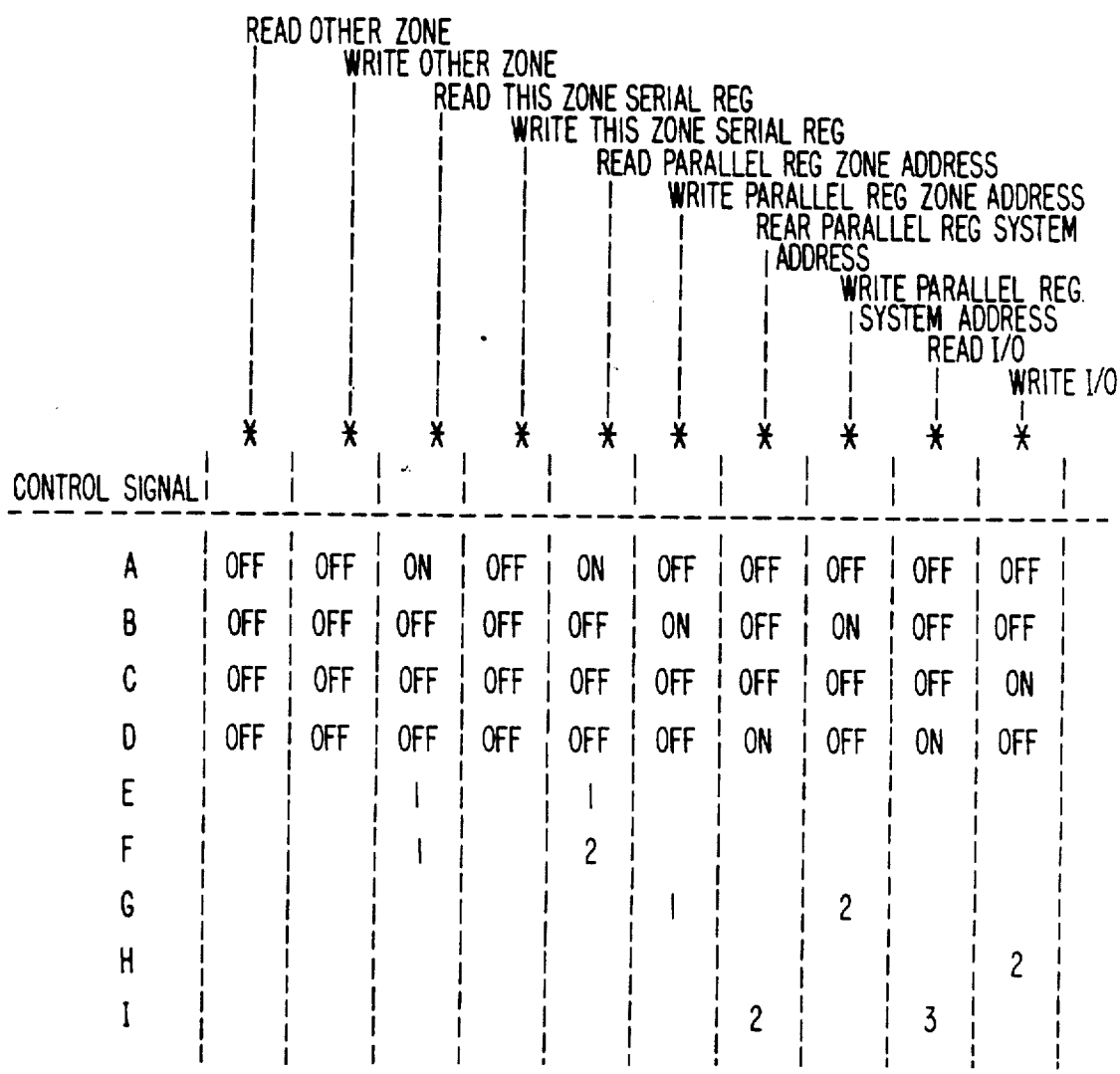
Figure 13J:
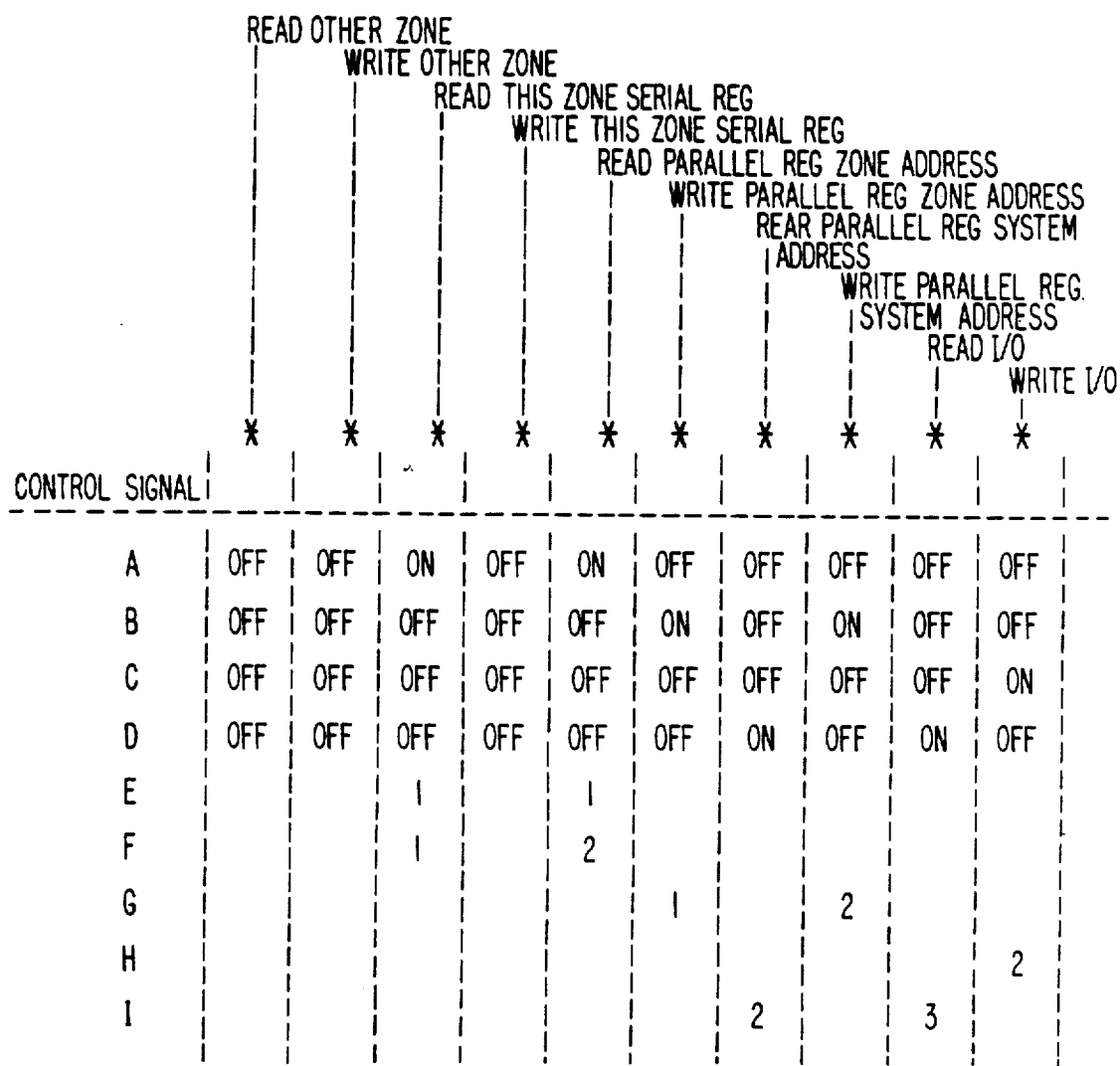
Figure 13M:
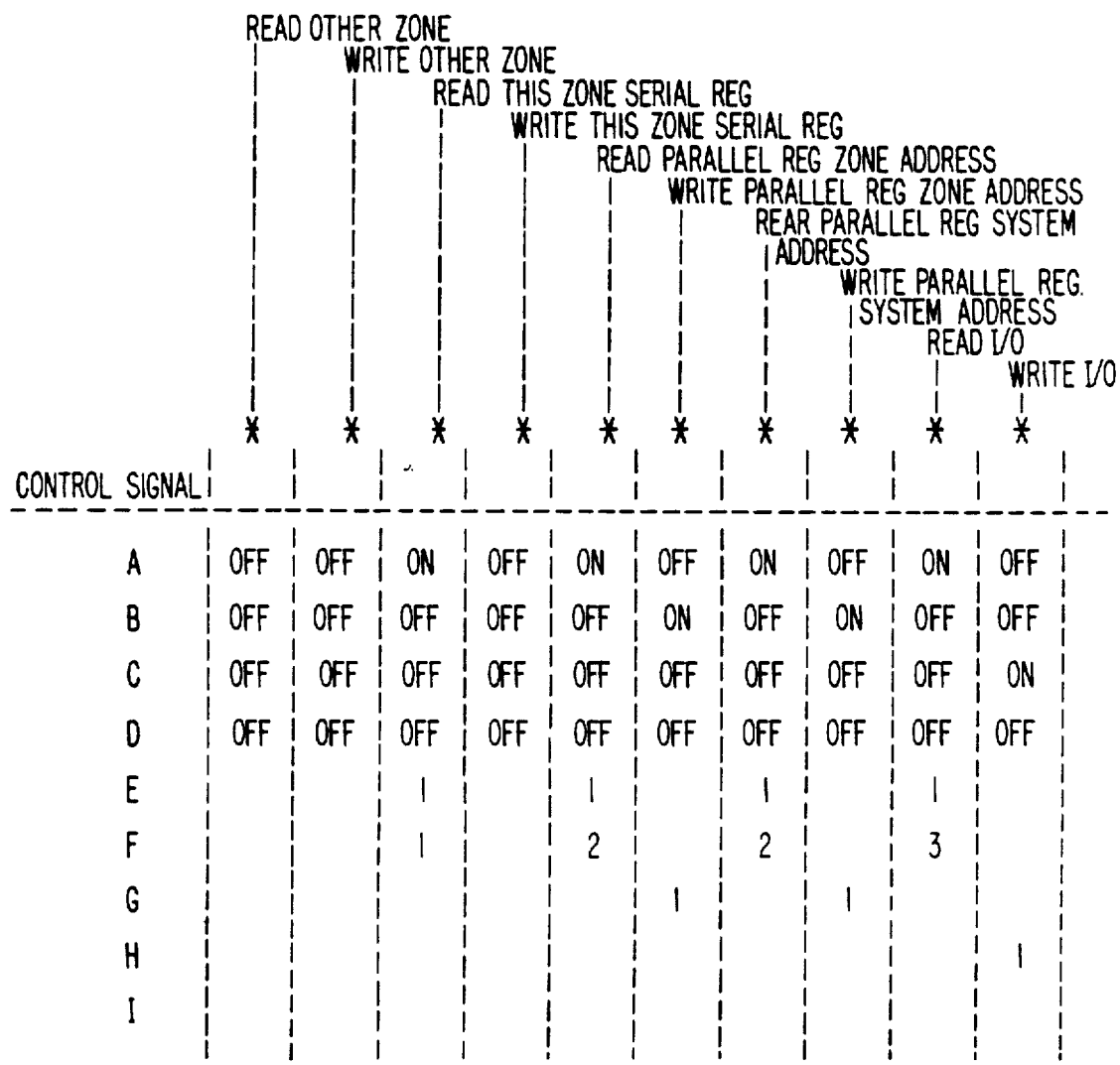
Figure 13N:
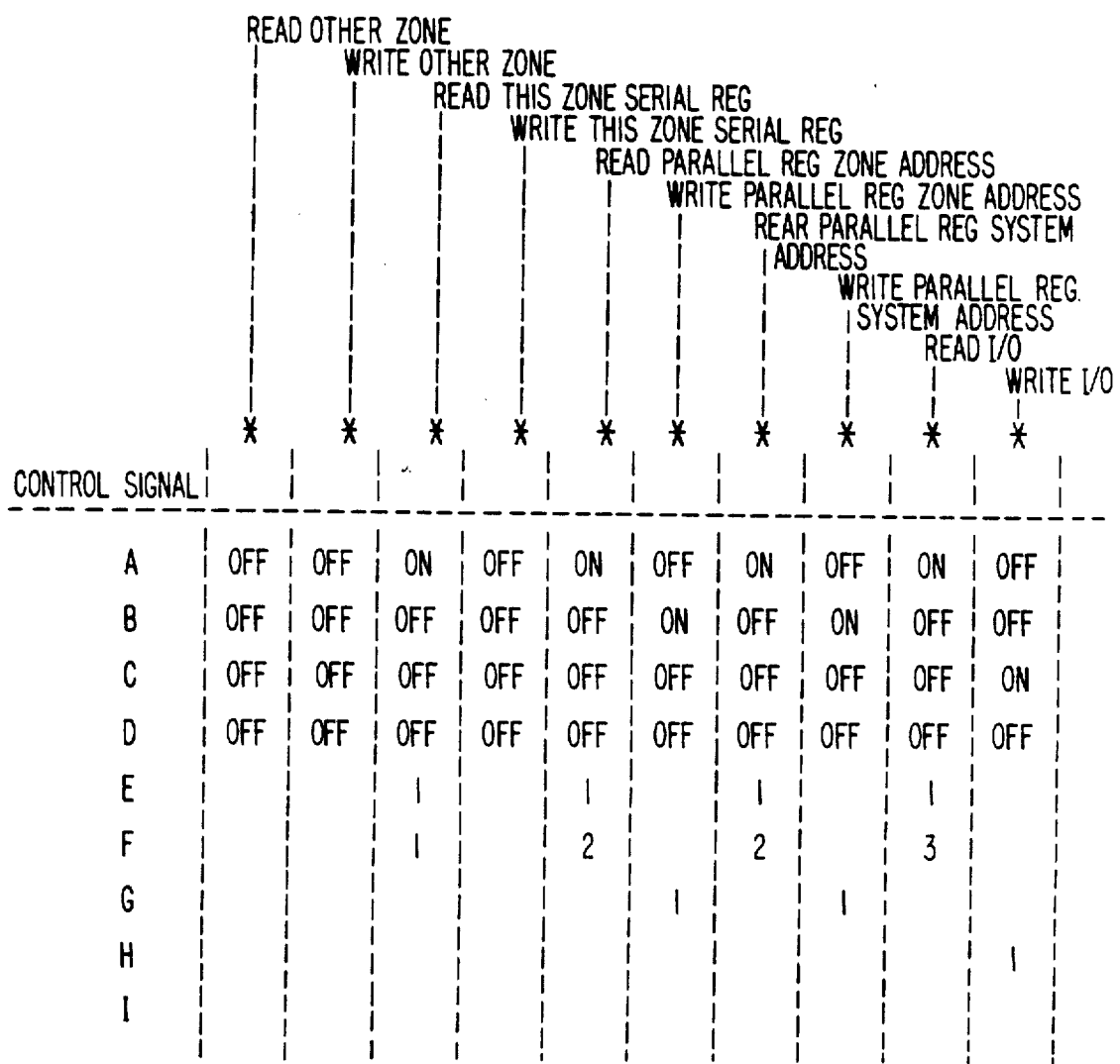

FIGS. 13A-P show states on signals A-I for the different functions to be performed and the different modes and states of the cross-links. Rather than explain each of the states and function, only two will be described in detail to provide an understanding of how to use FIGS. 13A-P.

FIG. 13A shows the state of the control signals for crosslink 90 (i.e., on the primary rail in zone 11) when in a duplex mode. For a read I/O operation, control signals A and D are "on" and B and C are "off." Signal A enables driver 933 which ensures that data will pass to memory controller 70, and signal D enables driver 942 ensuring the data will also pass to crosslink 90 via parallel cross-link pathway 25. The multiplexers which are involved in sending data to memory controller 70 and to parallel cross-link pathway 25 are multiplexers 960, 963 and 970 which are controlled by signals E, F and I, respectively. Control signal E is set to select input 1 which corresponds to the output of multiplexer 963. Control signal F is set so that multiplexer 963 selects input 3, which corresponds to data from module interconnect 130. Control signal I is set so that multiplexer 970 also selects the module interconnect 130.

With this signal selection, data from module interconnect 130 thus passes through multiplexers 963 and 960, as well as driver 933, to memory controller 70, which is the data path for a Read I/O transaction. That data also passes through multiplexer 970 and driver 942 onto parallel cross-link pathway 25, which is appropriate since cross-link 90 is in the duplex mode.

FIG. 13E shows the control signals for the identical situations, except that memory controller 90 is in the master mode and thus is not sending signals to cross-link 90'. The Read I/O operation in this situation involves the same signal settings to ensure that data from module interconnect 130 passes to memory controller 70. Since signal D is "off" and there is no selection signal for I, there is no data pathway to memory controller 90' via parallel cross-link pathway 25, which is appropriate for operation when cross-link 90 is in the master mode.

For a Write I/O operation with memory controller 90 in duplex mode, the only driver control signal that is "on" is signal C which enables driver 939 to pass data to module interconnect 130. Therefore, the only multiplexer that needs to be controlled is multiplexer 969, and FIG. 13A indicates that control signal H selects data from memory controller 70. Note that the operation of cross-link 95 (mirror rail in zone 11 in duplex mode) FIG. 13 differs slightly from the control signals for cross-link 90. (FIG. 13B). This is because, as explained in detail below, during a write I/O operation, data to each I/O module comes from both processors 20 and 20'.

5. Oscillator

When both processing systems 20 and 20' are performing the same tasks in a redundant fashion, known as the duplex mode, it is imperative that CPU modules 30 and 30' perform operations at the same rate. Otherwise, massive amounts of processing time will be consumed in resynchronizing the processing systems for I/O and interprocessor error checking. In the preferred embodiment of processing systems 20 and 20', their basic clock signals are synchronized and phase-locked to each other. The fault tolerant computing system 10 includes a timing system to control the frequency of the clock signals to processing systems 20 and 20' and to minimize the phase difference between the clock signals for each processing system.

Figure 14:
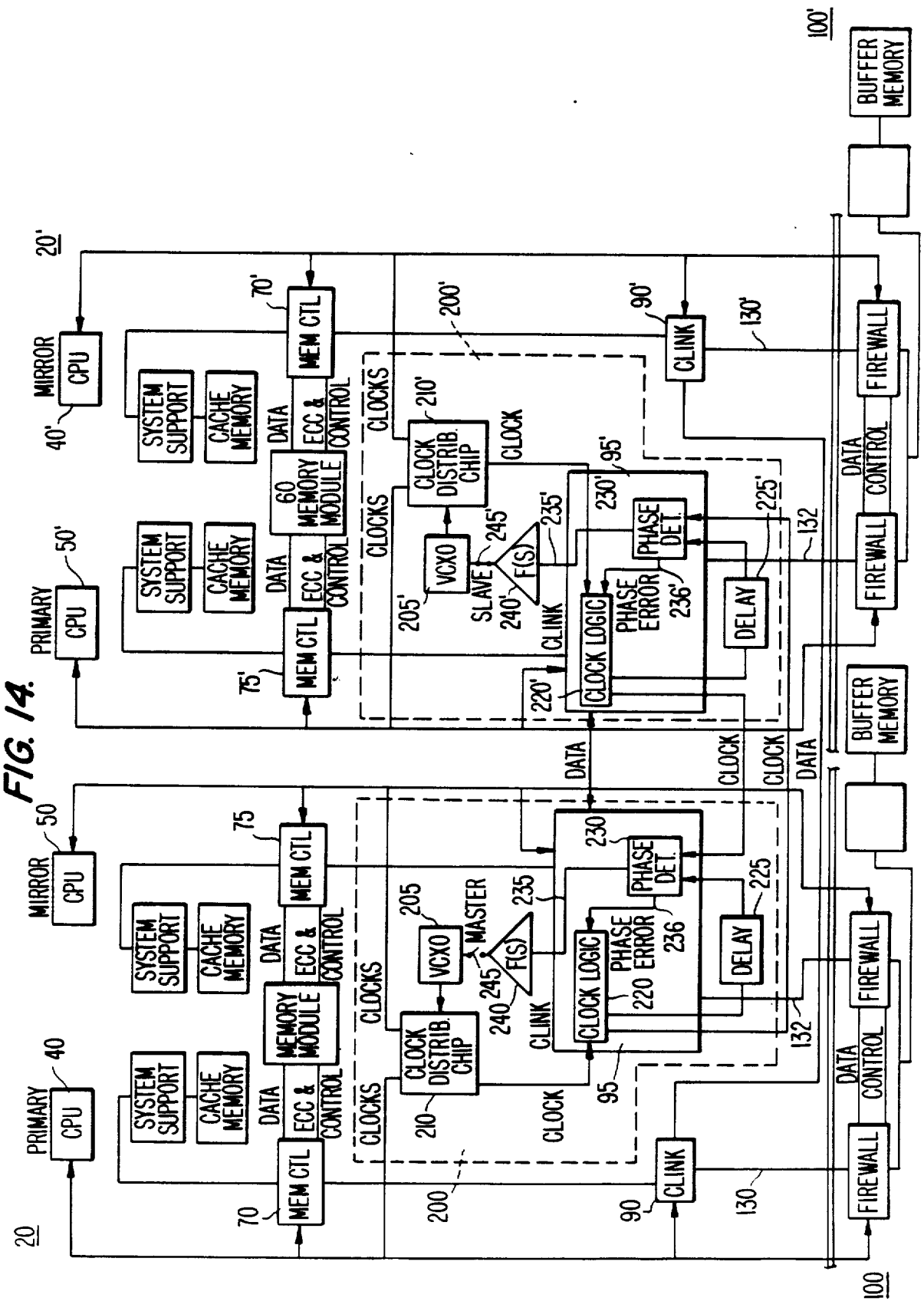
FIG. 14 is a block diagram of the timing system for the fault tolerant computer system of FIG. 1.

FIG. 14 shows a block diagram of the timing system of this invention embedded in processing systems 20 and 20'. The timing system comprises oscillator system 200 in CPU module 30 of processing system 20, and oscillator system 200' in CPU module 30' of processing system 20'. The elements of oscillator 200' are the same as those for oscillator 200 and both oscillator systems operation is the same. Thus, only the elements and operation of oscillator 200 will be described, except if the operations of oscillator 200 and 200' differ.

As FIG. 14 shows, much of oscillator system 200, specifically the digital logic, lies inside of cross-link 95, but that placement is not required for the present invention. Oscillator system 200 includes a voltage-controlled crystal oscillator (VCXO) 205 which generates a basic oscillator signal preferably at 66.66 Mhz. The frequency of VCXO 205 can be adjusted by the voltage level at the input.

Figure 15:
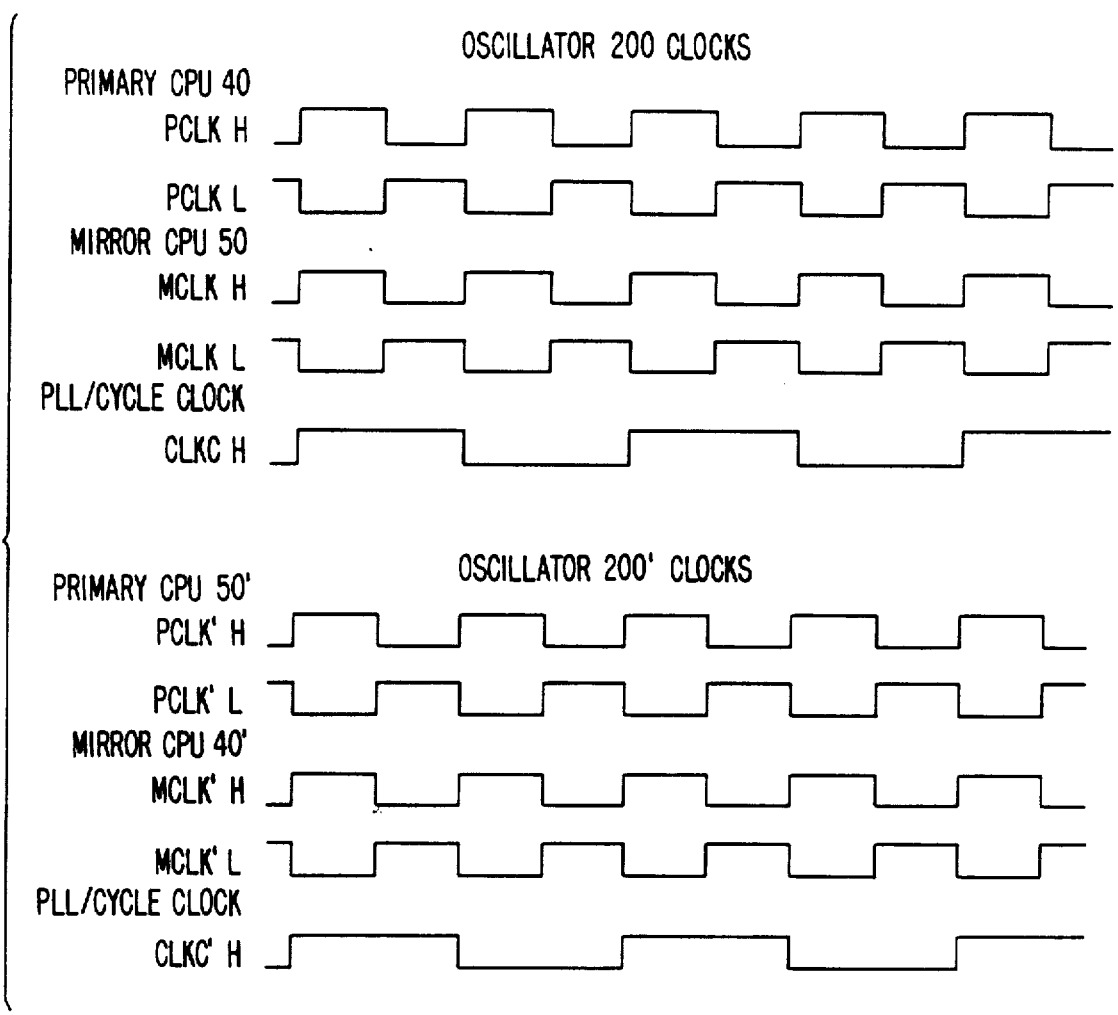
FIG. 15 is a timing diagram for the clock signals generated by the timing system in FIG. 14.

Clock distribution chip 210 divides down the basic oscillator signal and preferably produces four primary clocks all having the same frequency. For primary CPU 40 the clocks are PCLIC L and PCLIK H, which are logical inverses of each other. For mirror CPU 50, clock distribution chip 210 produces clock signals MCLK L and MCLK H, which are also logical inverses of each other. The timing and phase relationship of these clock signals are shown in FIG. 15. Preferably, frequency of clock signals PCLK L, PCLK H, MCLK L, and MCLK H are about 33.33 Mhz. Clock chip 210 also produces a phase-locked loop signal CLKC H at 16.66 Mhz, also shown in FIG. 15. This phase locked loop signal is sent to clock logic 220 which buffers that signal.

Clock logic buffer 220 sends the CLKC H signal to oscillator 200' for use in synchronization. Clock logic buffer 220' in oscillator 200' sends its own buffered phase-locked loop signal CLKC' H to phase detector 230 in oscillator 200. Phase detector 230 also receives the buffered phase locked loop signal CLKC H from clock logic buffer 220 through delay element 225. Delay element 225 approximates the delay due to the cable run from clock logic 220'.

Phase detector 230 compares its input phase locked loop signals and generates two outputs. One is a phase differences signal 235 which is sent through loop amplifier 240 to the voltage input of VCXO 205. Phase differences will cause amplifier 240 to generate a signal to alter the frequency of VCXO 205 to compensate for phase differences.

The other output of phase detector 230 is a phase error signal 236 which indicates possible synchronism faults.

Figure 16:
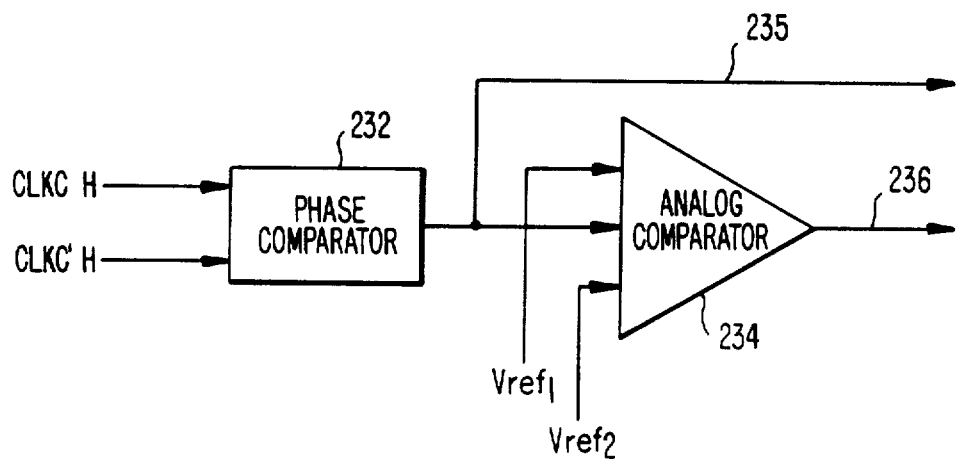
FIG. 16 is a detailed diagram of a phase detector for the timing system shown in FIG. 14.

FIG. 16 is a detailed diagram of phase detector 230. Phase detector 230 includes a phase comparator 232 and an analog voltage comparator 234. Phase comparator 232 receives the clock signal from delay element 225 (CLKC H) and the phase locked loop clock signal from oscillator 200' (CLKC' H) and generates an analog voltage level 235 representing the phase difference of those signals.

If processing system 20 were the "slave" for purposes of clock synchronization, switch 245 would be in the "SLAVE" position (i.e., closed) and the analog voltage level 235, after being amplified by loop amplifier 240, would control the frequency of VCXO 205. If both switches 245 and 245' are in the "master" position, processing systems 20 and 20' are not phaselocked and are running asynchronously (independently).

The analog voltage level 235 is also an input to voltage comparator 234 as are two reference voltages, $V_{ref1}$ and $V_{ref2}$, representing acceptable ranges of phase lead and lag. If the phase difference is within tolerance, the PHASE ERROR signal will not be activated. If the phase difference is out of tolerance, which voltage comparator 234 would sense as phase difference signal 235 falling outside the voltage range of $V_{ref1}$ to $V_{ref2}$, then the PHASE ERROR signal will be activated and sent to cross-link 95 via clock, decoder 220.

6. I/O Module

FIG. 17 shows a preferred embodiment of an I/O module 100. I/O modules 100 and 100' are identical so only module 100 is described. In addition, I/O modules 110 and 120 (and thus modules 110' and 120') are similar to module 100, but it is unlikely that they would have exactly the same configuration due to their connection to different I/O devices.

I/O module 100 is connected to CPU module 30 by means of dual rail module interconnects 130 and 132. Each of the module interconnects is received by firewalls 1000 and 1010, respectively. Firewalls 1000 and 1010 are interconnected by a checking bus 1005 which checks the equality of the data transmitted on module interconnects 130 and 132. That checking is effective due to the lock step synchronization of CPU modules 30 and 30' which cause data written to I/O module 100 from CPU modules 30 and 30' to be available at firewalls 1000 and 1010 simultaneously.

Figure 18:
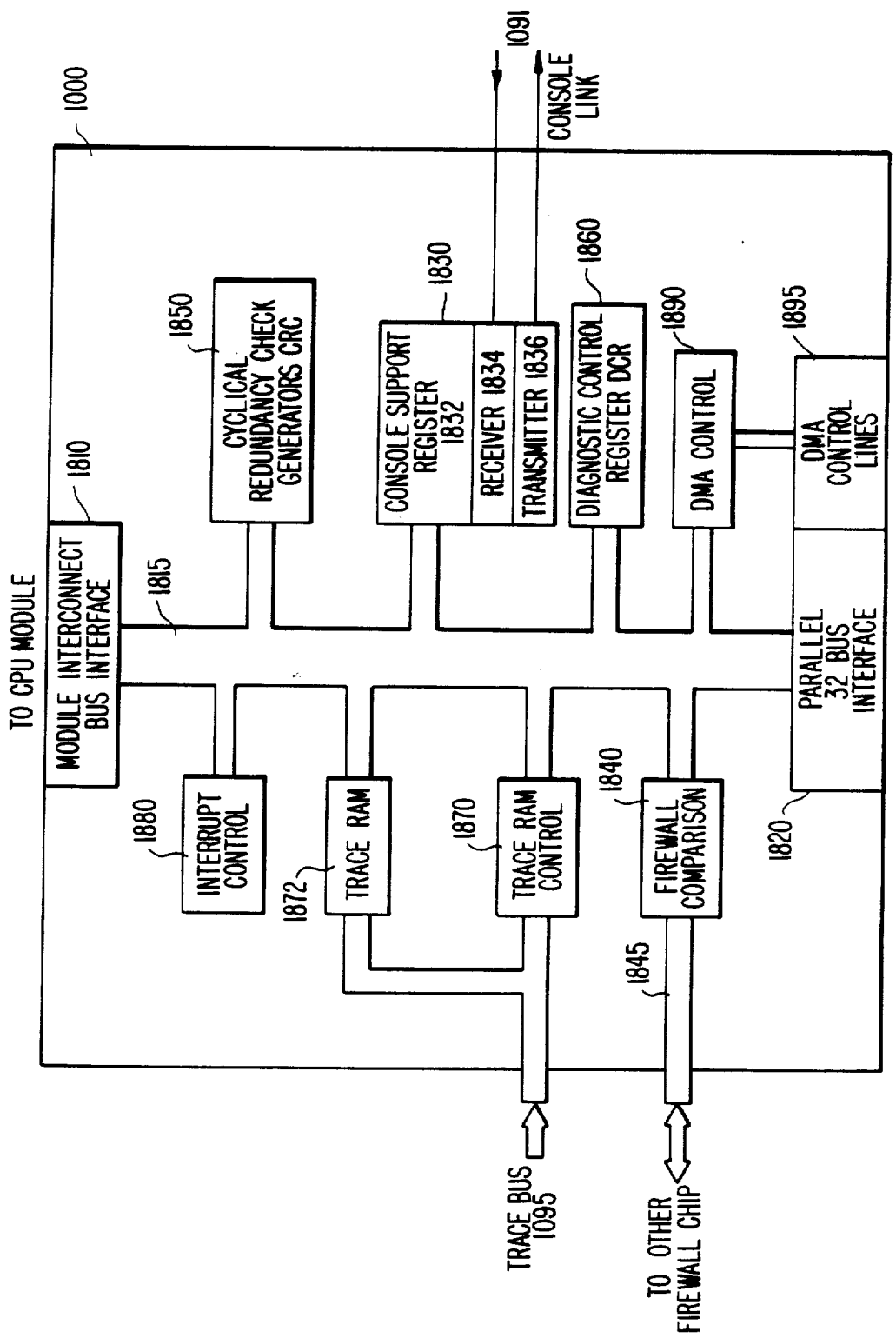
FIG. 18 is a block diagram of the firewall element in the I/O module shown in FIG. 17.

FIG. 18 shows the elements and the preferred embodiment of firewall 1000. Firewall 1000 includes a 32 bit bus interface 1810 to module interconnect 130 and a 32 bit bus interface 1820 for connection to bus 1020 shown in FIG. 17. Interfaces 1810 and 1820 are interconnected by an internal firewall bus 1815 which also interconnects the other elements of firewall 1000. Preferably bus 1815 is a parallel bus either 16 or 32 bits wide.

Firewall 1000 also preferably includes console support registers 1830 which connect to a console link 1090 between CPU module 30 and operator consoles. The console link bypasses the normal data paths, such as module interconnects, cross-links and memory controllers so that operators can communicate with the CPUs even if there are faults in other parts of computer system 10. Console support registers 1830 preferably include temporary storage registers 1832, a receiver 1834, and a transmitter 1836. The interconnection of registers 1832, receiver 1834, and transmitter 1836 are conventional and known to persons of ordinary skill.

Firewall 1000 also includes a firewall comparison circuit 1840 which includes a plurality of checkers. Firewall comparison circuit 1840 is connected to an equivalent element in firewall 1010. The checkers in firewall comparison circuit 1840 compare the data received from module interconnect 130 with the data received from module interconnect 132. In general, the data from module interconnect 130 is from one zone and the data from module interconnect 132 is from another zone, even though both module interconnects are received from CPU module 30. If the checkers in firewall comparison circuit 1840 detect any inequality between those data, interrupt control circuit 1880 is activated to generate an error signal which causes cross-links 90 and 95 to notify CPU modules 30 and 30' of a fault detection.

Firewall comparison circuit 1840 only checks data received from CPU modules 30 and 30'. Data sent to CPU modules 30 and 30' has a common origin and thus does not require checking. Instead, data received from an I/O device to be sent to CPU modules 30 and 30' is checked by an error detection code (EDC), such as a cyclical redundancy check (CRC) which is performed by CRC generator 1850. CRC generator 50 is also coupled to internal firewall bus 1815.

CRC generator 1850 generates and checks the same CRC code that is used by the I/O device. Preferably, I/O module 100 generates two EDC's. One, which can also be a CRC, is used for an interface to a network, such as the Ethernet packet network to which module 100 is coupled. The other is used for a disk interface such as disk interface 1072 in FIG. 17.

CRC coverage is not required between CPU module 30 and I/O module 100 because the module interconnect is duplicated. For example in CPU module 30, cross-link 90 communicates with firewall 1000 through module interconnect 130, and cross-link 95 communicates with firewall 1010 through module interconnect 132.

A message received from Ethernet network 1082 is checked for a valid CRC by network control 1080 shown in FIG. 17. The data, complete with CRC, is written to a local RAM 1060 also shown in FIG. 17. All data in local RAM 1060 is transferred to memory module 60 using DMA. A DMA control 1890 coordinates the transfer and directs CRC generator 1850 to check the validity of the CRC encoded data being transferred.

Most data transfers with an I/O device are done with DMA. Data is moved between main memory and I/O buffer memory. Each logical block of data transferred is covered by a CRC. For Ethernet, the logical block is the message packet. A message is transferred via DMA from main memory 60 through firewall 1000 to local RAM 1060. CRC generator 1850 in firewall 1000 calculates the CRC over the message.

DMA control 1890 controls the operation of CRC generator 1850 relative to the data transfer. When the logical block has been transferred, DMA control 1890 reads the generated CRC from the CRC generator 1850 and appends it to the data stored in local RAM 1060. When network control 1080 transfers the data from local RAM 1060 to the Ethernet network 1082, it checks the CRC. All of the Ethernet packet except the CRC code itself is transferred to memory module 60. Any errors in the CRC will be indicated by the CRC generator 1850 and will be reported through Interrupt Control 1880.

The data transfers to and from the disk subsystem occur in a manner analogous to the Ethernet interface. The CRC generator 1850 generates or checks the specific CRC code used by the disk control 1072. This ensures that data residing in or being transferred through a single rail system like I/O Module 100 is covered by an error detection code, which is preferably at least as reliable as the communications media the data will eventually pass through. Different I/O modules, for example those which handle synchronous protocols, preferably have a CRC generator which generates and checks the CRC codes of the appropriate protocols.

In general, DMA control 1890 handles the portion of a DMA operation specific to the shared memory controller 1050 and local RAM 1060 being addressed. The 32 bit bus 1020 is driven in two different modes. During DMA setup, DMA control 1890 uses bus 1020 as a standard asynchronous microprocessor bus. The address in local RAM 1060 where the DMA operation will occur is supplied by shared memory controller 1050 and DMA control 1890. During the actual DMA transfer, DMA control 1890 directs DMA control lines 1895 to drive bus 1020 in a synchronous fashion. Shared memory controller 1050 will transfer a 32 bit data word with bus 1020 every bus cycle, and DMA control 1890 keeps track of how many words are left to be transferred. Shared memory control 1050 also controls local RAM 1060 and creates the next DMA address.

The I/O modules (100, 110, 120) are responsible for controlling the read/write operations to their own local RAM 1060. The CPU module 30 is responsible for controlling the transfer operations with memory array 60. The DMA engine 775 of memory controllers 70 and 75 (shown in FIG. 9) directs the DMA operations on the CPU module 30. This division of labor prevents a fault in the DMA logic on any module from degrading the data integrity on any other module in zones 11 or 11'.

Firewall 1000 also performs other key functions for I/O module 100. An I/O Diagnostic Control Register 1860 in firewall 1000 has identical construction to the cross-link Diagnostic Control Register 901 and also allows communication between CPUs 40, 50, 40', and 50' and diagnostic microprocessor 1100. This indirect connection of diagnostic microprocessor 1100 prevents that microprocessor from affecting any other module in computer system 10.

The functions of trace RAM 1872 and trace RAM controller 1870 are described in greater detail below. Briefly, when a fault is detected and the CPUs and CPU modules 30 and 30' are notified, then various trace RAMs throughout computer system 10 are caused to perform certain functions described below. The communications with the trace RAMs takes place over trace bus 1095. Trace RAM control 1870, in response to signals from trace bus 1095, causes trace RAM 1872 either to stop storing, or to dump its contents over trace bus 1095.

I/O Module Bus 1020, which is preferably a 32 bit parallel bus, couples to firewalls 1000 and 1010 as well as to other elements of the I/O module 100. A shared memory controller 1050 is also coupled to I/O bus 1020 in I/O module 100. Shared memory controller 1050 is coupled to a local memory 1060 by a shared memory bus 1065, which has 32 bits plus parity. Preferably, local memory 1060 is RAM with 128 KB of memory, but the size of RAM 1060 is discretionary. The shared memory controller 1050 and local RAM 1060 provide memory capability for I/O module 100.

Disk controller 1070 provides a standard interface to a disk, such as disks 1075, 1075' in FIG. 1. Disk 1075 is preferably connected to disk controller 1070 by a standard bus interface 1072, such as an implementation of the SCSI (small computer standard interface) bus. Disk controller 1070 is also coupled to shared memory controller 1050 either for use of local RAM 1060 or for communication with I/O module bus 1020.

A network controller 1080 provides an interface to a standard network, such as the ETHERNET network, by way of network interface 1082. Network control 1080 is also coupled to shared memory controller 1050 which acts as an interface both to local RAM 1060 and I/O module bus 1020. There is no requirement, however, for any one specific organization or structure of I/O Module Bus 1020.

PCIM (power and cooling interface module) support element 1030 is connected to I/O module bus 1020 and to an ASCII interface 1032. PCIM support element 1030 allows processing system 20 to monitor the status of the power system (i.e., batteries, regulators, etc.) and the cooling system to ensure their proper operation (i.e., fans). Preferably, PCIM support element 1030 only receives messages when there is some fault or potential fault indication, such as an unacceptably low battery voltage. It is also possible to use PCIM support element 1030 to monitor all the power and cooling subsystems periodically. PCIM support element 1030, as well as an equivalent element in I/O module 100', enables fault tolerant computing system 10 to shut down a zone in case of malfunctions of the support systems for processors 20 and 20'.

System support and console element 1040 is also coupled to I/O module bus 1020. System support and console element 1040 provides an interface for an operator's console via ASCII interface 1042. The operator's console not only allows input of certain information, such as time of year, the console may also be used for diagnostic purposes. The operator console exchanges data with the CPUs over console link 1090 and 1091 via console support registers 1830 in firewalls 1000 and 1010.

Diagnostics microprocessor 1100 is also connected to the I/O module bus 1020. The operation of the diagnostics microprocessor 1100 are described in detail below. In general, microprocessor 1100 is used to gather error checking information from trace RAMS, such as trace RAM 1872, when faults are detected. That data is gathered into trace buses 1095 and 1096, through firewalls 1000 and 1010, respectively through, module bus 1020, and into microprocessor 1100.

Interprocessor and Intermodule Communication

1. Data Paths

Figure 19:
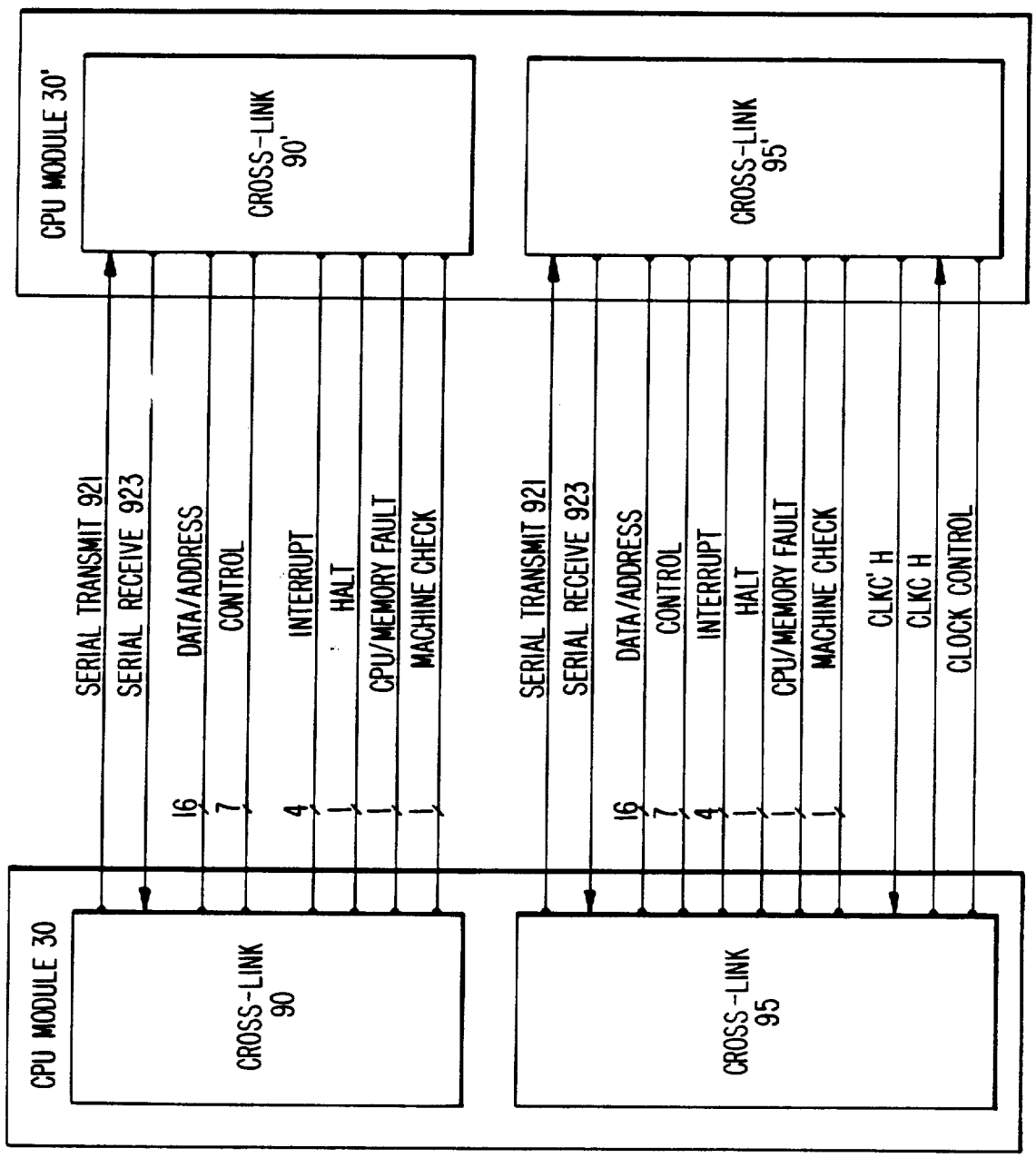
FIG. 19 is a detailed diagram of the elements of the cross-link pathway for the computer system of FIG. 1.

The elements of computer system 10 do not by themselves constitute a fault tolerant system. There needs to be a communications pathway and protocol which allows communication during normal operations and operation during fault detection and correction. Key to such communication is cross-link pathway 25. Cross link pathway 25 comprises the parallel links, serial links, and clock signals already described. These are shown in FIG. 19. The parallel link includes two identical sets of data and address lines (16), control lines (7), interrupt lines (7), and error lines (7). The sixteen data and address lines and the seven control lines contain information to be exchanged between the CPU modules, such as from the module interconnects 130 and 132 (or 130' and 132') or from memory module 60 (60').

The seven interrupt lines preferably include four lines representing four different I/O interrupt levels plus one for synchronizing a console "HALT" request for both zones, one for synchronizing a machine check for both zones, and one for indicating the occurrence of a CPU/memory failure to the other zone.

The fault tolerant processing system 10 is designed to continue operating as a dual rail system despite most transient faults. The I/O subsystem (modules 100, 110, 120, 100', 110', 120') can also experience transient faults and continue to operate. In the preferred embodiment, an error detected by firewall comparison circuit 1840 will cause a synchronized machine check to be requested through lines 25 for CPU directed operations. Software in CPU 30 and 30' will retry the faulted operation. For DMA directed operations, the same error detection results in synchronous interrupts through line 25, and software in CPUs 40, 50, 40' and 50' will restart the DMA operation.

Certain transient errors are not immediately recoverable. For example, a control error indicated by error signal 762 in CPU module 30 can result in unknown data in memory module 60. In this situation, CPU module 30 can no longer function reliably as part of a fail safe system so it is removed. Memory array 60 must then undergo a memory resync before CPU 30 can rejoin the system. The CPU/memory failure line indicates to CPU 30' that CPU 30 has been faulted.

The seven control lines, which represent a combination of cycle status, byte mask, direction, and ready conditions, provide the handshaking between CPU modules (30 and 30') and the I/O modules. Cycle status describes the type of bus operation being performed: CPU read of I/O, DMA transfer, DMA setup, or interrupt vector request. "Byte mask" directs which of the 16 data lines contains valid data to allow modification of a byte (8 bits) of data in a 32 bit word in local RAM 1060. "Direction" fixes the selection of transceiver paths for DMA operation. Since DMA transfers occur between a predetermined source and destination, the time overhead associated with selecting the data paths need not be paid for every data transfer. "Ready" messages are sent between the CPU and I/O modules to indicate the completion of requested operations.

Either processing system 20 or 20' can activate and read the state of the control lines at any time. Activation and deactivation are done synchronously between processing systems 20 and 20'.

The serial cross link includes two sets of two lines to provide a serial data transfer for a status read, loopback, data transfer, transfer interrupts in status.

The clock signals exchanged are the phase lock clock signals CLKC H and CLKC' H (delayed).

FIGS. 20A-D show block diagrams of the elements of CPU modules 30 and 30' and I/O modules 100 and 100' through which data passes during the different operations. Each of those elements has each been described previously.

In general, the data paths during the operations are symmetric. For example, a CPU I/O read proceeds to I/O module 100 as well as I/O module 100' over paths which are mirror images of each other. When such, is, the case, the figures show all data paths, but only one is described in detail.

FIG. 20A shows the data pathways for a CPU I/O read operation. Data, for example either from a disk 1075 (1075') or a network, are presumed to be stored in local RAM 1060 (1060')for transfer through shared memory controller 1050 (1050'). For one path, the data pass through firewall 1000, module interconnect 130, to cross link 90. At that time, the data are transferred up to memory controller 70 and to cross-link 90'. As seen in FIG. 12, cross-link 90 delays the data from firewall 100 to memory controller 70 so that the data to cross-link 90' have enough time to "catch up" and processing systems 20 and 20' remain synchronized. The data then proceeds out of cross-link 90 through memory controller 70 and into CPU 40 by way of internal bus 46. Similarly, the data to cross-link 90' proceeds to CPU 40'.

A similar path is taken for reading data into CPUs 50 and 50'. Data from the shared memory controller 1050 proceeds through firewall 1010 and into cross-link 95. At that time, the data are routed both to cross-link 95' and through a delay unit inside cross-link 95.

When reading in data from I/O devices, only one read operation is necessary. A "mirror" CPU I/O read operation may also be performed for data received from the I/O devices of processing system 20' via a shared memory controller 1050' and local RAM in I/O device 100'.

Although I/O modules 100, 110, and 120 are similar and correspond to I/O modules 100', 110', and 120', respectively, the corresponding I/O modules are not in lock step synchronization. Using memory controller 1050' and local RAM 1060' for CPU I/O read, the data would first go to cross-links 90' and 95'. The remaining data path is equivalent to the path from memory controller 1050. The data travel from the cross-links 90' and 95' up through memory controllers 70' and 75' and finally to CPUs 40' and 50', respectively. Simultaneously, the data travel across to cross links 90 and 95, respectively, and then, without passing through a delay element, the data continues up to CPUs 40 and 50, respectively.

Figure 20B:
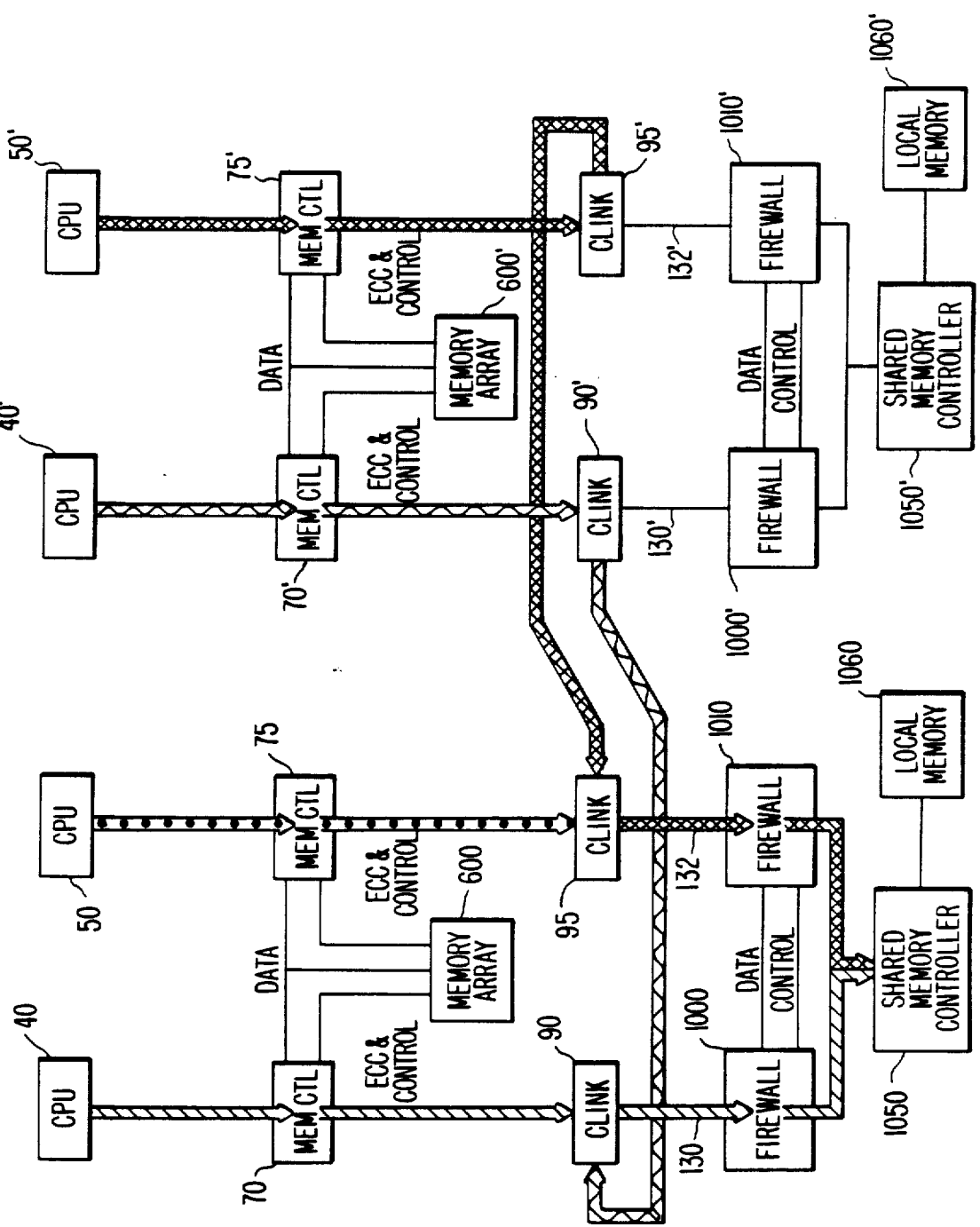
Figure 20C:
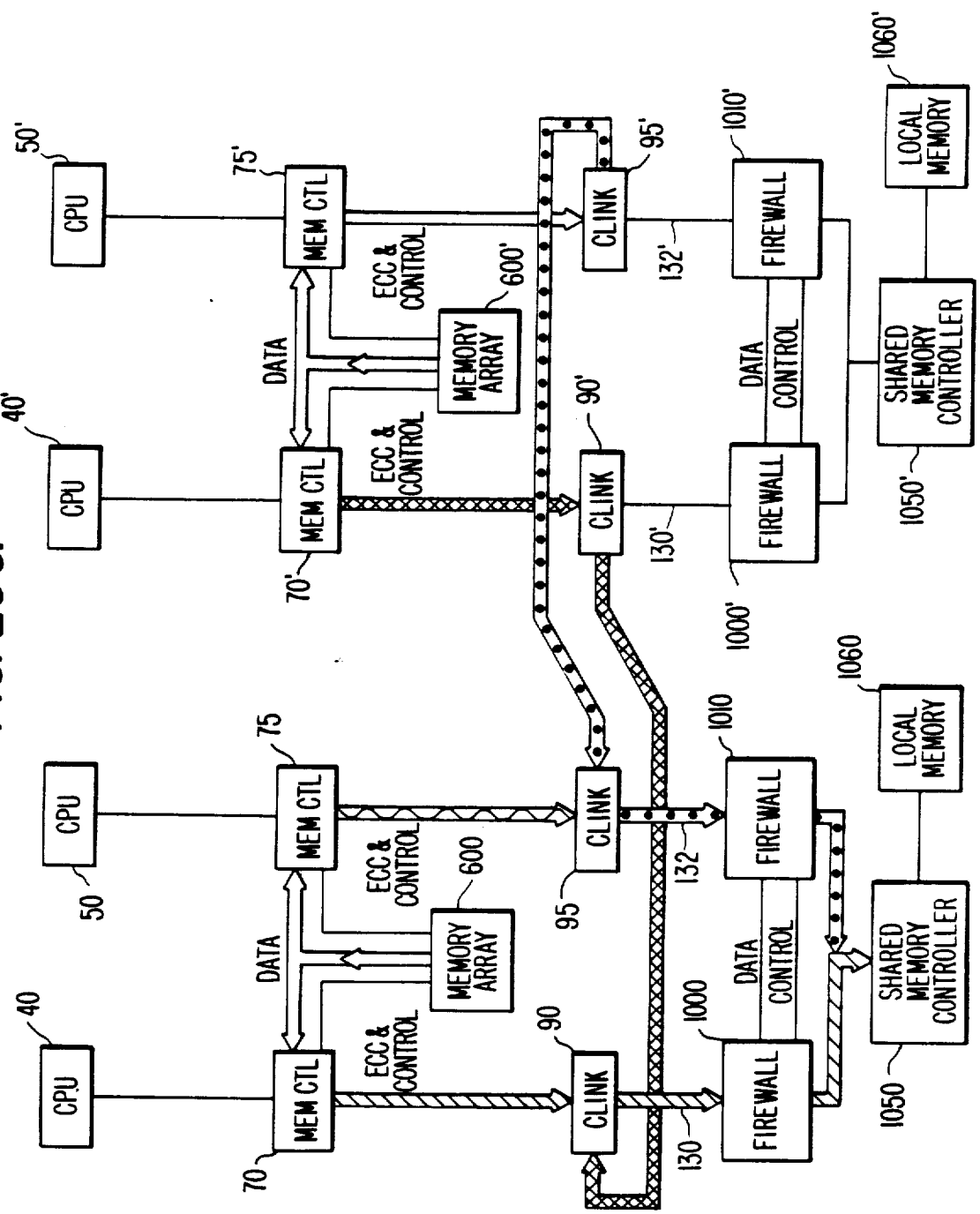
Figure 20D:
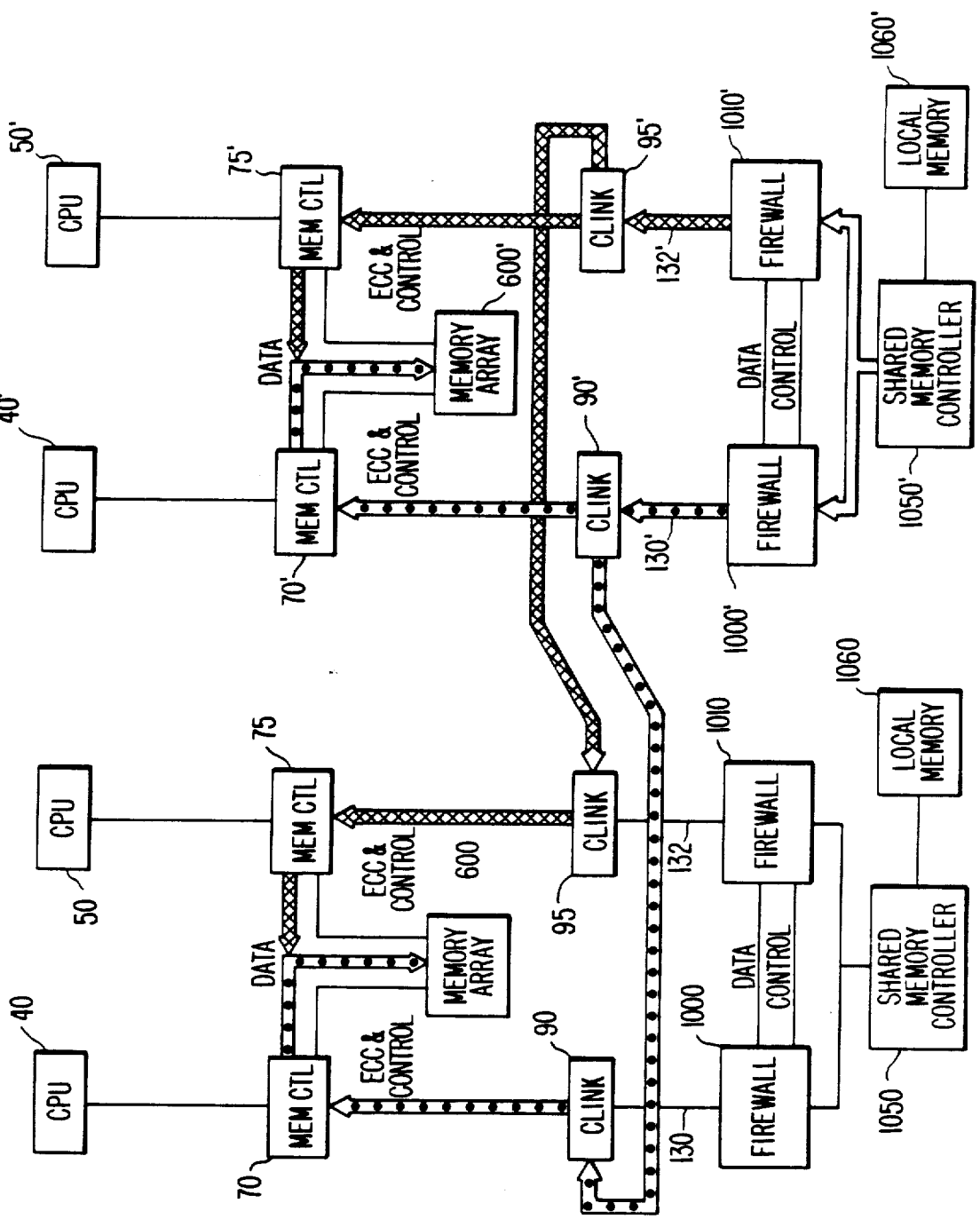

FIG. 20B shows a CPU I/O write operation. Data are transferred from the CPUs 40, 50, 40' and 50' to shared memory controllers 1050 and 1050' and local RAMs 1060 and 1060' in two separate CPU I/O write operations. The data transferred by CPU 40 proceed along the same path but in a direction opposite to that of the data during the CPU I/O read. Specifically, such data pass through memory bus 46, memory controller 70, delay unit 985 (to permit synchronization), firewall 1000, and memory controller 1050. Data from CPU 50' also follow the path of the CPU I/O reads in a reverse direction. Specifically, such data pass through internal bus 56', memory controller 75', cross-link 95', cross-link 95, firewall 1010, and shared memory controller 1050. As indicated above, firewalls 1000 and 1010 check the data during I/O write operations to check for errors prior to output.

The data from CPUs 50 and 40' are transmitted through symmetrical paths to shared memory controller 1050' in a subsequent CPU I/O write to the I/O devices of processing system 20'. The data from CPUs 50 and 40' are compared by firewalls 1000 and 1010 for an interzonal check. Interrail checks for each zone were previously performed at memory controller 70, 75, 70' and 75'.

FIG. 21C shows the data paths for DMA read operations. The data from memory array 600 pass simultaneously into memory controllers 70 and 75 and cross-links 90 and 95. Cross-link 95 delays that data before transmission to firewall 1000 and shared memory controller 1050.

Data from memory array 600' pass simultaneously through memory controllers 70' and 75' and then, through cross-links 90' and 95'. The data from cross-link 95' go through cross-link 95, through firewall 1010, and on to shared memory controller 1050.

As with the CPU I/O write operation, this data path as well as the symmetric paths through firewalls 1000' and 1010' provide interzonal error checking. Interrail error checking occurs in memory modules 70, 75, 70' and 75'.

The data paths for the DMA write operation are shown in FIG. 21D and are similar to those for a CPU I/O read. Specifically, data from shared memory controller 1050' proceed through firewall 1000', cross-link 90' (with a delay), memory controller 70', and into memory array 600'. Simultaneously, that data pass through firewall 1010', cross-link 95' (with a delay), and memory controller 75', at which time they are compared with the data from memory controller 70' during an interrail error check. As with the CPU I/O read, the data in a DMA write operation may alternatively be brought up through shared memory controller 1050 in an equivalent operation.

The data out of cross-link 90' also pass through cross-link 90 and memory controller 70 and into memory array 600. The data from cross-link 95' pass through cross-link 95' and memory controller 75', at which time they are compared with the data from memory controller 70' during a simultaneous interrail check.

Figure 20E:
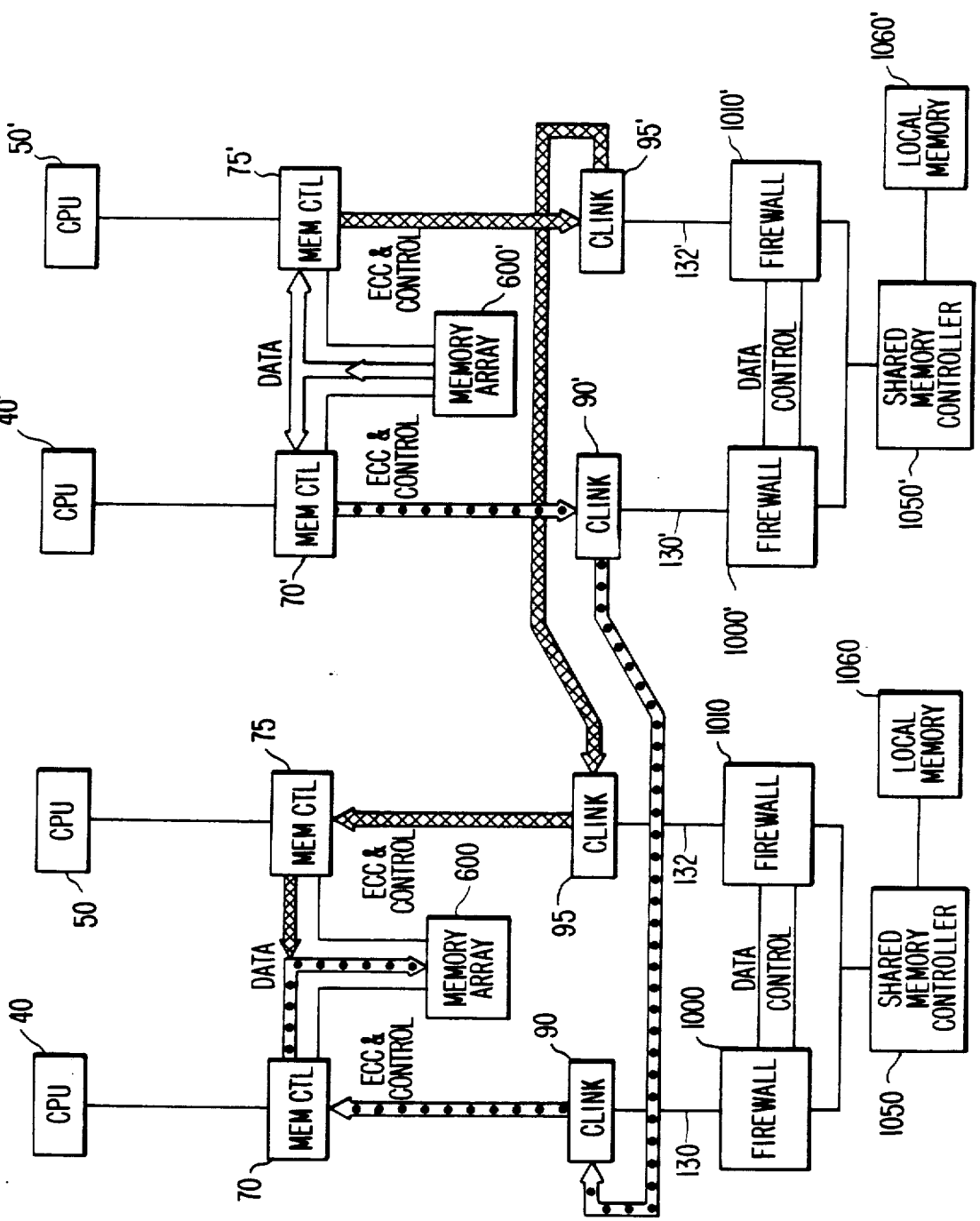

The data path for a memory resync operation is shown in FIG. 20E. The memory resync operation is described in greater detail below in connection with FIG. 23. To provide an understanding of the data paths during memory resync, the bulk memory copy function, which is a part of the memory resync operation, appears in FIG. 21.

As FIG. 21 shows, the first step in the bulk memory copy operation involves setting the cross-links to the memory resync master/slave mode to permit the data path shown in FIG. 20E (step 2100). FIGS. 13I-13L show that when a cross-link is in the slave mode, the communication is essentially one way. Thus, data can be written into the memory of the processing system whose cross-links are in the slave mode, but information may not be read out of that memory. Furthermore, FIGS. 13E–13H show, in conjunction with 13I–13L, that every time the processing system whose cross-link is in the master mode writes into its memory module, the processing system whose cross-link is in the slave mode, also writes that same data. Thus, the processing system whose cross-link is in the slave mode has a memory module which is storing up-to date information along with the processing system whose cross link is in the master mode.

Next, as shown in the bulk memory transfer flow chart of FIG. 21, the master processing system audits its memory module to find out all of the memory pages in that module (step 2110). Once all those pages are known, they are queued into the DMA engine of the master processing system (step 2120). Preferably, the DMA engine of the master processing system includes a queue of DMA requests, each of the requests preferably includes an indication of the type of transfer, the starting address, the number of elements to be transferred, and an indication of the destination. The destination for all DMA transfers to the slave processing system is the memory module in the slave processing system.

The memory resync operation then begins an iterative process of sending commands to the DMA engine in the slave processing system (step 2130) and initiating and completing DMA transfers of the next page (step 2140). The command to the slave DMA engine indicates the size of the DMA transfers and the starting addresses to ensure that the slave processing system's memory module is configured to be identical to that of the master module. These steps are repeated until the transfer of all the master memory is complete (step 2150).

Once the transfer of all the master memory is complete (step 2150), then the master processor stores all of its CPU registers into its memory (step 2160) for later rebooting operation. The storage of the CPU registers into the master memory also stores them into the slave memory. The bulk memory transfer operation is then exited so other resynchronization processes can begin.

In the memory resync operation, then, data from memory array 600', the "master" in FIG. 20E, passes simultaneously through memory controllers 70' and 75', cross-links 90' and 95', cross-links 90 and 95, and memory controllers 70 and 75, at which time the data are compared for interrail error checking. The data from memory controller 70 is placed into memory array 600.

2. Cold Bootstrapping

With the exception of the memory resync operation, the data paths discussed in the previous section all occur when zones 11 and 11' are in lock step synchronization. Fault tolerant computing system 10, however, must accommodate operation when processors 20 and 20' are not in lock step synchronization. One of those conditions occurs during the "cold" bootstrapping operation at the time of initialization. Another occurs during the memory resynchronization operation discussed in the succeeding section.

FIGS. 22A–22H contain a flowchart showing a bootstrapping sequence to bring CPU modules 30 and 30' into lock step synchronization.

In general, in error states, such as in step 2228, the other zone has provided an inappropriate response to some stimulus. The response to a failure to receive an appropriate reply from the other zone is to log an error caused by that zone. This information can be used by field service personnel in analyzing the error. The response to a failure to receive an appropriate reply from the other zone is also to log an error caused by that zone. In FIGS. 22A–H, the zones are referred to generically as zones A and B since the operation described is applies to either zone.

When the cold bootstrapping operation is entered (step 2200), the cross-link pathways are turned off and the processors are set for normal operation (step 2202). Normal operation refers to the condition when the CPUs have direct control over their respective memory controllers. The CPUs then read their own bootstrapping tokens from EEPROMs located in the CPUs (step 2204) and read the bootstrapping tokens from the CPUs in other zones (step 2206). Both processors then await a reply from zone A (step 2208) to determine whether zone A will be the "bootmaster" for purposes of bootstrapping operations (step 2210). If so, then both systems determine whether zone B also believes that it will be the bootmaster for bootstrapping operations (step 2212). If so, zone B is set in the non-boot state so that it will not be bootmaster (step 2214).

If, as the result of the determination of step 2210, zone A is not the bootmaster, then both zones determine whether zone B is the bootmaster (step 2216). If zone B is not to be the bootmaster, step 2216, then zone A is set as the bootmaster (step 2218).

After steps 2210–2218 are traversed to determine the bootmaster, each zone asks itself whether it is the bootmaster (step 2220). The zone that is the bootmaster proceeds to step 2222 in FIG. 22B. The other zone proceeds to step 2284 in FIG. 22F. For purposes of the flowchart in FIGS 22A-H, zone A is the bootmaster.

Zone A first boots its operating system. Part of the boot process involves loading table descriptions and routines necessary to control all I/O devices present in system 10. However, only those I/O devices in zone A are initialized and made available to application programs.

The bootmaster enters the boot simplex procedure (Step 2222) which begins with zone A's waiting to receive a message from zone B (step 2224). Upon receiving a message from zone B, zone A determines whether zone B has made a request to join with zone A (step 2226). If not, the process enters an error state 228, the bootstrapping procedure is concluded, and the zones remain unsynchronized. If zone B has made a request to join, then zone A replies "yes" to zone B (step 2230) and zone A again awaits zone B's response (step 2232). If zone B is not supplying I/O (i.e., if zone B is retaining control of its I/O devices), then another error state is entered (step 2236) and the bootstrapping procedure is finished.

If zone B is supplying I/O, then zone A reads the crosslink status of zone B (step 2238). If the cross-link status of zone B does not indicate that zone B is in the cross-link slave (step 2240), then an error state is entered (2242) and the bootstrapping procedure is again finished.

If the cross-link status of zone B does indicate that it is in the cross-link slave mode (step 2240), then zone A sets its own cross-link status to "master" (step 2244). Zone B's I/O devices are initialized and made available to application programs. Zone A awaits a request from zone B (step 2246). If zone A does not receive a resync request (step 2248), then an error state (step 2250) is entered and the bootstrapping procedure is completed.

If zone A does receive a resync request from zone B (step 2248) then zone A gives zone B a "yes" (step 2252) and awaits a reply from zone B (step 2254). Zone A then waits until zone B is ready to resync (step 2256).

When zone B is configured to resync memory, its cross-link status is "cross-link on slave" and "resync slave". The resync slave mode locks zone B's CPUs out of their memory controllers. Zone B's memory controllers now receive all direction from their associated cross-links. This gives zone A control of zone B's memory. If zone B is ready to resync, zone A reads zone B's cross-link status again (step 2258) and determines whether zone B's status indicates that it is in resync slave mode (step 2260). If not, then another error state (step 2262) is entered and the bootstrapping procedure is concluded.

If zone B's cross-link status indicates that it is in resync slave mode (step 2260), then zone A sets its own status to resync master mode (step 2264) and queues up memory transfers (step 2266). This is the bulk memory transfer operation explained in FIG. 21.

Zone A then waits until the DMA is complete for memory resync (step 2268), reads its system state from memory (step 2270), and saves the restart vector, which is the memory location from which the zones will start after resync (step 2272). The system state is all the register resident information in the CPU module that controls the execution of the software and hardware. This information includes, but is not restricted to, CPU general purpose registers, address translation tables, process status words, stack pointers, program counters, interrupt status, configuration registers, and interval timers. These values are saved in memory array 60. Because memory resync is still in effect, the values are also saved in memory array 60'. The memory address of the saved values is written into the save state registers in the cross-links. All processing in zone A is then suspended and cache memory is flushed. All information necessary to restart application processing is resident in memory array 60 and 60'.

Zone A then sets a duplex sync request (step 2274) and reads the cross-link status of zone B (step 2276). If zone B's status indicates that it is not in the duplex sync mode, then an error state (step 2280) is entered and the bootstrapping procedure is concluded. If zone B is in the duplex sync mode, then zone A sets a duplex sync request and enters synchronous operation beginning with step 2308 in FIG. 22H.

Simultaneous with zone A's operation, zone B performs a different set of step for bootstrapping. After zone B is determined to be the slave in the bootstrapping technique, it issues a request to join with state A (step 2284) and awaits a reply (step 2286). If zone A's reply is that zone B cannot join, then zone B goes into a console state.

Under certain circumstances it is desirable to operate with only one zone. One zone can be booted while the other zone runs extended diagnostics. Thus, zone A can be instructed not to boot zone B, and when zone B requests to join, permission is not granted. Zone B will then wait in console state for instructions from a console operator.

If zone A replies "yes" to zone B's request to join, then zone B gives up its I/O (step 2290), sets its cross-link status to the "slave" mode (step 2292), and requests resync operation (step 2294). Zone B then waits for a reply from zone A (step 2296).

If zone A's reply to zone B's resync request is not "yes" (step 2298), then zone B enters the console state 2300 and the bootstrapping operation is concluded. If zone A does reply "yes" to zone B's request to resync (step 2298), then zone B sends a "ready to resync" message to zone A (step 2302) and sets its cross-link status to the "slave" mode (step 2304). Zone B then awaits resync from zone A before entering synchronous operation.

If the bootstrapping routine has not yet been exited or the console state is entered, then both zones simultaneously read the cross-link status of zone A (step 2308) and the cross-link status of zone (step 2310). If both cross-link statuses are equal (step 2312), then the bootstrapping has been completed and the bootstrapping procedure is exited.

If the status of cross-link A and cross-link B are not equal, then the cross-lines are turned off (step 2314) and both processors ask whether they are the bootmaster (step 2316). A miscompare of the cross-link status means that the synchronization of the two zones was not successful. The bootmaster zone (zone A) removes the devices from the slave zone (zone B) its configuration tables and continues processing. Zone B waits in a console state for a console operator to provide further instructions. For the zone that is the bootmaster, the bootstrapping routine is exited (step 2316). For the other zone the console state is entered (step 2318) and then the bootstrapping routine is exited.

3. Memory Resync Operation

The memory resynchronization operation is used both during cold bootstrapping procedure, and also after a transient error has been detected, as explained below, causing the zones to lose synchronization. One of the zones must resynchronize, preferably without stopping the operation of the other zone. Key to such resynchronization is a technique for setting the memory arrays 600 and 600' equal to each other without stopping computer system 10 entirely. This is done through memory resynchronization.

Figure 22A:
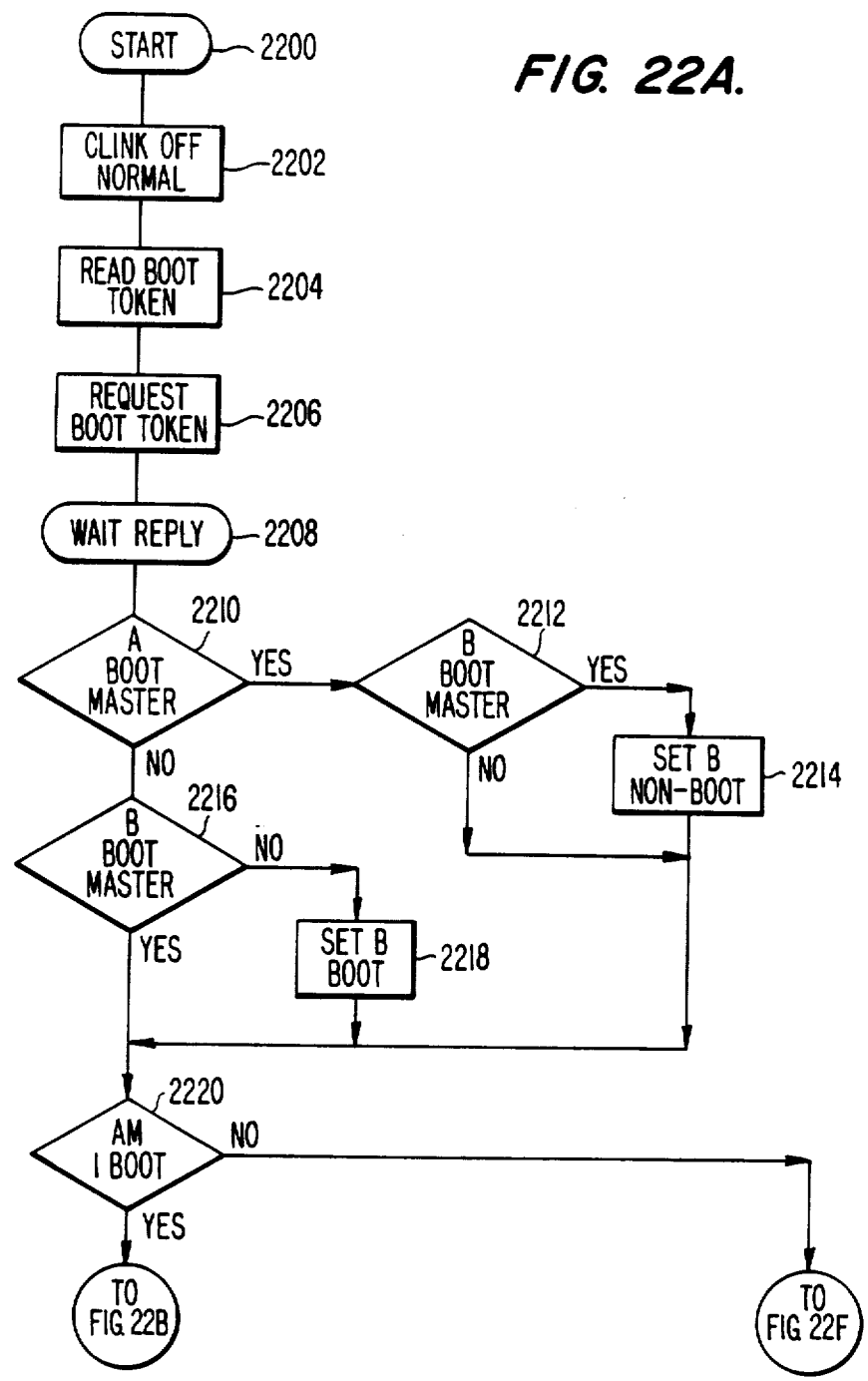
FIGS. 22A-22H contain a logic flow diagram for a bootstrapping operation for the computer system in FIG. 1.
Figure 22B:
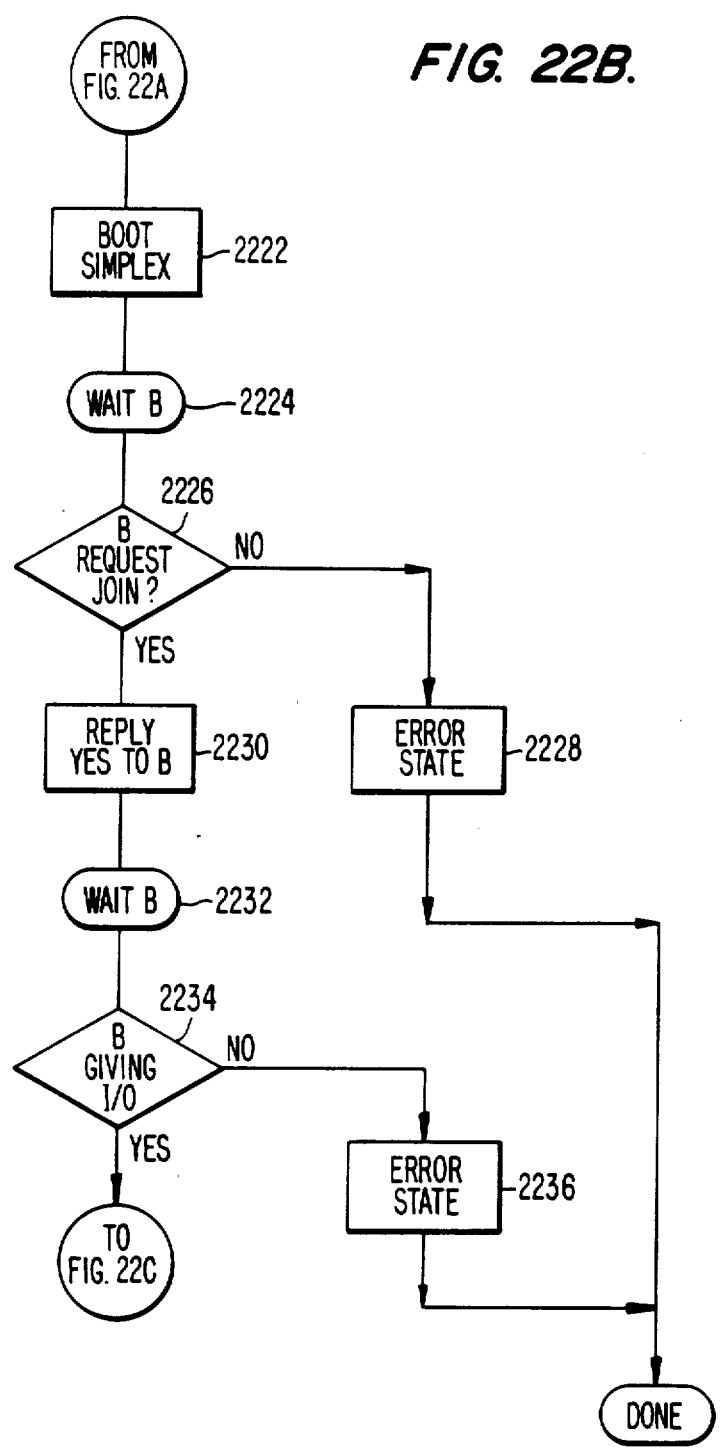
Figure 22C:
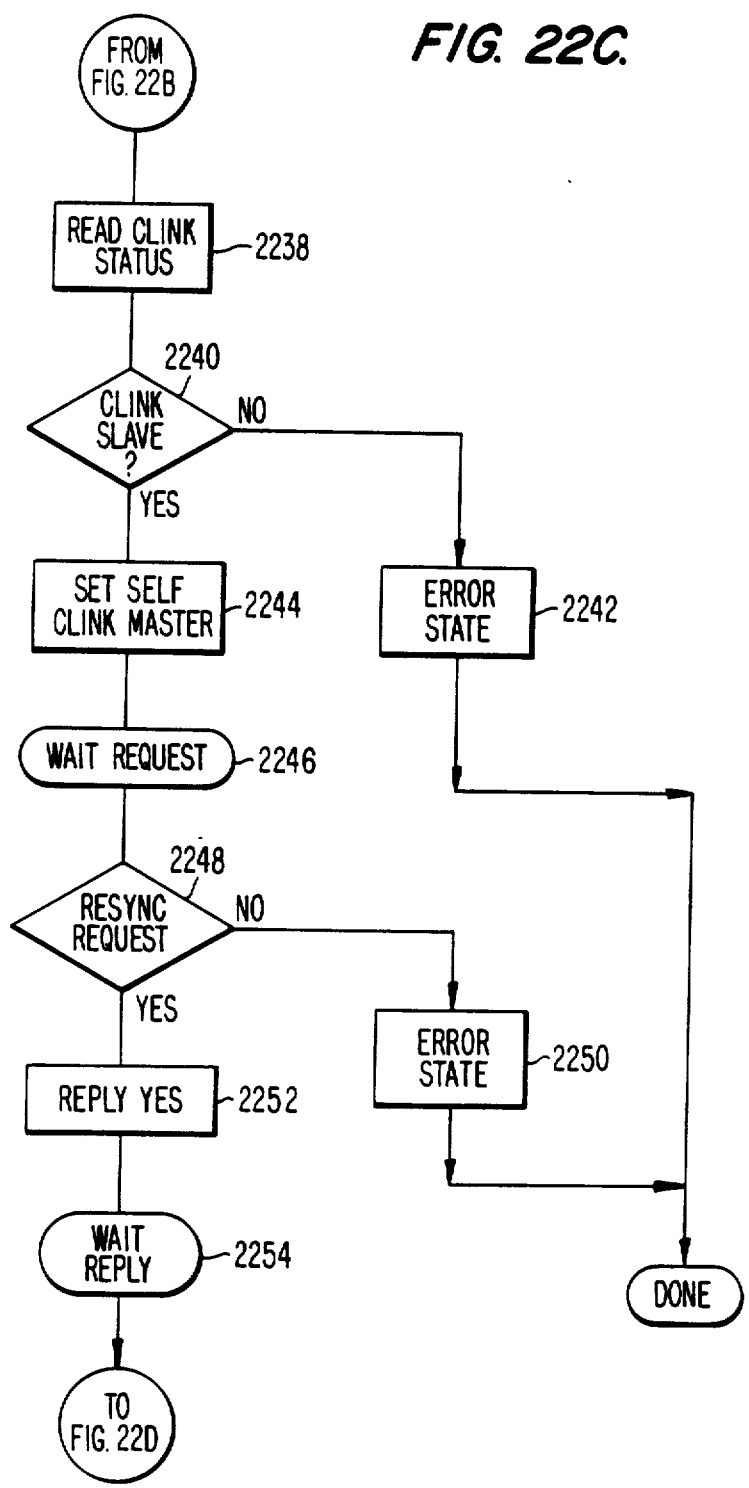
Figure 22D:
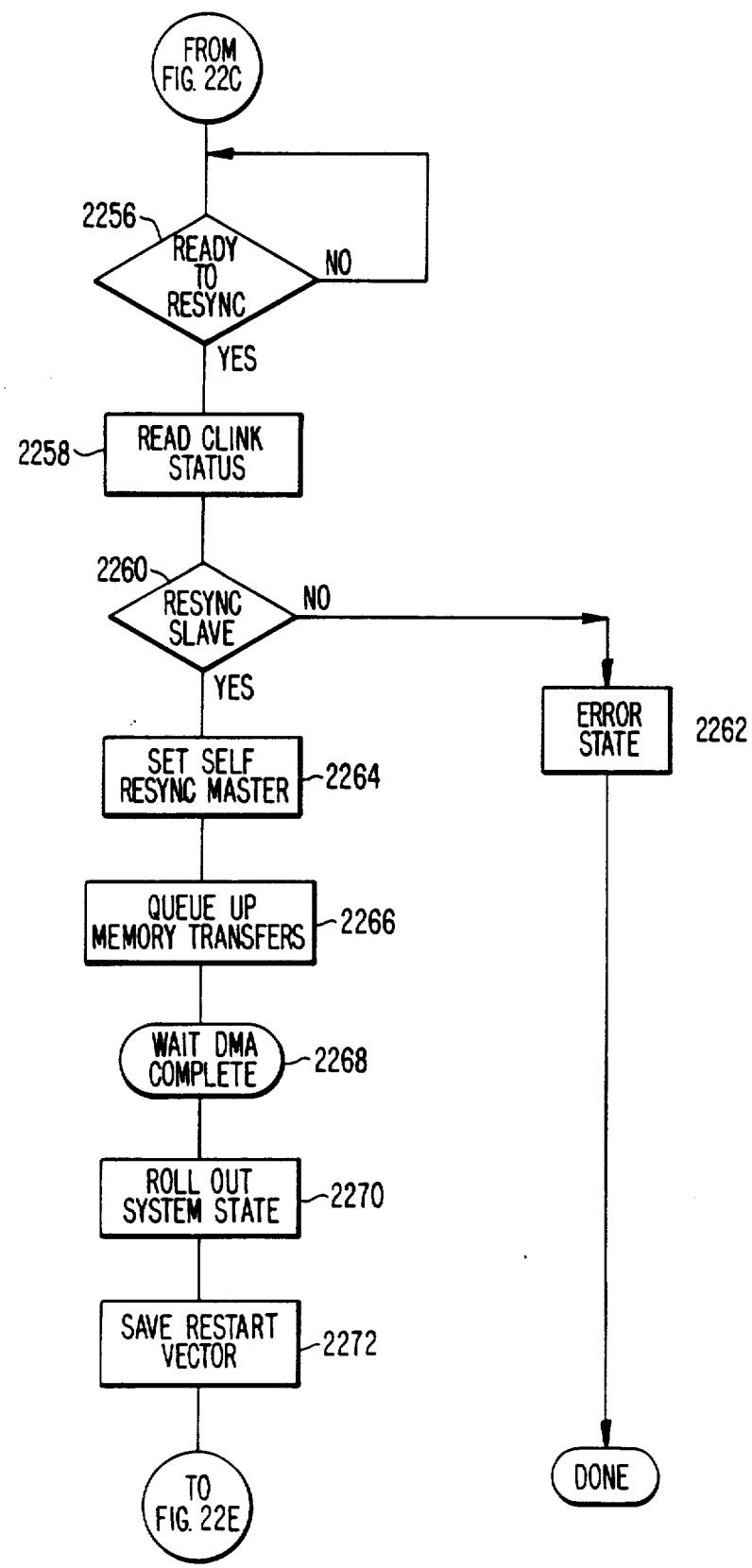
Figure 22E:
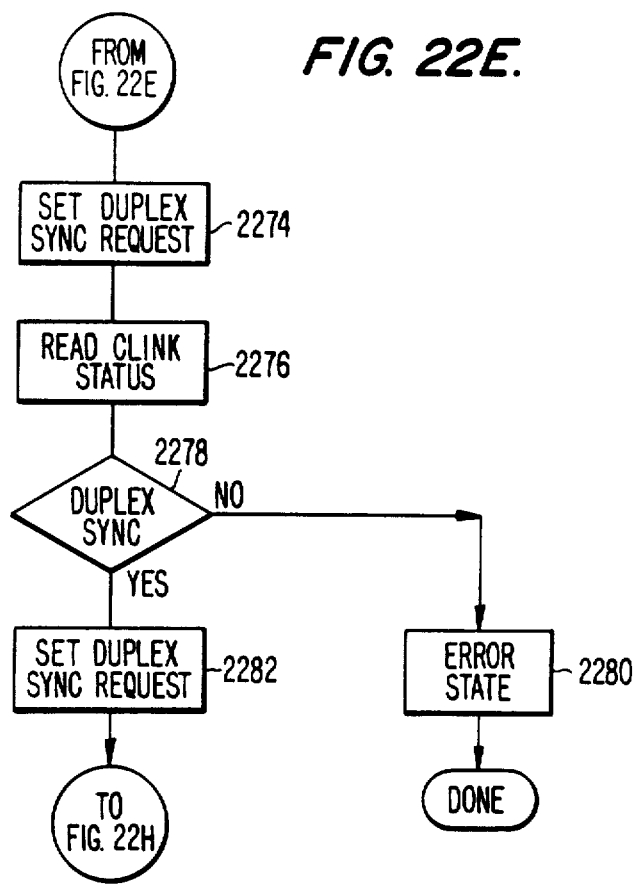
Figure 22G:
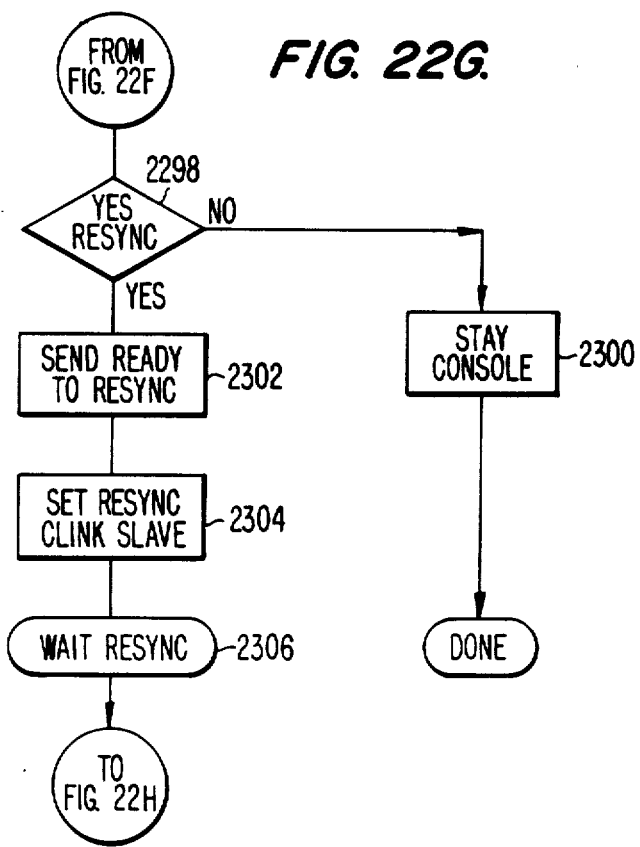
Figure 22F:
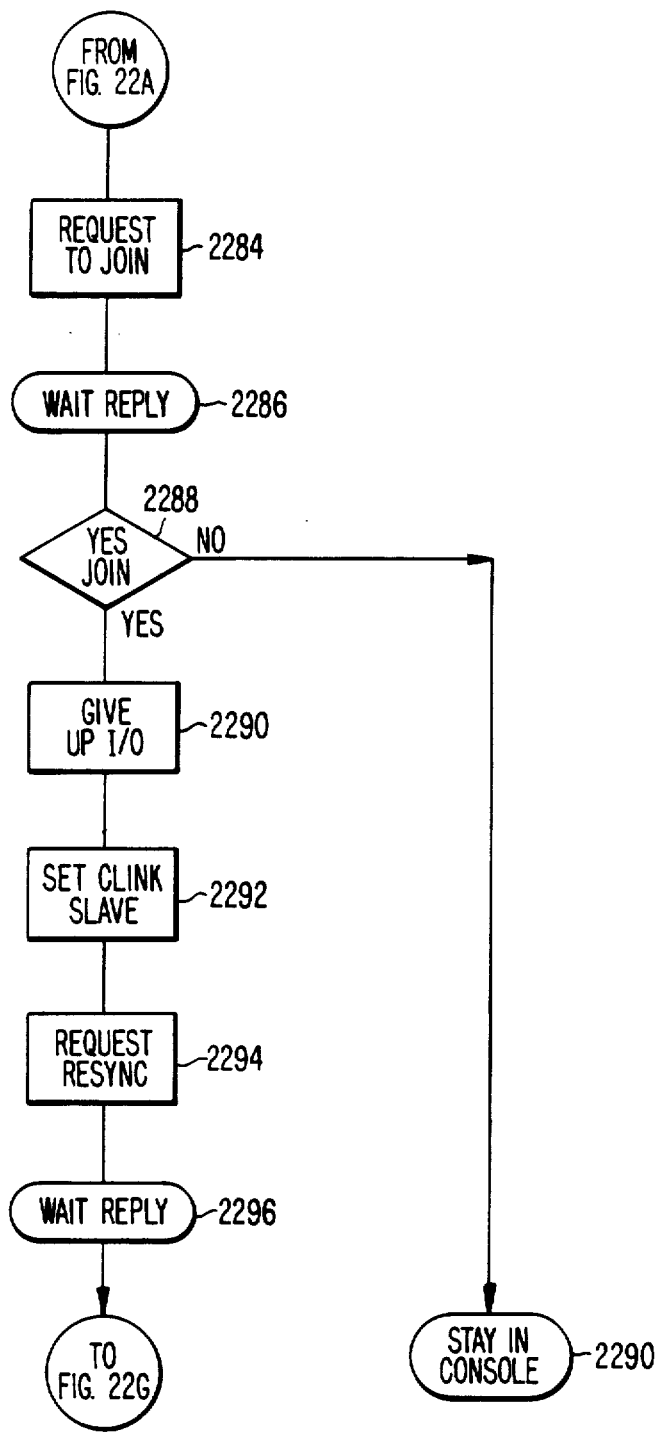
Figure 22H:
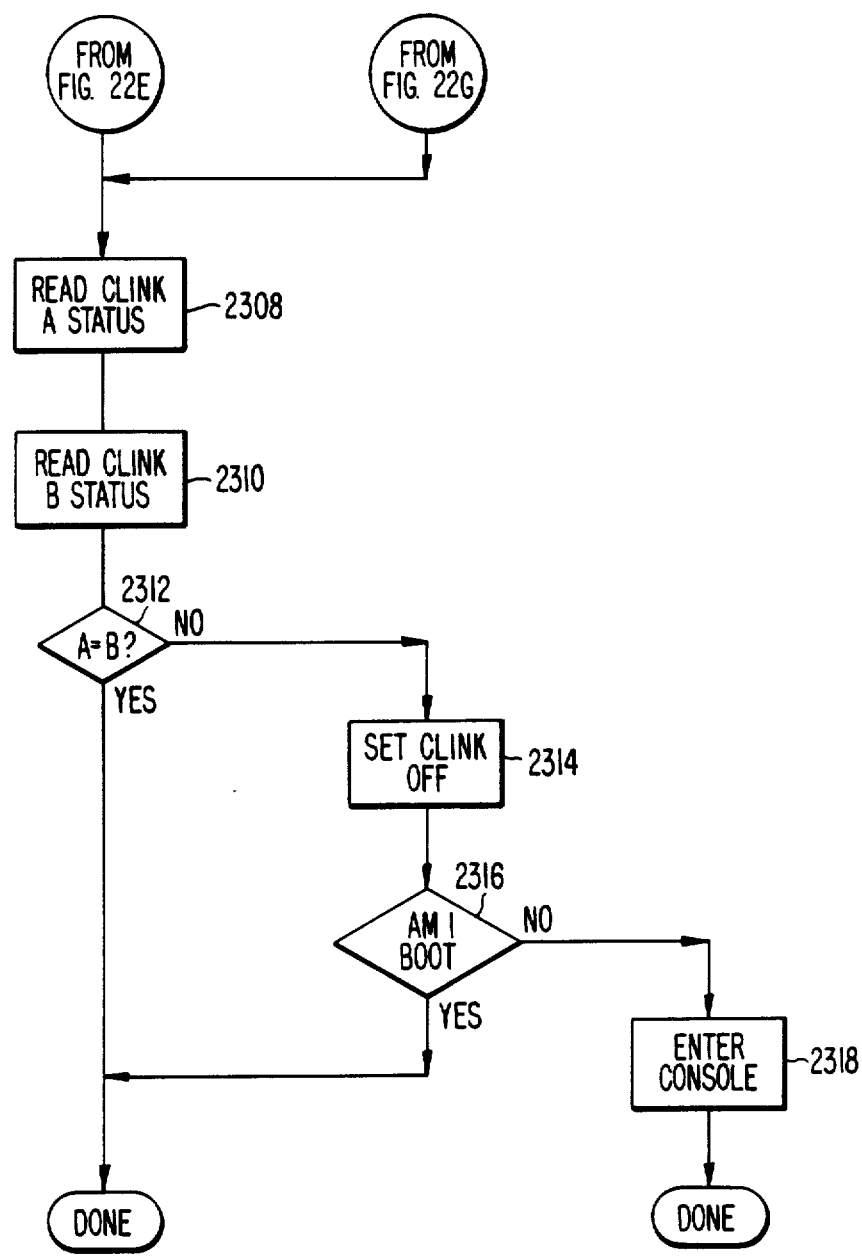
Figure 23:
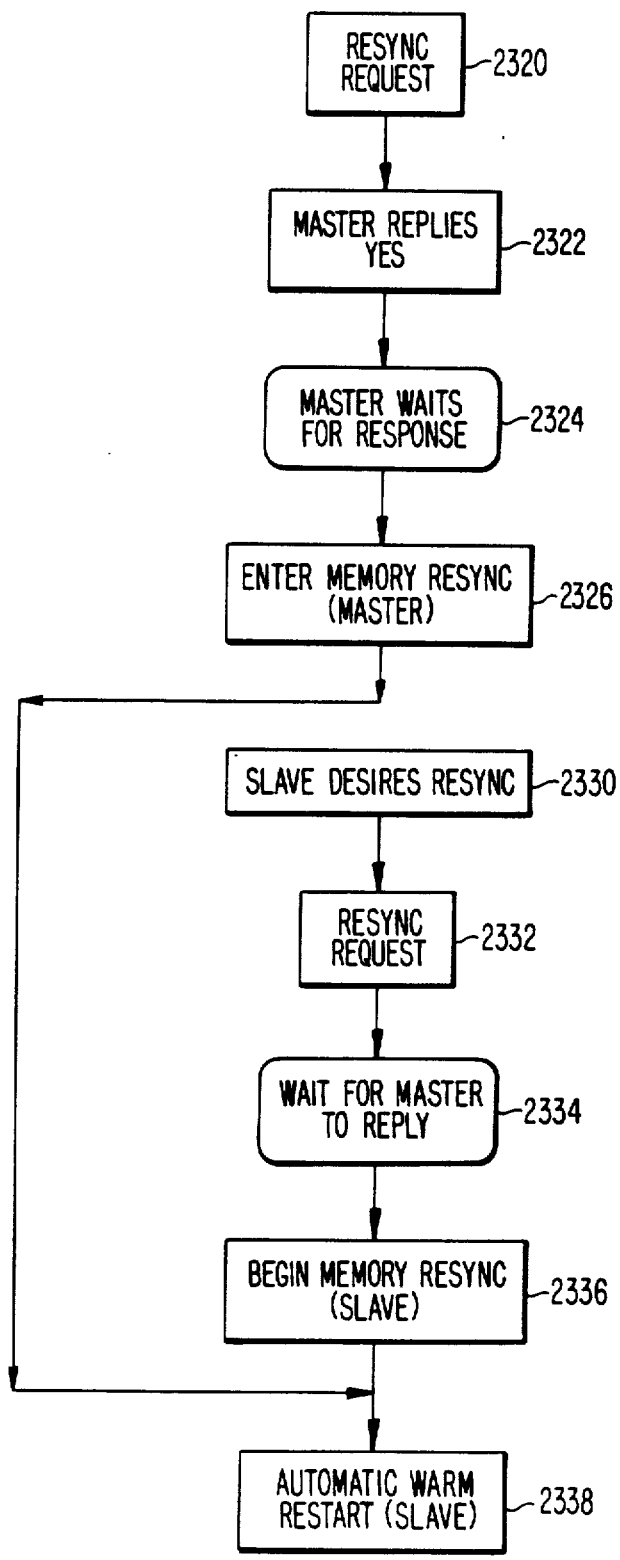
FIG. 23 is a logic flow diagram for a memory resynchronization operation for the computer system in FIG. 1.

The memory resynchronization flow chart is shown in FIG. 23. Many of the sequences of steps for memory resynchronization are similar to those used in the bootstrapping operation. These sequences are referred to as "routines" for brevity and will be correlated to the sequences of steps in the bootstrapping operation flowchart in FIG. 22.

The zone whose memory is copied is the "master," and the zone receiving the copy of the master's memory is called the "slave." The master is also the cross-link master and the slave is also the cross-link slave. At the initialization of memory resynchronization, the cross-link for the master is in the "cross-link on (master)" mode. When the master receives a resynchronization request from the other zone, (step 2320), the master responds "yes" (step 2322) and awaits a reply from the slave (step 2324). When the master receives a reply, it enters the memory resynchronization (master) routine (step 2326), which comprises steps 2256 through 2282 shown in FIGS. 22B and 22C. Next, an automatic warm restart procedure, which is a modified bootstrapping routine, begins. That procedure is explained in detail below.

When the zone requesting its memory to be synchronized, which will become the slave, desires resynchronization (step 2330), it sends a "resync request" to the master (step 2332) and awaits a reply (step 2334). When it receives a reply from the master, it begins the memory resynchronization (slave) routine, which comprises steps 2298 through 2306 of the bootstrapping routine shown in FIG. 22G. Upon completion of that routine, the slave begins the automatic warm restart procedures (step 2338), and then both zones enter the zone resynchronization procedure.

The zone resynchronization routine comprises steps 2308-2318 of the bootstrapping routine shown in FIG. 22H. The only difference is that in step 2316 shown in FIG. 22H, the zones ask themselves whether they were the cross-link masters rather than whether they were the bootmasters.

4. Warm Restart Operation

Figure 24:
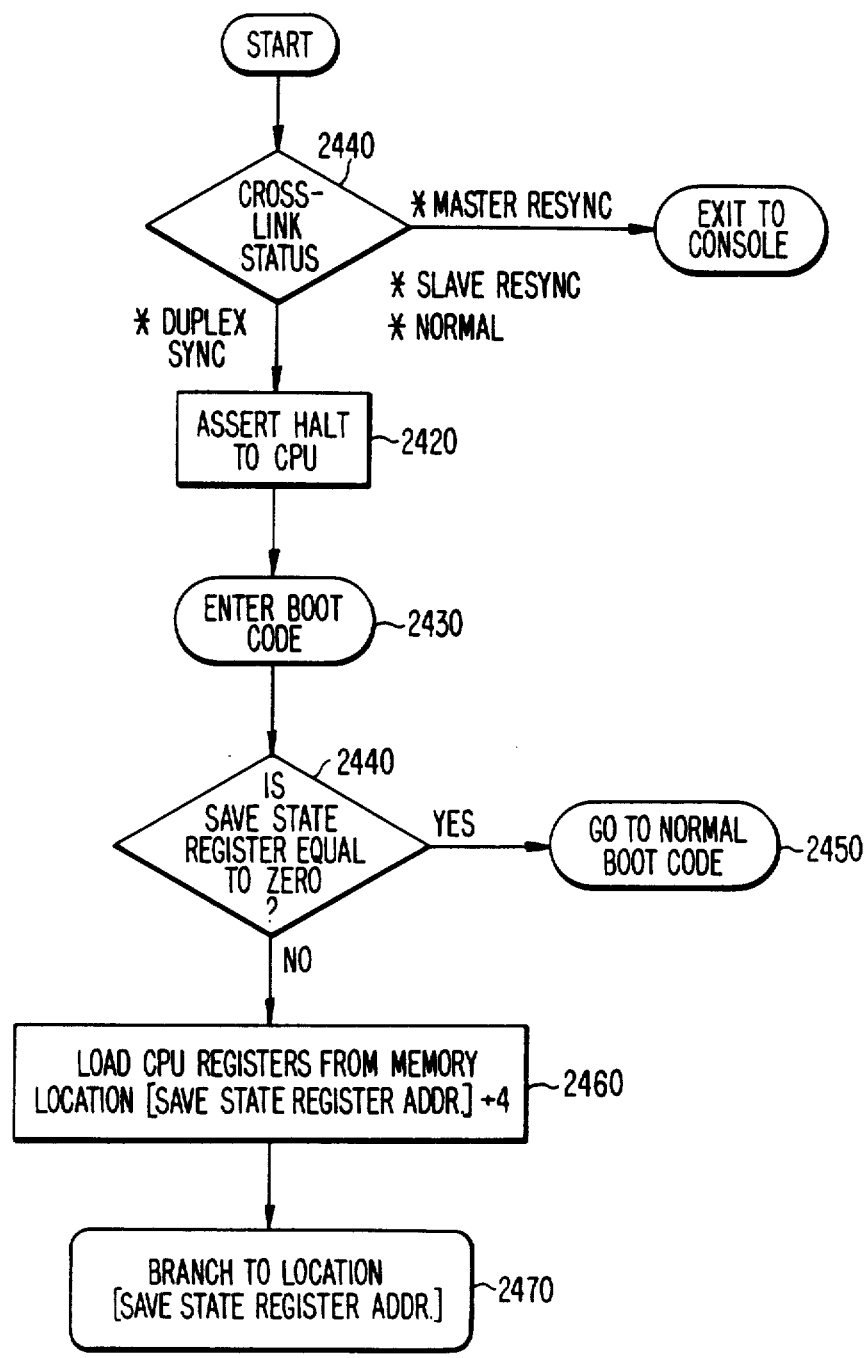
FIG. 24 is a logic flow diagram for a warm restart procedure for the computer system in FIG. 1.

The warm restart procedure is shown in FIG. 24. When entered, the first question asked is what is the cross-link status. If it is normal, master resync, or slave resync, then the warm restart operation is exited.

If the cross-link status is "duplex sync," then the CPUs are temporarily halted (step 2420) and they then enter the console code (step 2430) to complete the bootstrapping operations entered. The save state register is analyzed. If the save state register is zero, then the cold bootstrapping needs to occur as shown in FIG. 22 (step 2450). Otherwise, the CPU registers are loaded from predetermined memory locations, which are preferably the value in the save state register plus four (step 2460), and a branch is made to the location indicated by the save state register (step 2470). This latter action restarts the operating system as well as all suspended jobs.

D. Fault Detection, Isolation and Repair

1. Trace RAMs

Different methods for fault detection have already been discussed in the explanation of CPU modules 30 and 30' and firewalls 1000 and 1010. Those methods include checks by memory modules, 60 and 60' that the address and control signals received from memory controllers are identical and checks for uncorrectable memory data errors. The methods also include comparisons by memory controller pairs 70/75 and 70'/75' that address, control, and data signals passing through the two "rails" are the same. Also firewalls 1000 and 1010 have checkers which compare data from zones during I/O writes. Other fault detection schemes are also possible.

Consistent with the fail stop capability of processing system 20 and 20', the fault detection in the processing systems keeps faults from propagating to other modules in an uncontrolled manner. To realize a fail safe capability, however, computing system 10 must isolate the source of the fault so that the system can be repaired. The preferred techniques for locating the source of faults uses recirculating registers, called trace RAMs, located throughout data paths in processing systems 20 and 20'. These trace RAMs record consecutive messages transmitted on the associated data paths. When a fault occurs, the messages are analyzed to locate the source of the fault.

Figure 25:
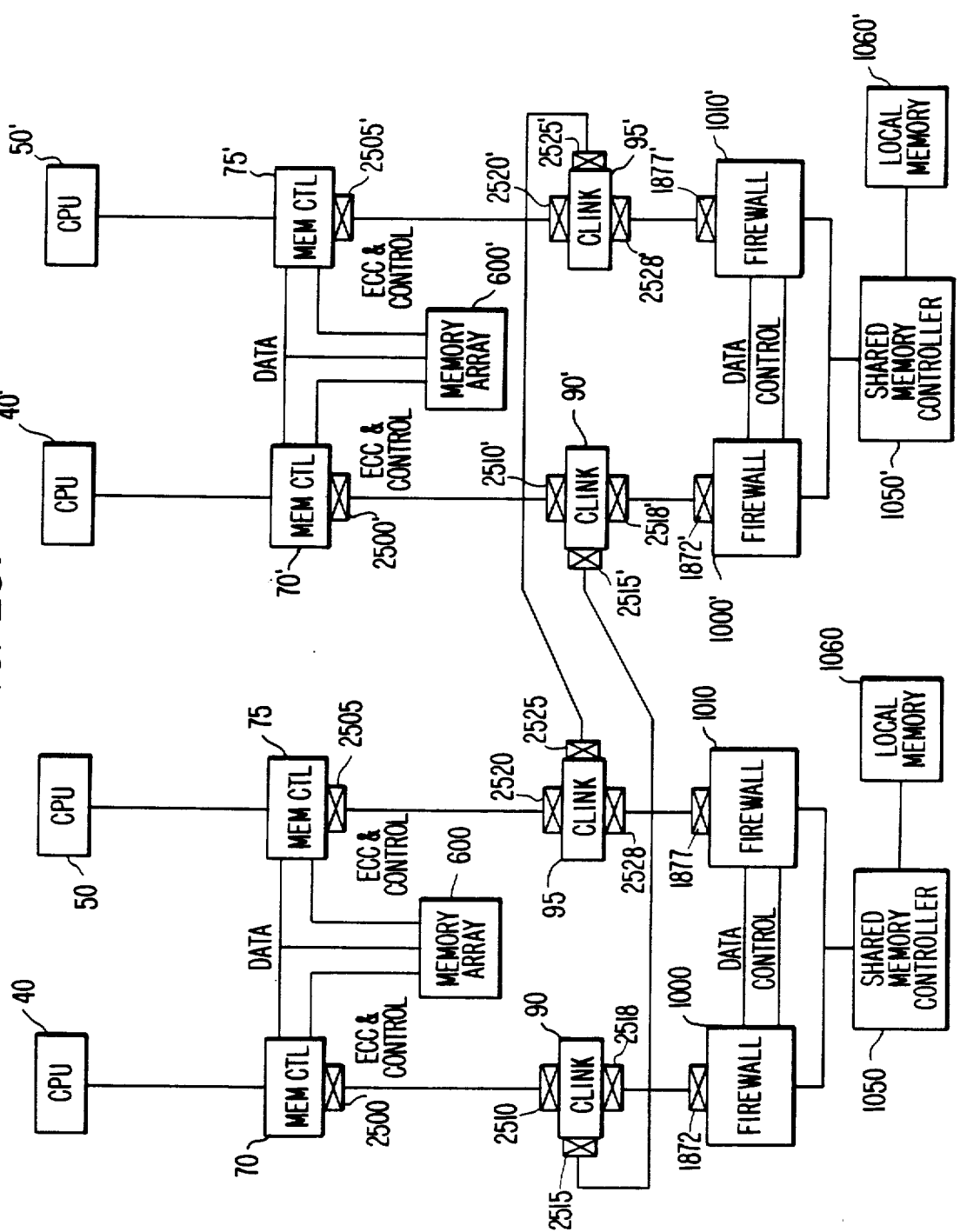
FIG. 25 is a block diagram of the computer system shown in FIG. 1 containing the placement of trace RAMs.

FIG. 25 is a block diagram of CPU module 30 and I/O module 100 showing preferred locations of trace RAMs in computing system 10. Other locations may also be used. In processing system 20, trace RAMs are preferably located on all data paths. Thus in FIG. 25, trace RAMs 2500 and 2505 are located on memory controllers 70 and 75, respectively. Trace RAMs 2510, 2515, and 2518 are located on all the interfaces of cross-link 90 and trace RAMs 2520, 2525, and 2528 are located on all the interfaces of cross-link 95. Trace RAMs 1872 and 1877 are located in firewalls 1000 and 1010, respectively. A complementary set of trace RAMs are located in processing system 20'.

Although the selection and placement of trace RAMs is largely discretionary, each data path should preferably contain at least one trace RAM in order to permit accurate identification of the error source so that the sources of error can be identified.

Figure 26:
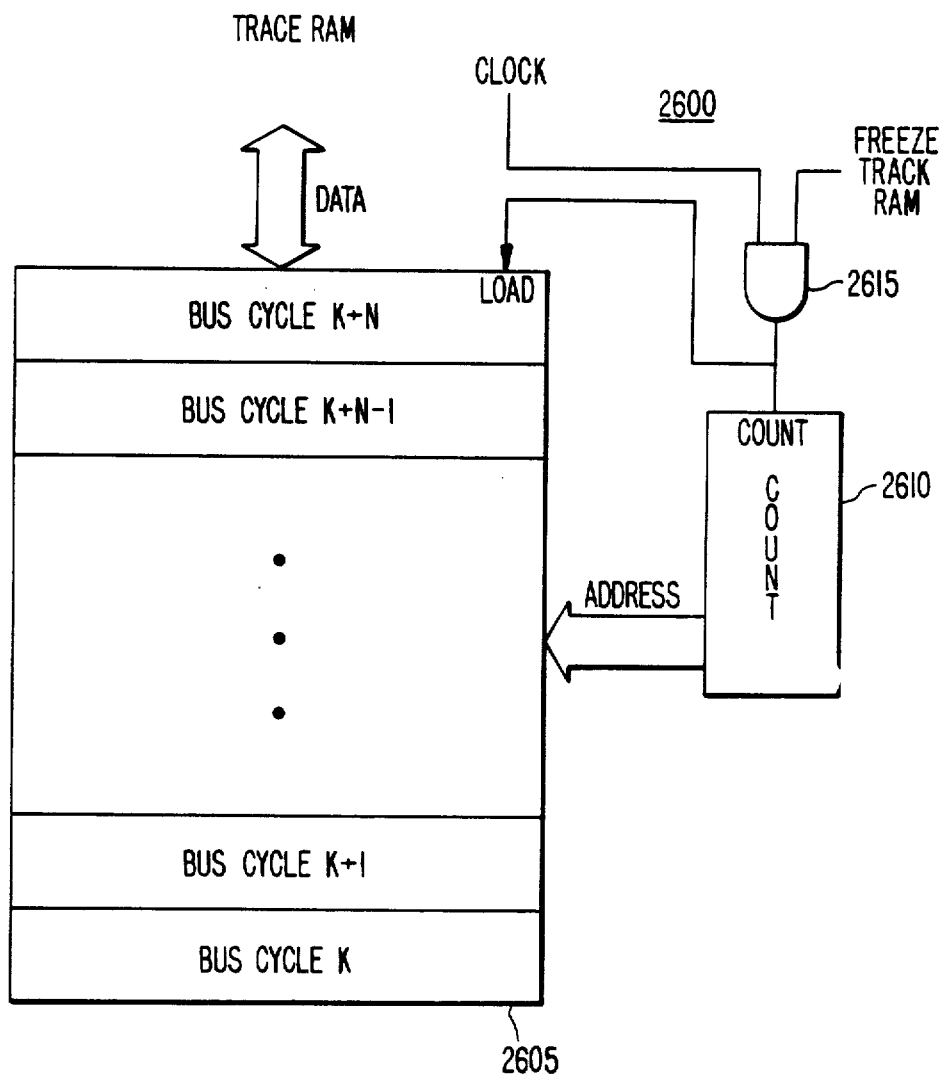
FIG. 26 is a block diagram of a trace RAM.

An example of a trace RAM 2600 is shown in FIG. 26. Trace RAM 2600 is preferably organized as a circular buffer which stores the data transferred on the N most recent cycles of the associated bus pathway. Trace RAM 2600 comprises a buffer register 2605 having inputs coupled to receive data from the associated data path. The load input into buffer 2000 is the output of AND gate 2615. AND gate 2615's inputs are a clock signal from the data path and a FREEZE TRACE RAM signal generated when a fault is detected. The address inputs of buffer 2605 are connected to a recycling counter 2610 which receives a count signal from AND gate 2615.

The size N of the trace RAM 2600 is determined by the total number of bus cycles which are required for the most distant message transfer plus the total number of cycles which would be required to send a control signal to the trace RAM when an error or fault occurs. Preferably that control signal is a command for the trace RAM to freeze its data and stop storing additional messages.

Each of the trace RAMs then keeps in its memory a copy of the N most recent transactions on the data pathway associated with it. For example, in FIG. 25 trace RAM 2518 keeps a copy of the N most recent transactions on module interconnect 130.

2. Intermittent Errors

FIG. 27 is a flow chart for the procedure used for isolating the source of errors or faults once they are detected. Errors can either be "intermittent," which do not repeat "solid," which do repeat. Detection of a fault by some element causes an error signal to be sent to the associated cross-link (i.e., cross-link 90 for firewall 1000 and memory controller 70). The cross-links either interrupt the CPUs or cause them to enter into a trap.

In general, the error signal travels to the cross-link in one cycle if from the firewalls or memory controllers and in two cycles if from the memory arrays. The delay elements in the cross-links then ensure that the CPUs in both zones are simultaneously informed (i.e., by interrupt or trap) of the error or fault.

Simultaneously, a FREEZE TRACE RAM signal propagates throughout computer system 10 from the element which detected the error (step 2700). The FREEZE TRACE RAM signal generally takes one or two memory cycles to reach the cross-links in its zone, another cycle to reach the cross-links in the other zone as well as the firewalls and memory controllers in the zone in which the error was found, and another clock cycle to reach the firewalls and memory controllers in the non-faulting zone.

The CPUs service the trap or interrupt by entering the machine check routine (step 2702) and determining whether the error was detected while the CPUs were already in the machine check routine (step 2705). If so, then the error is assumed to be a solid error and the system begins the procedures for isolating solid faults shown in FIGS. 28A-C.

If the CPUs were not in a machine check procedure, then the detected error is assumed to be intermittent. The CPUs then set an entry flag (step 2710) to begin procedures for isolating that error. The entry flag is the flag tested in step 2705 to determine whether the CPUs were in a machine check procedure when interrupted.

All the trace RAM data is then read through trace RAM buses to the firewalls (step 2720) associated with that processing system. Next, the diagnostic microprocessors load all the trace RAM data (step 2730) for transfer to the CPUs 40, 50, 40' and 50' (step 2735).

Each CPU then starts at the element which sent the error signal (step 2740) to isolate the source of the fault at an element. Comparison of Trace RAM data is done by comparing the data from Trade RAMs at the same locations on opposite rails, such as 2500/2505, 2510/2520, 2515/2525, etc. The corresponding messages (i.e., those at the same depth in the trace RAM) are compared to see whether an error (i.e., inequality between corresponding messages) is detected. After the trace RAMs at the error detector are analyzed, the next trace RAMs follow, in reverse, the path data followed in the operation during which the fault occurred. Thus, for CPU reads, the path goes away from the CPU's In the first step of the error detection routine, the trace RAM data from each rail of CPU module 30 and 30' are compared (step 2750). If there are no errors between the trace RAMs on different rails, (step 2752), meaning that the trace RAM data on corresponding data paths are equal, the presence of other data paths is determined (step 2754). If other data paths remain, an alternate path is taken (step 2756) for subsequent comparisons (steps 2750, *et seq.*)

If there are no other paths, the CPUs then determine whether the trace RAM pairs checked are the first (step 2758). If so, the error must have occurred when data was first received, such as at firewalls 1000 and 1010 in a CPU read. Because a single rail of data is split into two paths at that point, the data should have been the same, so the error detector is deemed to be the "culprit" and logged as being at fault (step 2760). The entry flag is then cleared (step 2762), which indicates the end of the machine check routine and also clears the interrupts, and the machine check routine is exited (step 2764).

If in steps 2754 and 2758 a determination was made that no other paths remained but the current trace RAM pair was not the first pair checked, then an error is determined as having occurred in the previous level on the path since that is where the trace RAM recorded a change in data as occurring and where the error first appeared (step 2766). Then in steps 2762 and 2764, the entry flag is cleared and the machine check routine is exited, respectively.

If, however, an error is noted in step 2752, then the next determination is whether the error was at the operation source (step 2770). "Operation source" is a shortened expression for the beginning of the data path for a particular operation. If not, then the path is traversed back up toward the operation source (step 2775), and another comparison is made between rails (step 2750, et seq.). If at step 2770, it is determined that the error checking routine is presently at the operation source, then the operation source is logged as the location of the fault (step 2780), the entry flag is cleared (step 2762), and the machine check routine is exited (step 2764), respectively.

3. Solid Faults

Figure 28A:
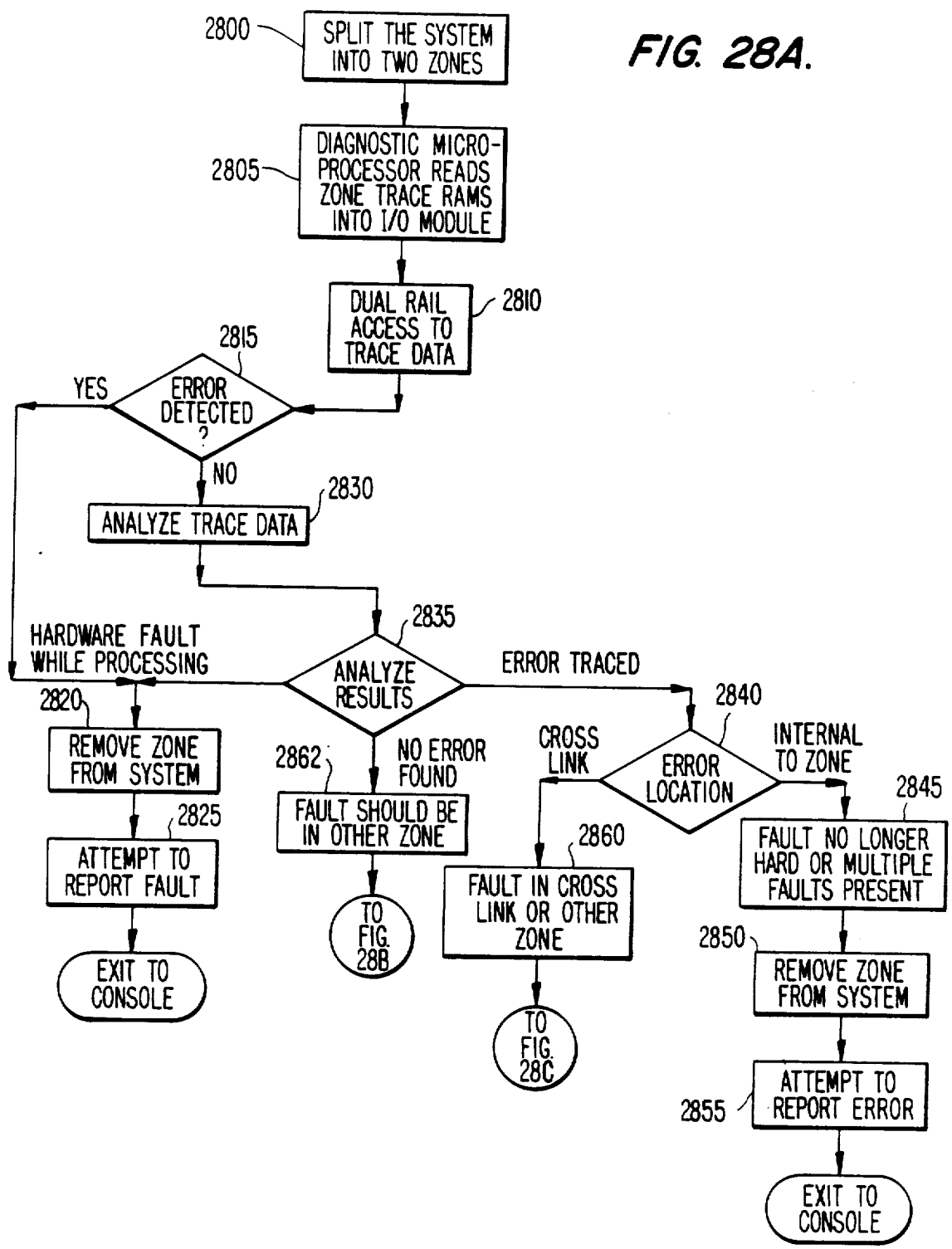
FIGS. 28A-28C is a logic flow diagram for isolation of solid faults in the computer system of FIG. 1.
Figure 28B:
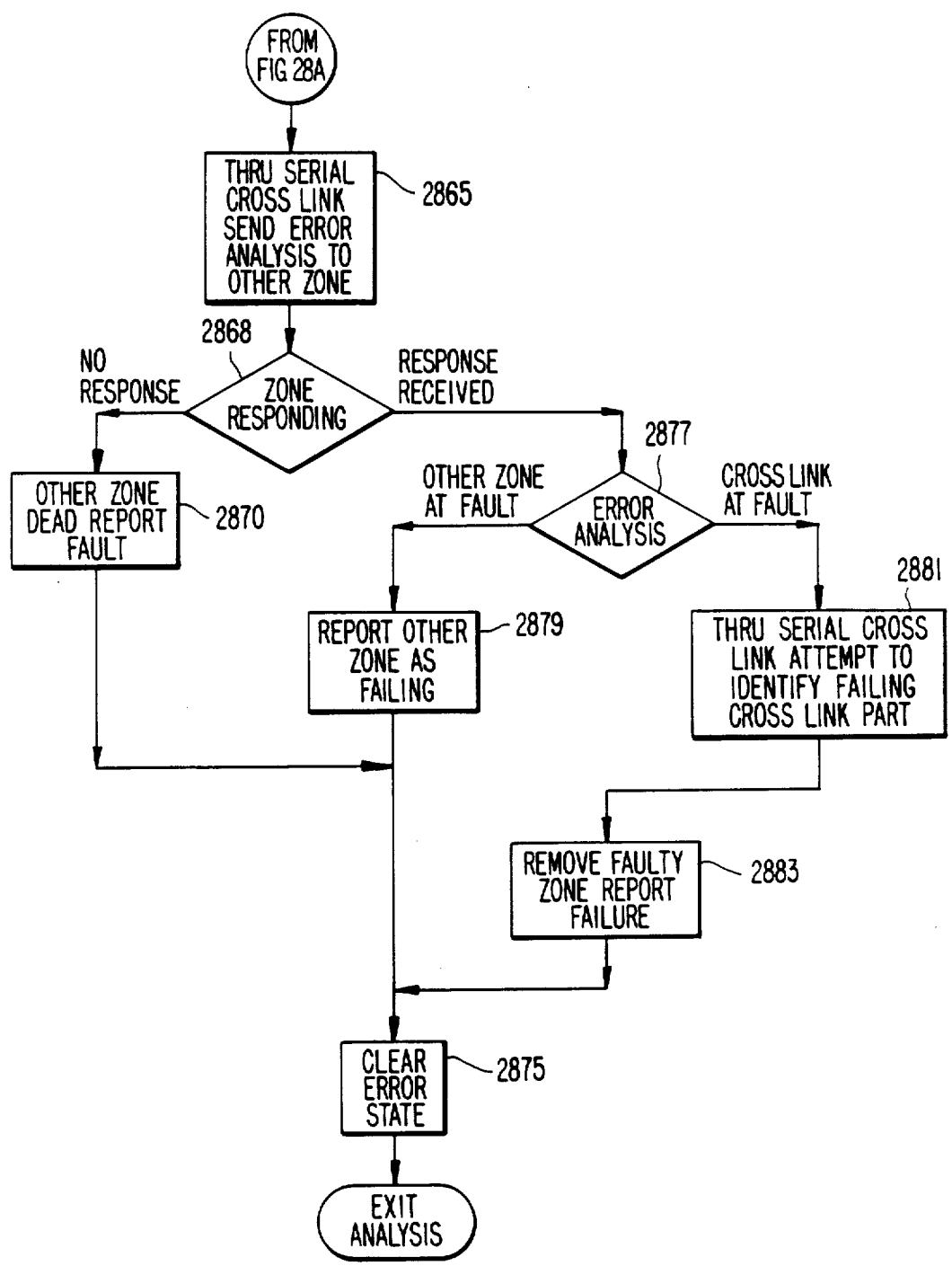
Figure 28C:
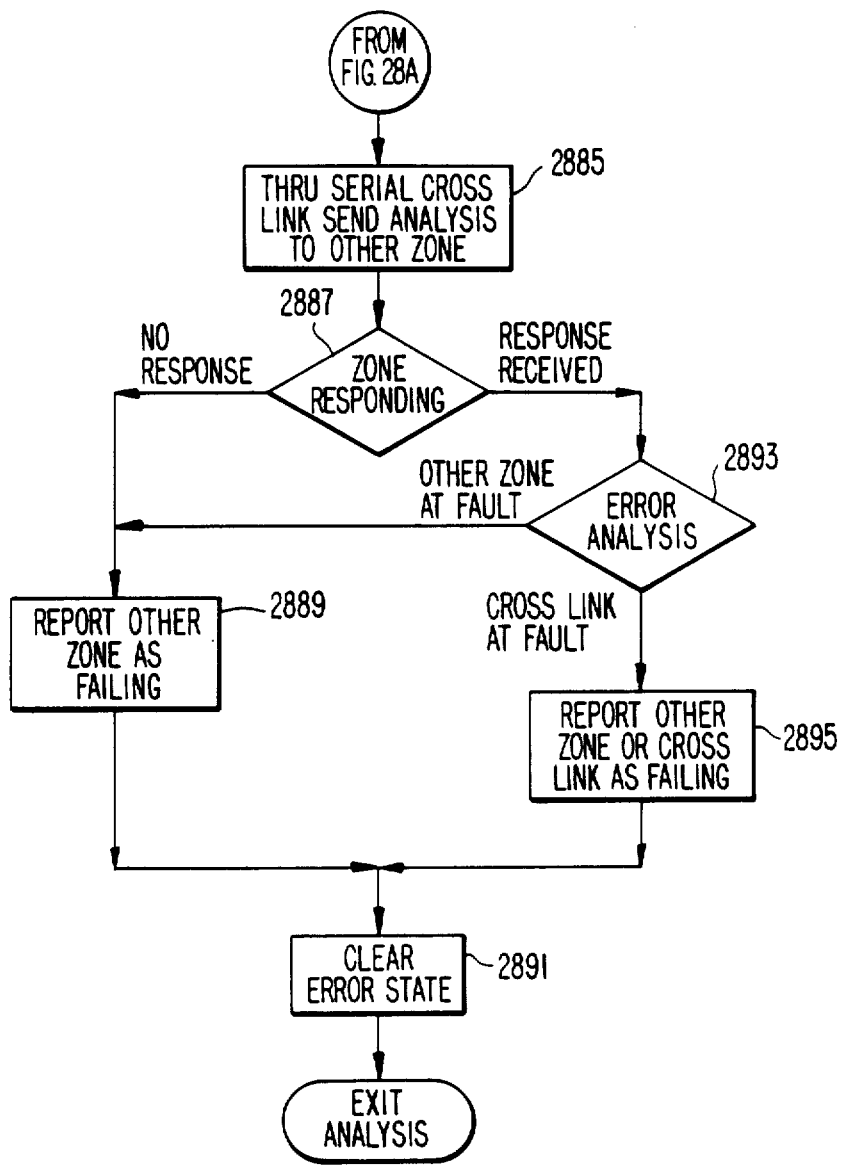

Once a fault has been determined to be a solid fault (see FIG. 27), the procedure for isolating such solid faults, shown in the flow charts in FIG. 28A–28C, is initiated. The first step in the solid fault processing involves splitting the fault tolerant computing system 10 into its two separate zones 11 and 11' (step 2800). This is done by turning all cross-links off. The diagnostic microprocessors in each zone then read the trace RAM data for their zone (step 2805) and send that data to the zone's CPUs via a dual rail access (step 2810). If a error is detected during this process (step 2815) then a hardware fault has occurred during the error processing, and that zone is removed from computer system 10 (step 2820). An attempt is made to report the fault (step 2825), which may not be possible because of the hardware fault, and the procedure exits to the console. This allows the console operator to initiate detailed diagnostic tests to locate the solid fault.

If an error is not detected during the dual rail access of trace RAM data, then that trace data is analyzed (step 2830). The procedure used for such analysis is similar to steps 2740–2780 of the transient error analysis. Differences in procedure occur because the zones are split and the error may have only been detected in one zone. If so, then the procedure will show no error in the zone doing the analysis or an error in the cross-link. If a hardware fault is detected during analysis, the zone is removed (step 2820), an attempt is made to report (step 2825), and the procedure exits to the console.

If the zone's analysis of the trace RAM data shows that it has an error (step 2835), then the error location is examined (step 2840). If the error is internal to the zone, then the fault is determined to be no longer hard or solid, or multiple faults are found to be present a transient fault occurring while attempting to isolate a transient fault will make the original transient appear to be solid (step 2845). Although rare, this condition requires further analysis so, similar to the steps followed if there is a hardware fault during error processing, the faulting zone is removed from the system (step 2850), an attempt is made to report the error (step 2855), and the solid fault procedure is exited to the console.

If in step 2840, the fault is determined to be in the cross-link, then the fault may actually be in the cross-link pathway 25 or in the other zone (step 2860). If so, as shown in FIG. 28B, the zone sends its error analysis to the other zone through the serial cross-link (step 2865) and a determination is made whether the other zone is responding (step 2868). If there is no response from the other zone (step 2870), the other zone is determined to be inoperative and a fault is reported (step 2870). The error state is then cleared (step 2875) and the solid fault analysis routine is completed.

If the other zone does respond, then further error analysis occurs to determine whether the other zone is at fault or whether the cross-link is at fault (step 2877).

If the other zone is at fault as a result of the analysis in step 2877, then the other zone is reported as failing (step 2879), the error state is then cleared (step 2875), and the solid fault analysis procedure is completed.

If, on the other hand, the result of the analysis in step 2877 is that the cross-link is at fault, then an attempt is made to identify the failing cross-link through the serial cross-link (step 2881). This is done by a procedure similar to that in step 2835 of FIG. 28A. Once the failing cross-link is identified, then the faulty zone is removed and a failure is reported (step 2883). The error state is then cleared (step 2875) and the solid fault analysis procedure is completed.

If, in step 2835, the trace RAM data was analyzed and it was determined that the fault was in the other zone, then the procedure in FIG. 28C is followed. In that procedure, the zones exchange the trace RAM analysis through the serial cross-link (step 2885) and it is determined whether the other zone is responding (step 2887). If the other zone does not respond, that zone is reported as failing (step 2889), the error state is cleared (step 2891), and the solid fault analysis routine is completed.

If a response is received (step 2887), then error analysis is performed (step 2893) similar to the error analysis in step 2835 of FIG. 28B. The error analysis can reach one of two conclusions. If the conclusion is that the other zone is at fault, that zone is reported as failing (step 2889). If the conclusion is that the cross-link is at fault, the cross-link or the other zone are reported as failing (step 2895). After the reports in steps 2889 or 2895, the error state is cleared (step 2891) and the analysis procedure is exited.

4. Repair

The results of the fault and solid fault isolation procedures in FIGS. 27 and 28A–C, could be that an error or fault has been located in a CPU module (i.e., the CPU/-memory/memory controller combination); a cross-link; cross-link pathway 25; a module interconnect; or an I/O module. Generally, if an intermittent fault is detected, the CPUs in fault tolerant computer system 10 note the location of the intermittent fault, increment counters indicating the number of intermittent errors for the faulting element, and takes no further action unless the count for an element exceeds a predetermined number. If the count does exceed that predetermine number, indicating that the frequency with which intermittent faults occur is too high to be tolerated, or if the detected fault is a solid fault, then the module or element is defective, and must be disabled so that the fault tolerated computer system 10 can continue to operate effectively until the module containing that element can be replaced.

If a CPU module is found to be at fault, then that module must be disabled by switching the cross-link of the module from the "duplex" mode to the "slave" mode. In a "slave" mode, a module can only communicate with the CPU module in the other zone by way of its cross-link diagnostic control register. The disabled CPU module is then returned to the console module.

If a cross-link is found at fault, then one of three actions may be taken depending upon the portion of the cross-link at fault. The portion of the cross-link coupled to the memory controller is virtually indistinguishable from the associated CPU module. If that portion is faulty, then the same procedures for disabling the CPU module must occur.

The portion of the cross-link coupled to the module interconnect is virtually indistinguishable from the module interconnect. The process of disabling the cross-link in this situation is the same as that for disabling the module interconnects.

The portion of the cross-link is coupled to cross-link pathway 25 virtually indistinguishable from the cross-link pathway. In this case, or if the fault is in the cross-link pathway, the zones are split apart by turning are cross-links off and disabling the CPU module believed to contain the faulty cross-link. If the source of the fault cannot be determined, however, then a preselected one of the CPU modules 30 and 30' is disabled first. If errors persist the other CPU module is rebooted and the preselected module is disabled.

The same procedure is used to disable faulty I/O modules, module interconnects, or cross-links where the faults occur in the module interface. In all three instances, the fault occurred during a transaction involving an I/O module, so that I/O module is disabled. This is done by advising the operating systems of all of the CPU's 40, 50, 40', and 50' to remove reference to that I/O module.

If the fault recurs, indicating a cross-link or module interconnect fault, the zone with those modules can be disabled. The preferable solution is to keep disabling the I/O module in communication when the fault occurred. The module interconnects and the associated portion of the cross-links are also effectively disabled when all the connected I/O modules are disabled. A CPU module with no I/O modules is effectively disabled for most purposes.

CONCLUSION

The present invention, as shown by its preferred embodiment thus meets the objects of the invention. It will be apparent to those skilled in the art that modifications and variations can be made in the methods and apparatus of this invention. The invention in its broader aspects is, therefore, not limited to the specific details, representative methods and apparatus, and illustrative examples shown and described. Accordingly, departure may be made from such details without departing from the spirit or scope of the general inventive concept.

What is claimed:

1. A dual processor computer system with error checking capability comprising:
   a first processing system for executing a series of instructions including output instructions containing data to be written into a designated system element;
   a second processing system for executing said series of instructions independently of and in synchronism with said first processing system;
   shared resource means, coupled to said first and second processing systems, for serving as a designated element for selected ones of said output instructions executed by said first and second processing systems and for recording the data contained in said selected ones of said output instructions, said shared resource means receiving said data from said first and second processing systems substantially simultaneously; and
   error checking means, coupled to said shared resource means and to said first and second processing systems, for checking the data received by said share resource means from said first and second processing systems for errors and for correcting said errors only when said selected ones of said output instructions are executed by said first and second processing systems to write data into said shared resource means.

2. The dual processor computer system of claim 1 wherein said shared resource means includes
   a main memory unit for recording said data received from said first and second processing systems, and
   memory controller means, coupled to said main memory unit, said first processing system and said second processing system, for controlling the transfer of data from said first and second processing systems to said main memory unit.

3. The dual processor computer system of claim 2 wherein said memory controller means includes
   a primary memory controller coupled to said first processing system for transferring said data received from said first processing system to said main memory unit, and a mirror memory controller coupled to said second processing system and to said primary memory controller for receiving said data from said first and second processing systems, said mirror memory controller including checking means for comparing the data received from the first and second processing systems.

4. The dual processor computer system of claim 3 wherein said series of instructions include input instructions for reading addressed data stored in said main memory unit into said first and second processing systems, wherein said primary memory controller includes first read means for transferring said addressed data stored in said main memory unit to said first processing system in response to said input instructions, and wherein said mirror memory controller includes second read means for transferring data stored in said main memory unit to said second processing system in response to said input instructions.

5. The dual processor computer system of claim 3 wherein said primary memory controller includes means for generating an error correcting code corresponding to said data, and means for storing said data and corresponding error correcting code in said main memory unit.

6. The dual processor computer system of claim 5, wherein said mirror memory controller includes means for generating an error correction code corresponding to said data, and wherein said shared resource means includes means for comparing the error correction code generated by said primary memory controller with the error correction code generated by said mirror memory controller.

7. The dual processor computer system of claim 1 further including error isolation means, responsive to said error checking means, for analyzing said computer system to determine the cause of errors detected by said error checking means.

8. The system of claim 1 wherein said error checking means further comprises:

means for comparing the address of the received data from said first processing system with the address of the received data from the second processing system.

9. The dual processor computer system of claim 1 wherein said shared resource means includes:

encoder generating means for generating an error code corresponding to the received data, and storage means for writing said data and corresponding error code into said shared resource along with said data.

10. The dual processor computer system of claim 1 wherein said selected output instructions include addresses, and wherein said dual processor computer system further includes means for comparing said addresses received from said first processing system with said addresses received from said second processing system, and means for recording instances when said addresses from the said first processing system are different from addresses from said second processing system.

11. The dual processor computer system of claim 1 wherein said selected output instructions include control signals, and wherein said dual processor computer system includes means for comparing said control signals received from said first processing system with said control signals received from said second processing system, and means for recording when said control signals from said first processing system are different from said control signals from said second processing system.

12. A dual processor computer system with interprocessor error checking capability comprising:

a first central processing unit executing a series of instructions including output instructions containing data to be written;

a second central processing unit executing said series of instructions independently of and in synchronism with said first central processing unit;

a first data bus coupled to said first central processing unit for receiving said data contained in said output instructions executed by said first central processing unit;

a second data bus coupled to said second central processing unit for receiving said data contained in said output instructions executed by said second central processing unit;

a main memory unit into which said data contained in selected ones of said output instructions is to be written;

memory controller means, coupled between said main memory unit and said first and second data busses, for receiving said data from said first and second data busses substantially simultaneously, for controlling transfer of said data from said first and second data busses to said main memory unit and for checking said data for errors prior to the transfer of said data to said main memory unit, said memory controller means including a primary memory controller coupled to said first data bus and including means for transferring data from said first data bus to said main memory unit, and a mirror memory controller coupled to said first and second busses and including means for comparing the data from said second data bus with the data from said first data bus for purposes of error checking; and error checking means, coupled to said first and second data busses, for checking said data received by said memory controller and correcting any errors in said data only when selected ones of said output instructions are executed to write data into said main memory.

13. The dual processor computer system of claim 12 further including error isolation means, responsive to said error checking means, for analyzing said computer system to determine the cause of errors detected by said error checking means.

14. The dual processor computer system of claim 12 wherein said selected output instructions include addresses, and wherein said dual processor computer system further includes means for comparing said addresses received from said first central processing unit with said addresses received from said second central processing unit, and means for recording instances when said addresses from the said first central processing unit are different from addresses from said second central processing unit.

15. The dual processor computer system of claim 12 wherein said selected output instructions include control signals, and wherein said dual processor computer system includes
   means for comparing said control signals received from said first central processing unit with said control signals received from said second central processing unit, and
   means for recording when said control signals from said first central processing unit are different from said control signals from said second central processing unit.

16. The dual processor computer system of claim 12 wherein said series of instructions include input instructions for reading addressed data stored in said main memory unit into said first and second processing systems,
   wherein said primary memory controller includes first read means for transferring said addressed data stored in said main memory unit to said first processing system in response to said input instructions, and
   wherein said mirror memory controller includes second read means for transferring data stored in said main memory unit to said second processing system in response to said input instructions.

17. The dual processor computer system of claim 12 wherein said primary memory controller includes
   means for generating an error correcting code corresponding to said data, and
   means for storing said data and said corresponding error correcting code in said main memory unit.

18. The dual processor computer system of claim 17, wherein said mirror memory controller includes
   means for generating an error correction code corresponding to said data, and wherein said shared resource means includes
   means for comparing the error correction code generated by said primary memory controller with the error correction code generated by said mirror memory controller.

19. A fault tolerant computing system comprising:
a first dual processor computer system including
   a first central processing unit executing a series of instructions including output instructions containing data to be written into a first designated system element,
   a second central processing unit executing said series of instructions independently of and in synchronism with said first central processing unit,
   a first data bus coupled to said first central processing unit for receiving said data from said first central processing unit.
   a second data bus coupled to said second central processing unit for receiving said data from said second central processing unit,
   first shared resource means, coupled to said first and second data busses, for service as a first designated system element for selected ones of said output instructions executed by said first and second central processing units, for simultaneously receiving said data from said first and second central processing units, and for recording the data contained in said ones of said selected output instructions, said first shared resource means including
   a first memory for storing said data,
   first data selection means for transmitting data from only one of said first and second processing units to said first memory, and
   first error checking means, coupled to said first and second data busses, for checking said data on said first and second data busses to detect and correct errors only following execution of an output instruction, said detection and correction occurring prior to transmission of said data from said first and second central processing unit to said first memory;
a second dual processor computer system including
   a third central processing unit executing said series of instructions including output instructions containing data to be written into a second designated system.
   a fourth central processing unit executing said series of instructions independently of and in synchronism with said third central processing unit,
   a third data bus coupled to said third central processing unit for receiving said data from said third central processing unit,
   a fourth data bus coupled to said fourth central processing unit for receiving said data from said fourth central processing unit,
   second shared resource means, coupled to said third and fourth data busses, for serving as a second designated system element for selected ones of said output instructions executed by said third and fourth central processing units, for simultaneously receiving said data from third and fourth central processing units, and for recording said data contained in said selected output instructions, said second shared resource means including
   a second memory for storing said data,
   second data selection means for transmitting data from only one of said third and fourth central processing units to said second memory, and
   second error checking means, coupled to said third and fourth data busses, for checking said data on said third and fourth data busses to detect and correct errors only during execution of an output instruction, said detection and correction occurring prior to transmission of said data from said first and second central processing units to said second memory; and
cross-link communication means coupled between said first and second dual processor computer systems for providing bidirectional communication between said first and second dual processor computer systems and for synchronizing said first and second dual processor computer systems.

20. The fault tolerant computer system of claim 19 further including error isolation means, responsive to said first and second error checking means, for analyzing said first and second dual processor computer systems to determine the cause of errors detected by said first and second error checking means.

21. The fault tolerant computing system of claim 19 wherein said selected output instructions include addresses, and wherein said first dual processor computer system further includes
   first means for comparing said addresses received from said first central processing unit with said addresses received from said second central processing unit, and first means for recording instances when said addresses from the said first central processing unit are different from addresses from said second central processing unit; and wherein said second dual processor computer system further includes second means for comparing said addresses received from said third central processing unit with said addresses received from said fourth central processing unit, and second means for recording instances when said addresses from the said third central processing unit are different from addresses from said fourth central processing unit.

22. The fault tolerant computing system of claim 19 wherein said selected output instructions include control signals, and wherein said first dual processor computer system further includes first means for comparing said control signals received from said first central processing unit with said control signals received from said second central processing unit, and first means for recording instances when said control signals received from the said first central processing unit are different from said control signals received addresses from said second central processing unit; and wherein said second dual processor computer system further includes second means for comparing said control signals received from said third central processing unit with said control signals received from said fourth central processing unit, and second means for recording instances when said control signals received from the said third central processing unit are different from said control signals received from said fourth central processing unit.

23. The fault tolerant computing system of claim 19 wherein said first shared resource means includes first means for generating an error correcting code corresponding to said data, and first means for storing said data and said corresponding error correcting code in said first memory; and wherein said second shared resource means includes second means for generating an error correcting code corresponding to said data, and second means for storing said data and said corresponding error correcting code in said second memory.

24. The fault tolerant computing system of claim 23, wherein said first shared resource means also includes third means for generating an error correction code corresponding to said data, and first means for comparing the error correction code generated by said first and third means error correction code generating means; and wherein said second shared resource means also includes fourth means for generating an error correction code corresponding to said data, and second means for comparing the error correction code generated by said second and fourth error correction code generating means.

25. A dual processor computer system with error checking capability comprising:

a first processing system for executing a series of instructions including output instructions containing data to be written into a designated system element;

a second processing system for executing said series of instructions independently of and in synchronism with said first processing system;

shared resource means, coupled to said first and second processing systems, for serving as a designated element for to selected ones of said output instructions executed by said first and second processing systems and for writing the data contained in said selected ones of said output instructions, said shared resource means receiving said data from said first and second processing systems substantially simultaneously;

self-checking means coupled to the shared resource means for enabling the shared resource means to check data written into and read out of said shared resource means to keep track of the number of correctible errors for supervisory purposes; and error checking means coupled to said shared resource means and to said first and second processing systems for checking and correcting errors in the data received from said first and second processing systems only for an output instruction executed by said first and second processing systems to write data into said shared resource means.

* * * * *